United States Patent
Khoshnevisan et al.

(10) Patent No.: US 12,126,447 B2
(45) Date of Patent: Oct. 22, 2024

(54) GROUP-BASED ACKNOWLEDGMENT FEEDBACK TECHNIQUES FOR WIRELESS COMMUNICATIONS

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(*) Notice: Subject to any disclaimer, the term of this patent is extended or adjusted under 35 U.S.C. 154(b) by 89 days.

(21) Appl. No.: 17/381,510

(22) Filed: Jul. 21, 2021

(65) Prior Publication Data

US 2021/0351872 A1    Nov. 11, 2021

Related U.S. Application Data

(63) Continuation of application No. 16/894,542, filed on Jun. 5, 2020, now Pat. No. 11,171,745.
(Continued)

(30) Foreign Application Priority Data

Jul. 4, 2019  (IN) .............................. 201941026827

(51) Int. Cl.
*H04L 1/16* (2023.01)
*H04L 1/1607* (2023.01)
(Continued)

(52) U.S. Cl.
CPC .......... *H04L 1/1621* (2013.01); *H04L 1/1812* (2013.01); *H04W 72/23* (2023.01)

(58) Field of Classification Search
CPC .... H04L 5/0053; H04L 5/0055; H04L 5/0057
See application file for complete search history.

(56) References Cited

U.S. PATENT DOCUMENTS

2018/0278379 A1   9/2018   Sun et al.
2018/0376490 A1   12/2018  Lunttila et al.
(Continued)

FOREIGN PATENT DOCUMENTS

JP    2019122820    *   7/2019
JP    2021010103 A     1/2021
(Continued)

OTHER PUBLICATIONS

Ericsson: "HARQ and Scheduling Enhancements for NR-U", 3GPP Draft, R1-1904337, 3GPP TSG-RAN WG1 #96 bis, HARQ and Scheduling Enhancements for NR-U, 3rd Generation Partnership project (3GPP), Mobile Competence Centre, 650, Route Des Lucioles, F-06921 Sophia-Antipolis Cedex, Franc, vol. RAN WG1, No. Xi'an, China, Apr. 8, 2019-Apr. 12 2019, Apr. 7, 2019 (Apr. 7, 2019), XP051699628, 10 Pages, Retrieved from the Internet: URL: http://www.3gpp.org/ftp/Meetings%5F3GPP%5FSYNC/RAN1/Docs/R1%2D1904337%2Ezip [retrieved on Apr. 7, 2019] The Whole Document.
(Continued)

*Primary Examiner* — Bo Hui A Zhu

(57) ABSTRACT

Methods, systems, and devices for wireless communications are described that support group-based acknowledgment feedback techniques. Two or more different groups of downlink transmissions may each have an associated group-based acknowledgment feedback, and a base station may transmit downlink control information to a UE that indicates one or more parameters that are used to determine which downlink transmissions are to be reported in the group-based feedback. Based on the parameters in the downlink control information, the UE may determine the feedback to be reported, and a timing for when to transmit the feedback to the base station.

28 Claims, 24 Drawing Sheets

Related U.S. Application Data

(60) Provisional application No. 62/887,887, filed on Aug. 16, 2019.

(51) Int. Cl.
  *H04L 1/1812* (2023.01)
  *H04W 72/23* (2023.01)

(56) References Cited

U.S. PATENT DOCUMENTS

| | | |
|---|---|---|
| 2019/0222360 A1 | 7/2019 | Nam et al. |
| 2020/0313811 A1 | 10/2020 | Zhou |
| 2020/0344012 A1 | 10/2020 | Karaki et al. |
| 2020/0389878 A1 | 12/2020 | Karaki et al. |
| 2021/0006356 A1 | 1/2021 | Khoshnevisan et al. |
| 2021/0351870 A1 | 11/2021 | Khoshnevisan et al. |
| 2021/0351871 A1 | 11/2021 | Khoshnevisan et al. |
| 2022/0368464 A1* | 11/2022 | Lin ........................ H04W 28/04 |

FOREIGN PATENT DOCUMENTS

| | | | | |
|---|---|---|---|---|
| WO | WO2021002389 | * | 7/2020 | |
| WO | WO-2021002389 A1 | * | 1/2021 | ........... H04L 1/1812 |

OTHER PUBLICATIONS

Ericsson: "Potential HARQ Enhancements", 3GPP Draft, R1-1811303, 3GPP TSG-RAN WG1 Meeting #94, Potential HARQ Enhancements, 3rd Generation Partnership Project (3GPP), Mobile Competence Centre, 650, Route Des Lucioles, F-06921 Sophia-Antipolis Cedex, France vol. RAN WG1, No. Chengdu, China, Oct. 8, 2018-Oct. 12, 2018, Sep. 29, 2018 (Sep. 29, 2018), XP051518705, 7 Pages, Retrieved from the Internet: URL: http://www.3gpp.org/ftp/tsg%5Fran/WG1%5FRL1/TSGR1%5F94b/Docs/R1%2D1811303%2Ezip [retrieved on Sep. 29, 2018] The Whole Document.

International Search Report and Written Opinion—PCT/US2020/036666—ISA/EPO—Sep. 17, 2020.

Mediatek Inc: "Enhancements to HARQ for NR-U Operation", 3GPP Draft, R1-1906545, 3GPP TSG RAN WG1 #97, Enhancements to HARQ for NR-U Operation, MTK Final, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, May 13, 2019 (May 13, 2019), XP051727996, 11 Pages, Retrieved from the Internet: URL: http://www.3gpp.org/ftp/Meetings%5F3GPP%5FSYNC/RAN1/Docs/R1%2D1906545%2Ezip [retrieved on May 13, 2019] The Whole Document.

Huawei: "Feature Lead Summary of HARQ Enhancements for NR-U", 3GPP TSG RAN WG1 Meeting #97, R1-1907652, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 16, 2019, pp. 1-22, XP051739941, Section 1, Section 2.1.3.

LG Electronics : "HARQ Procedure for NR-U", 3GPP TSG RAN WG1 #97, R1-1906677, Reno, USA, May 13-17, 2019, 17 Pages.

Qualcomm Incorporated: "Enhancements to Scheduling and HARQ operation for NR-U", 3GPP TSG RAN WG1 Meeting #98, R1-1909247, No. Prague, Czech Republic, Aug. 26, 2019-Aug. 30-2019, Aug. 17, 2019, 19 Pages.

\* cited by examiner

GROUP-BASED ACKNOWLEDGMENT FEEDBACK TECHNIQUES FOR WIRELESS COMMUNICATIONS

CROSS REFERENCE

The present application for Patent is a Continuation of U.S. patent application Ser. No. 16/894,542 by Khoshnevisan et al., entitled "GROUP-BASED ACKNOWLEDGMENT FEEDBACK TECHNIQUES FOR WIRELESS COMMUNICATIONS" filed Jun. 5, 2020, which claims the benefit of U.S. Provisional Patent Application No. 62/887,887 by Khoshnevisan et al., entitled "GROUP-BASED ACKNOWLEDGMENT FEEDBACK TECHNIQUES FOR WIRELESS COMMUNICATIONS," filed Aug. 16, 2019, and the benefit of Indian Provisional Patent Application No. 201941026827 by Khoshnevisan et al., entitled "GROUP-BASED ACKNOWLEDGMENT FEEDBACK TECHNIQUES FOR WIRELESS COMMUNICATIONS," filed Jul. 4, 2019, each of which is assigned to the assignee hereof, and each of which is expressly incorporated by reference in its entirety herein.

BACKGROUND

The following relates generally to wireless communications, and more specifically to group-based acknowledgment feedback techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment feedback to indicate if a wireless device (e.g., a UE) successfully decodes downlink messages (i.e., data transmissions) where the downlink message decoding is based on one or more detected downlink control messages (e.g., a downlink grant or downlink control information (DCI)). In deployments supporting shared or unlicensed radio frequency spectrums (e.g., unlicensed NR), one or more downlink messages may not be received correctly (e.g., due to a hidden interfering node) and the wireless device may not provide acknowledgment feedback based on all of the downlink control messages. Further, in some cases a wireless device (e.g., a UE) may not be able to transmit acknowledgement feedback when the medium is occupied by another transmitter (e.g., when a listen-before-talk (LBT) procedure fails). Techniques to enhance system performance in cases where one or more transmissions may not be sent or received are thus desirable.

SUMMARY

The described techniques relate to improved methods, systems, devices, and apparatuses that support group-based acknowledgment feedback techniques for wireless communications. In various aspects, group-based feedback may be provided in which a user equipment (UE) may transmit acknowledgment feedback (e.g., hybrid automatic repeat request (HARM) feedback) for multiple downlink transmissions in a single uplink communication. In some cases, two or more different groups of downlink transmissions may each have an associated group-based acknowledgment feedback. In some cases, a base station may transmit downlink control information to a UE that indicates one or more parameters that are used to determine which downlink transmissions are to be reported in the group-based feedback. Based on the parameters in the downlink control information, the UE may determine the feedback to be reported, and a timing for when to transmit the feedback to the base station.

In some cases, multiple instances of downlink control information may be used to determine the feedback to be reported by the UE, and various techniques discussed herein may be used when one or more parameters (e.g., a new acknowledgment feedback indicator (NFI) that indicates a downlink assignment indicator (DAI) counter is reset) change values in the multiple instances of downlink control information. In some cases, various techniques discussed herein provide that one or more instances of downlink control information may provide parameters for multiple different groups of downlink transmissions (e.g., NFI, DAI, or both, may be provided for each of two groups of downlink transmissions). In some aspects of the present disclosure, downlink control information may indicate that feedback is requested for multiple different groups of downlink transmissions, and feedback for the multiple groups may be appended together and transmitted to the base station.

In further aspects of the present disclosure, a downlink control information format may be associated with group-based feedback transmissions and may include the one or more parameters for group-based feedback. In some cases, a fallback downlink control information format may also be used to indicate group-based feedback transmissions, and parameters associated with the group-based feedback may be determined from other parameters in the fallback DCI that may be reused, may be set to predetermined values, or combinations thereof.

A method of wireless communications at a UE is described. The method may include receiving a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receiving a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determining, based on which of the first new acknowledgment feedback indicator or the second new acknowledgment feedback indicator is received earliest or latest in time, the first group-based acknowledgment feedback.

An apparatus for wireless communications at a UE is described. The apparatus may include a processor, memory coupled with the processor, and instructions stored in the memory. The instructions may be executable by the processor to cause the apparatus to receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determine, based on which of the first new acknowledgment feedback indicator or the second new acknowledgment feedback indicator is received earliest or latest in time, the first group-based acknowledgment feedback.

Another apparatus for wireless communications at a UE is described. The apparatus may include means for receiving a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receiving a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determining, based on which of the first new acknowledgment feedback indicator or the second new acknowledgment feedback indicator is received earliest or latest in time, the first group-based acknowledgment feedback.

A non-transitory computer-readable medium storing code for wireless communications at a UE is described. The code may include instructions executable by a processor to receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determine, based on which of the first new acknowledgment feedback indicator or the second new acknowledgment feedback indicator is received earliest or latest in time, the first group-based acknowledgment feedback.

In some examples of the method, apparatuses, and non-transitory computer-readable medium described herein, the determining may include operations, features, means, or instructions for identifying that the second new acknowledgment feedback indicator being different than the first new acknowledgment feedback indicator for the first group-based acknowledgment feedback corresponds to an error case, and discontinuing generating the first group-based acknowledgment feedback to be transmitted in the first uplink transmission. In some examples of the method, apparatuses, and non-transitory computer-readable medium described herein, the determining further may include operations, features, means, or instructions for determining that the second new acknowledgment feedback indicator resets the first group-based acknowledgment feedback for a subsequent second uplink transmission that may be to include group-based acknowledgment feedback.

In some examples of the method, apparatuses, and non-transitory computer-readable medium described herein, the first downlink control information and the second downlink control information each further include a group indicator that indicates that both the first downlink transmission and the second downlink transmission may be in a same group of downlink transmissions.

In some examples of the method, apparatuses, and non-transitory computer-readable medium described herein, the determining further may include operations, features, means, or instructions for determining a first acknowledgment (ACK)/negative-acknowledgment (NACK) to be reported as feedback for the first downlink transmission and a second ACK/NACK to be reported as feedback for the second downlink transmission, formatting the first group-based acknowledgment feedback to include the first ACK/NACK and the second ACK/NACK based at least in part on the first new acknowledgment feedback indicator or the second new acknowledgment feedback indicator, and transmitting a latest subset of feedback information associated with a latest received new acknowledgment feedback indicator.

In some examples of the method, apparatuses, and non-transitory computer-readable medium described herein, the first group-based acknowledgment feedback is formatted based on which of the first new acknowledgment feedback indicator or the second new acknowledgment feedback indicator is received earliest or latest in time.

In some examples of the method, apparatuses, and non-transitory computer-readable medium described herein, the determining further may include operations, features, means, or instructions for determining a first ACK/NACK to be reported as feedback for the first downlink transmission and a second ACK/NACK to be reported as feedback for the second downlink transmission, identifying that the second new acknowledgment feedback indicator being different than the first new acknowledgment feedback indicator for the first group-based acknowledgment feedback may be interpreted as the new acknowledgment feedback indicator being untoggled from the first new acknowledgment feedback indicator, and formatting the first group-based acknowledgment feedback to include the first ACK/NACK and the second ACK/NACK based on the first new acknowledgment feedback indicator or the second new acknowledgment feedback indicator.

In some examples of the method, apparatuses, and non-transitory computer-readable medium described herein, a downlink assignment indicator field is not reset within an acknowledgment/negative-acknowledgment opportunity.

In some examples of the method, apparatuses, and non-transitory computer-readable medium described herein, the first group-based acknowledgment feedback may be formatted relative to a prior group-based acknowledgment feedback based on whether the first new acknowledgment feedback indicator may be different than a prior new acknowledgment feedback indicator associated with the prior group-based acknowledgment feedback, and a subsequent group-based acknowledgment feedback may be formatted relative to the first group-based acknowledgment feedback based on whether a subsequent new acknowledgment feedback indicator is different than the second new acknowledgment feedback indicator.

In some examples of the method, apparatuses, and non-transitory computer-readable medium described herein, the first group-based acknowledgment feedback may be formatted based on which of the first new acknowledgment feedback indicator or the second new acknowledgment feedback indicator is received earliest or latest in time.

In some examples of the method, apparatuses, and non-transitory computer-readable medium described herein, the first group-based acknowledgment feedback may be formatted based on which of the first new acknowledgment feedback indicator or the second new acknowledgment feedback indicator is received in a majority of sets of group-based acknowledgment feedback parameters associated with the first group-based acknowledgment feedback.

Some examples of the method, apparatuses, and non-transitory computer-readable medium described herein may further include operations, features, means, or instructions for transmitting, to the base station, the first group-based acknowledgment feedback in the first uplink transmission.

In some examples of the method, apparatuses, and non-transitory computer-readable medium described herein, the determining further may include operations, features, means, or instructions for identifying that the second new acknowledgment feedback indicator being different than the first new acknowledgment feedback indicator for the first group-based acknowledgment feedback is interpreted as the new acknowledgment feedback indicator being toggled from the first new acknowledgment feedback indicator.

In some examples of the method, apparatuses, and non-transitory computer-readable medium described herein, the determining further may include operations, features, means, or instructions for identifying that the second new acknowledgment feedback indicator being different than the first new acknowledgment feedback indicator for the first group-based acknowledgment feedback is interpreted as the new acknowledgment feedback indicator being toggled from the first new acknowledgment feedback indicator, and formatting a first subset of feedback information associated with the first new acknowledgment feedback indicator in the first group-based acknowledgment feedback and a second subset of feedback information associated with the second new acknowledgment feedback indicator in the first group-based acknowledgment feedback.

Some examples of the method, apparatuses, and non-transitory computer-readable medium described herein may further include operations, features, means, or instructions for concatenating the first subset of feedback information and the second subset of feedback information in the first group-based acknowledgment feedback. Some examples of the method, apparatuses, and non-transitory computer-readable medium described herein may further include operations, features, means, or instructions for transmitting only a latest subset of feedback information associated with a latest received new acknowledgment feedback indicator. In some examples of the method, apparatuses, and non-transitory computer-readable medium described herein, a downlink assignment indicator field is reset upon receipt of a changed new acknowledgment feedback indicator value, and where different subsets of feedback information are determined for each reset of the downlink assignment indicator field. Some examples of the method, apparatuses, and non-transitory computer-readable medium described herein may further include operations, features, means, or instructions for identifying a first codebook entry associated with the first subset of feedback information, identifying a second codebook entry associated with the second subset of feedback information, and transmitting, to the base station, the first group-based acknowledgment feedback in the first uplink transmission based on the first codebook entry and the second codebook entry.

A method of wireless communications at a base station is described. The method may include transmitting a first downlink control information to a user equipment (UE) that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, transmitting a second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, transmitting the first downlink transmission and the second downlink transmission to the UE, and receiving at least the first group-based acknowledgment feedback from the UE in the first uplink transmission.

An apparatus for wireless communications at a base station is described. The apparatus may include a processor, memory coupled with the processor, and instructions stored in the memory. The instructions may be executable by the processor to cause the apparatus to transmit a first downlink control information to a user equipment (UE) that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, transmit a second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, transmit the first downlink transmission and the second downlink transmission to the UE, and receive at least the first group-based acknowledgment feedback from the UE in the first uplink transmission.

Another apparatus for wireless communications at a base station is described. The apparatus may include means for transmitting a first downlink control information to a user equipment (UE) that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, means for transmitting a second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, means for transmitting the first downlink transmission and the second downlink transmission to the UE, and means for receiving at least the first group-based acknowledgment feedback from the UE in the first uplink transmission.

A non-transitory computer-readable medium storing code for wireless communications at a base station is described. The code may include instructions executable by a processor to transmit a first downlink control information to a user equipment (UE) that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, transmit a second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, transmit the first downlink transmission and the second downlink transmission to the UE, and receive at least the first group-based acknowledgment feedback from the UE in the first uplink transmission.

A method of wireless communications at a UE is described. The method may include receiving a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receiving the one or more downlink transmissions of the first group of downlink transmissions, determining, based on the first downlink assignment indicator and the first new acknowledgment feedback indicator, first acknowledgment feedback associated with the first group of downlink transmissions for inclusion with the first group-based acknowledgement feedback transmission, updating the second group-based acknowledgement feedback associated with the second group of downlink transmissions based on the determining, and transmitting the first group-based acknowledgement feedback transmission to the base station.

An apparatus for wireless communications at a UE is described. The apparatus may include a processor, memory coupled with the processor, and instructions stored in the memory. The instructions may be executable by the processor to cause the apparatus to receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receive the one or more downlink transmissions of the first group of downlink transmissions, determine, based on the first downlink assignment indicator and the first new acknowledgment feedback indicator, first acknowledgment feedback associated with the first group of downlink transmissions for inclusion with the first group-based acknowledgement feedback transmission, update the second group-based acknowledgement feedback associated with the second group of downlink transmissions based on the determining, and transmit the first group-based acknowledgement feedback transmission to the base station.

Another apparatus for wireless communications at a UE is described. The apparatus may include means for receiving a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receiving the one or more downlink transmissions of the first group of downlink transmissions, determining, based on the first downlink assignment indicator and the first new acknowledgment feedback indicator, first acknowledgment feedback associated with the first group of downlink transmissions for inclusion with the first group-based acknowledgement feedback transmission, updating the second group-based acknowledgement feedback associated with the second group of downlink transmissions based on the determining, and transmitting the first group-based acknowledgement feedback transmission to the base station.

A non-transitory computer-readable medium storing code for wireless communications at a UE is described. The code may include instructions executable by a processor to receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receive the one or more downlink transmissions of the first group of downlink transmissions, determine, based on the first downlink assignment indicator and the first new acknowledgment feedback indicator, first acknowledgment feedback associated with the first group of downlink transmissions for inclusion with the first group-based acknowledgement feedback transmission, update the second group-based acknowledgement feedback associated with the second group of downlink transmissions based on the determining, and transmit the first group-based acknowledgement feedback transmission to the base station.

In some examples of the method, apparatuses, and non-transitory computer-readable medium described herein, the determining further may include operations, features, means, or instructions for determining that only the first group of downlink transmissions are to be included in the first group-based acknowledgement feedback transmission, and ignoring the second downlink assignment indicator and the second new acknowledgment feedback indicator associated with the second group of downlink transmissions.

In some examples of the method, apparatuses, and non-transitory computer-readable medium described herein, updating the second group-based acknowledgement feedback is based on the second downlink assignment indicator and the second new acknowledgment feedback indicator for transmission of a second group-based acknowledgement feedback transmission associated with the second group of downlink transmissions.

In some examples of the method, apparatuses, and non-transitory computer-readable medium described herein, the determining further may include operations, features, means, or instructions for determining that a value of the second new acknowledgment feedback indicator is different than a prior value of the second new acknowledgement feedback indicator associated with the second group of downlink transmissions from a prior downlink control information transmission from the base station, and generating a negative acknowledgment for each downlink assignment indicator associated with the second group of downlink transmissions up to the second downlink assignment indicator, where a previous downlink assignment indicator value for the second group of downlink transmissions prior to the second downlink assignment indicator is discarded.

In some examples of the method, apparatuses, and non-transitory computer-readable medium described herein, the determining further may include operations, features, means, or instructions for determining that a value of the second new acknowledgment feedback indicator is unchanged from a prior value of the second new acknowledgement feedback indicator associated with the second group of downlink transmissions from a prior downlink control information transmission from the base station, identifying one or more gaps between the second downlink assignment indicator and a previous downlink assignment indicator value associated with the second group of downlink transmissions provided with the prior downlink control information transmission from the base station, and generating a negative acknowledgment for each downlink assignment indicator associated with the one or more gaps.

Some examples of the method, apparatuses, and non-transitory computer-readable medium described herein may further include operations, features, means, or instructions for determining that both the first group of downlink transmissions and the second group of downlink transmissions are to be included in the first group-based acknowledgement feedback transmission, receiving one or more downlink transmissions of the second group of downlink transmissions, and determining second acknowledgment feedback associated with the second group of downlink transmissions for inclusion with the first group-based acknowledgement feedback transmission.

In some examples of the method, apparatuses, and non-transitory computer-readable medium described herein, the determining may include operations, features, means, or instructions for determining that both the first group of downlink transmissions and the second group of downlink transmissions are to be included in the first group-based acknowledgement feedback transmission, and determining, based on the second group of downlink transmissions having a same new acknowledgment feedback indicator value as a prior downlink control information transmission that schedules a downlink transmission of the second group of downlink transmissions, second acknowledgment feedback associated with the second group of downlink transmissions for inclusion with the first group-based acknowledgement feedback transmission.

In some examples of the method, apparatuses, and non-transitory computer-readable medium described herein, the determining further may include operations, features, means, or instructions for identifying one or more gaps between the second downlink assignment indicator and a previous downlink assignment indicator value associated with the second group of downlink transmissions provided with the prior downlink control information transmission from the base station, and generating a negative acknowledgment for each downlink assignment indicator associated with the one or more gaps.

A method of wireless communications at a UE is described. The method may include receiving a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receiving a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determining, based on the first feedback timing and the second feedback timing, that the first uplink transmission is to include both the first group-based acknowledgement feedback and the second group-based acknowledgment feedback.

An apparatus for wireless communications at a UE is described. The apparatus may include a processor, memory coupled with the processor, and instructions stored in the memory. The instructions may be executable by the processor to cause the apparatus to receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determine, based on the first feedback timing and the second feedback timing, that the first uplink transmission is to include both the first group-based acknowledgement feedback and the second group-based acknowledgment feedback.

Another apparatus for wireless communications at a UE is described. The apparatus may include means for receiving a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receiving a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determining, based on the first feedback timing and the second feedback timing, that the first uplink transmission is to include both the first group-based acknowledgement feedback and the second group-based acknowledgment feedback.

A non-transitory computer-readable medium storing code for wireless communications at a UE is described. The code may include instructions executable by a processor to receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determine, based on the first feedback timing and the second feedback timing, that the first uplink transmission is to include both the first group-based acknowledgement feedback and the second group-based acknowledgment feedback.

In some examples of the method, apparatuses, and non-transitory computer-readable medium described herein, the first set of group-based acknowledgment feedback parameters is the same as the second set of group-based acknowledgment feedback parameters.

Some examples of the method, apparatuses, and non-transitory computer-readable medium described herein may further include operations, features, means, or instructions for receiving the one or more downlink transmissions of the first group of downlink transmissions and the second group of downlink transmissions, determining the first group-based acknowledgment feedback associated with the first group of downlink transmissions and the second group-based acknowledgment feedback associated with the second group of downlink transmissions, and transmitting the first group-based acknowledgement feedback and the second group-based acknowledgment feedback to the base station in the first uplink transmission.

In some examples of the method, apparatuses, and non-transitory computer-readable medium described herein none of the first set of group-based acknowledgment feedback parameters or the second set of group-based acknowledgment feedback parameters include an explicit indication that requests feedback of another group of downlink transmissions.

In some examples of the method, apparatuses, and non-transitory computer-readable medium described herein, the determining further may include operations, features, means, or instructions for determining that both the first feedback timing the second feedback timing indicate a same uplink transmission slot.

In some examples of the method, apparatuses, and non-transitory computer-readable medium described herein, the determining further may include operations, features, means, or instructions for identifying a first request field value in the first set of group-based acknowledgment feedback parameters that indicates a request for only the first group of downlink transmissions, and a second request field value in a subsequent downlink control information transmission associated with the first group of downlink transmissions that indicates a request for both the first group of downlink transmissions and the second group of downlink transmissions, and determining that the first uplink transmission is to include both the first group-based acknowledgement feedback and the second group-based acknowledgment feedback based on the second request field value. In some examples of the method, apparatuses, and non-transitory computer-readable medium described herein, a latest received request field value is used to determine whether the first uplink transmission includes both the first group-based acknowledgement feedback and the second group-based acknowledgment feedback.

In some examples of the method, apparatuses, and non-transitory computer-readable medium described herein, the UE is not expected to receive different downlink control information transmissions that schedule downlink transmissions of different downlink transmission groups and point to a same transmission time for the first group-based acknowledgement feedback and the second group-based acknowledgment feedback.

In some examples of the method, apparatuses, and non-transitory computer-readable medium described herein when an initial received request field value indicates that the first uplink transmission is to include both the first group-based acknowledgement feedback and the second group-based acknowledgment feedback, and a subsequent received request field value indicates that only one of the first group-based acknowledgement feedback or the second group-based acknowledgment feedback is to be provided with the first uplink transmission, the UE discontinues group-based acknowledgment feedback determination for the first uplink transmission. In some examples of the method, apparatuses, and non-transitory computer-readable medium described herein the UE transmits the first group-based acknowledgement feedback and the second group-based acknowledgment feedback when at least one of the first set of group-based acknowledgment feedback parameters or the second set of group-based acknowledgment feedback parameters indicates a request for both the first group of downlink transmissions and the second group of downlink transmissions.

Some examples of the method, apparatuses, and non-transitory computer-readable medium described herein may further include operations, features, means, or instructions for receiving the one or more downlink transmissions of the first group of downlink transmissions and the second group of downlink transmissions, determining the first group-based acknowledgment feedback associated with the first group of downlink transmissions and the second group-based acknowledgment feedback associated with the second group of downlink transmissions, formatting the first group-based acknowledgment feedback and the second group-based acknowledgment feedback into a combined feedback report, and transmitting the combined feedback report to the base station in the first uplink transmission.

In some examples of the method, apparatuses, and non-transitory computer-readable medium described herein, the formatting may include operations, features, means, or instructions for appending the second group-based acknowledgment feedback to the first group-based acknowledgment feedback based on a first group index of the first group-based acknowledgment feedback having a lower index value than a second group index of the second group-based acknowledgment feedback.

In some examples of the method, apparatuses, and non-transitory computer-readable medium described herein, the formatting may include operations, features, means, or instructions for appending the second group-based acknowledgment feedback to the first group-based acknowledgment feedback based on a request for the second group-based acknowledgment feedback being received in downlink control information associated with the first group of transmissions.

A method of wireless communications at a UE is described. The method may include receiving, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receiving a downlink control information transmission from the base station having the second downlink control information format, determining, based on a predetermined value for each field of the first subset of information fields, first acknowledgment feedback associated with at least a first group of downlink transmissions, and transmitting the first acknowledgment feedback to the base station.

An apparatus for wireless communications at a UE is described. The apparatus may include a processor, memory coupled with the processor, and instructions stored in the memory. The instructions may be executable by the processor to cause the apparatus to receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receive a downlink control information transmission from the base station having the second downlink control information format, determine, based on using a predetermined value for each field of the first subset of information fields, first acknowledgment feedback associated with at least a first group of downlink transmissions, and transmit the first acknowledgment feedback to the base station.

Another apparatus for wireless communications at a UE is described. The apparatus may include means for receiving, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receiving a downlink control information transmission from the base station having the second downlink control information format, determining, based on using a predetermined value for each field of the first subset of information fields, first acknowledgment feedback associated with at least a first group of downlink transmissions, and transmitting the first acknowledgment feedback to the base station.

A non-transitory computer-readable medium storing code for wireless communications at a UE is described. The code may include instructions executable by a processor to receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receive a downlink control information transmission from the base station having the second downlink control information format, determine, based on using a predetermined value for each field of the first subset of information fields, first acknowledgment feedback associated with at least a first group of downlink transmissions, and transmit the first acknowledgment feedback to the base station.

Some examples of the method, apparatuses, and non-transitory computer-readable medium described herein may further include operations, features, means, or instructions for receiving, from the base station, an indication to enable the group-based acknowledgment feedback, and where the second set of fields of the second downlink control information format is interpreted differently based on whether the group-based acknowledgment feedback is enabled or disabled at the UE. In some examples of the method, apparatuses, and non-transitory computer-readable medium described herein, the second downlink control information format is a fallback downlink control information format.

In some examples of the method, apparatuses, and non-transitory computer-readable medium described herein, the first subset of information fields include one or more of a group indicator field, a new acknowledgment feedback indicator field, or a request field that indicates acknowledgment feedback is requested for one or more of multiple different groups of downlink transmissions.

In some examples of the method, apparatuses, and non-transitory computer-readable medium described herein, the predetermined value for the group indicator field corresponds to a downlink transmission group associated with the downlink control information transmission, the predetermined value for the new acknowledgment feedback indicator field corresponds to a prior value of the new acknowledgment feedback indicator field, the predetermined value for the request field corresponds to a value that indicates acknowledgment feedback may be not requested for another group of downlink transmissions.

In some examples of the method, apparatuses, and non-transitory computer-readable medium described herein, the determining may include operations, features, means, or instructions for formatting the first acknowledgment feedback for one or more downlink transmissions associated with the first downlink control information format separately from second acknowledgment feedback associated with a different downlink control information having the second downlink control information format. In some examples of the method, apparatuses, and non-transitory computer-readable medium described herein, a downlink assignment indicator field of the second downlink control information format may be applied separately when determining the second acknowledgment feedback.

In some examples of the method, apparatuses, and non-transitory computer-readable medium described herein, the first acknowledgment feedback includes feedback information only for downlink transmissions associated with only the first downlink control information format or only the second downlink control information format.

In some examples of the method, apparatuses, and non-transitory computer-readable medium described herein, the first acknowledgment feedback includes feedback information for downlink transmissions associated with both the first downlink control information format and the second downlink control information format.

In some examples of the method, apparatuses, and non-transitory computer-readable medium described herein, the first acknowledgment feedback includes feedback information based on one or more of a first codebook for downlink transmissions associated with the second downlink control information format, a second codebook for downlink transmissions associated with the second downlink control information format having a first group identification, or a third codebook for downlink transmissions associated with the second downlink control information format having a second group identification.

A method of wireless communications at a UE is described. The method may include receiving a first downlink control information transmission from a base station that is associated with a first group-based downlink transmission and a first acknowledgment feedback occasion, receiving a second downlink control information transmission, subsequent to the first downlink control information transmission, that is associated with a second non-group-based downlink transmission and a second acknowledgment feedback occasion, transmitting non-group-based acknowledgment feedback associated with the second non-group-based downlink transmission in the second acknowledgment feedback occasion, receiving a third downlink control information transmission, subsequent to the second downlink control information transmission, that is associated with a third group-based downlink transmission and a third acknowledgment feedback occasion, and transmitting group-based acknowledgment feedback associated with one or more or the first group-based downlink transmission or the third group-based downlink transmission in the third acknowledgment feedback occasion.

An apparatus for wireless communications at a UE is described. The apparatus may include a processor, memory coupled with the processor, and instructions stored in the memory. The instructions may be executable by the processor to cause the apparatus to receive a first downlink control information transmission from a base station that is associated with a first group-based downlink transmission and a first acknowledgment feedback occasion, receive a second downlink control information transmission, subsequent to the first downlink control information transmission, that is associated with a second non-group-based downlink transmission and a second acknowledgment feedback occasion, transmit non-group-based acknowledgment feedback associated with the second non-group-based downlink transmission in the second acknowledgment feedback occasion, receive a third downlink control information transmission, subsequent to the second downlink control information transmission, that is associated with a third group-based downlink transmission and a third acknowledgment feedback occasion, and transmit group-based acknowledgment feedback associated with one or more or the first group-based downlink transmission or the third group-based downlink transmission in the third acknowledgment feedback occasion.

Another apparatus for wireless communications at a UE is described. The apparatus may include means for receiving a first downlink control information transmission from a base station that is associated with a first group-based downlink transmission and a first acknowledgment feedback occasion, receiving a second downlink control information transmission, subsequent to the first downlink control information transmission, that is associated with a second non-group-based downlink transmission and a second acknowledgment feedback occasion, transmitting non-group-based acknowledgment feedback associated with the second non-group-based downlink transmission in the second acknowledgment feedback occasion, receiving a third downlink control information transmission, subsequent to the second downlink control information transmission, that is associated with a third group-based downlink transmission and a third acknowledgment feedback occasion, and transmitting group-based acknowledgment feedback associated with one or more or the first group-based downlink transmission or the third group-based downlink transmission in the third acknowledgment feedback occasion.

A non-transitory computer-readable medium storing code for wireless communications at a UE is described. The code may include instructions executable by a processor to receive a first downlink control information transmission from a base station that is associated with a first group-based downlink transmission and a first acknowledgment feedback occasion, receive a second downlink control information transmission, subsequent to the first downlink control information transmission, that is associated with a second non-group-based downlink transmission and a second acknowledgment feedback occasion, transmit non-group-based acknowledgment feedback associated with the second non-group-based downlink transmission in the second acknowledgment feedback occasion, receive a third downlink control information transmission, subsequent to the second downlink control information transmission, that is associated with a third group-based downlink transmission and a third acknowledgment feedback occasion, and transmit group-based acknowledgment feedback associated with one or more or the first group-based downlink transmission or the third group-based downlink transmission in the third acknowledgment feedback occasion.

Some examples of the method, apparatuses, and non-transitory computer-readable medium described herein acknowledgment feedback associated with the second acknowledgment feedback occasion may be not retransmitted in the third acknowledgment feedback occasion.

In some examples of the method, apparatuses, and non-transitory computer-readable medium described herein, a new acknowledgment feedback indicator (NFI) may be assumed to be toggled between the first acknowledgment feedback occasion and the third acknowledgment feedback occasion.

Some examples of the method, apparatuses, and non-transitory computer-readable medium described herein may further include operations, features, means, or instructions for determining that a new acknowledgment feedback indicator (NFI) may be toggled between the first acknowledgment feedback occasion and the third acknowledgment feedback occasion based on a difference in a first NFI value provided in the first downlink control information and a second NFI value provided in the third downlink control information.

DETAILED DESCRIPTION

Figure 1:
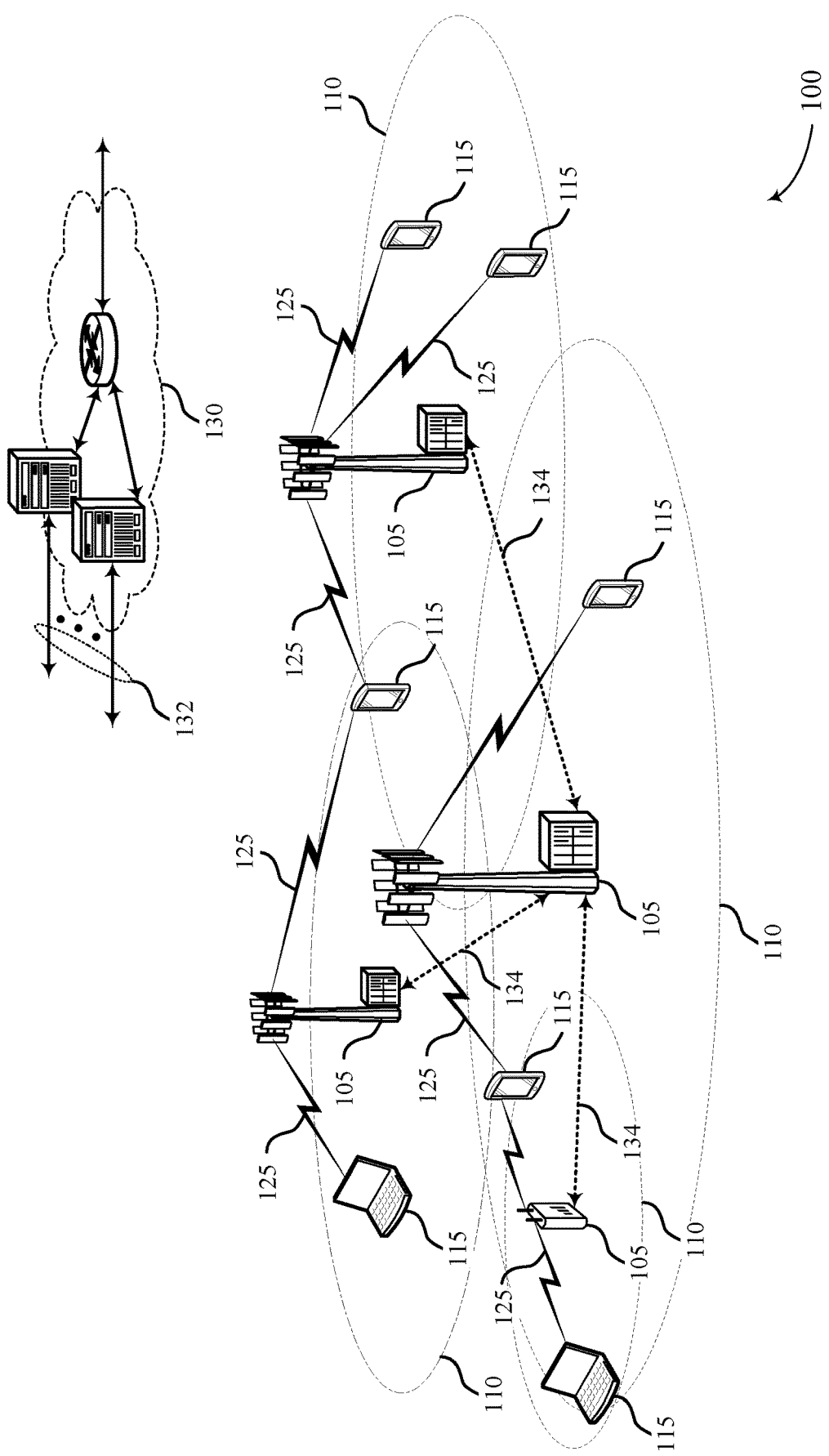
FIG. 1 illustrates an example of a system for wireless communications that supports group-based acknowledgment feedback techniques for wireless communications in accordance with aspects of the present disclosure.

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient group-based feedback reporting, in which feedback for a number of different downlink transmissions may be provided by a user equipment (UE) to a base station in a wireless communications system. In some cases, two or more different groups of downlink transmissions may each have an associated group-based acknowledgment feedback. In some cases, a base station may transmit downlink control information (DCI) to a UE that indicates one or more parameters that are used to determine which downlink transmissions are to be reported in the group-based feedback. Based on the parameters in the DCI, the UE may determine the feedback to be reported, and a timing for when to transmit the feedback to the base station.

In some cases, multiple instances of DCI may be used to determine the feedback to be reported by the UE, and techniques discussed herein provide UE actions when one or more parameters (e.g., a new acknowledgment feedback indicator (NFI) that indicates a downlink assignment indicator (DAI) counter is reset) change values in the multiple instances of DCI that are each associated with a same group-based feedback report. In some cases, if two or more DCIs indicate a same uplink slot for a group-based acknowledgment feedback transmission, and also have different NFI values, the UE may treat it as an error case and the group-based acknowledgment feedback transmission may not be transmitted. In other cases, the UE may consider the NFI not to be toggled in the DCIs, and may use the NFI provided in an initial DCI, a last DCI, or a majority rule among NFI values on received DCIs. In other cases, multiple feedback codebooks may be determined for the group of downlink transmission for each instance that the NFI is toggled, and one or more of the multiple feedback codebooks transmitted as the group-based acknowledgment feedback.

In some cases, various techniques discussed herein provide that one or more instances of DCI may provide parameters for multiple different groups of downlink transmissions (e.g., NFI, DAI, or both, may be provided for each of two groups of downlink transmissions). In some cases, one or more DCI transmissions may include a first DAI value for a first downlink transmission group associated with the DCI (i.e., the DCI includes scheduling information for a first downlink transmission of the first downlink transmission group), and may include a second DAI value for a second downlink transmission group that does not have any downlink transmissions scheduled by the DCI. In some cases, one or more DCIs may also include NFI values associated with both the first and second downlink transmission groups. In such cases, a UE may update the DAI and NFI of the second group and, if feedback is requested for the second group, generate a feedback codebook based on the DAI and NFI and transmit the feedback to the base station. In some cases, DCIs may include a DAI for the second group but not an NFI for the second group, in which cases the UE may assume that the NFI for the second group is equal to a previous NFI value for the second group.

In some aspects of the present disclosure, downlink control information may indicate that feedback is requested for multiple different groups of downlink transmissions, and feedback for the multiple groups may be appended together and transmitted to the base station. In some cases, a request bit may be included with DCI transmissions, and may indicate whether feedback is requested for only the downlink transmission group associated with the DCI, or whether feedback is also requested for one or more other downlink transmission groups. In other cases, a request bit may not be included with DCI transmissions, and the UE may determine that feedback for multiple groups is requested based on multiple DCIs that are associated with different downlink transmission groups that each indicate a same uplink transmission time (e.g., a same uplink slot) for the acknowledgement feedback transmission. In some cases, when a request bit is included with DCI, a UE may determine that a value of the request bit changes in different DCI transmissions. In such cases, the UE may use the value of the indicator of the latest DCI, or may determine that an error case exists and not transmit the feedback transmission. In some cases, if at least one DCI includes the request bit that indicates feedback for multiple groups is requested, the UE may transmit feedback for the multiple groups. In some cases, the UE may not be expected to receive DCIs scheduling downlink transmissions that belong to different downlink transmission groups and point to a same uplink transmission time for transmission of the feedback reports, and thus base stations may be prohibited from transmitting such DCIs. In cases where feedback reports for two or more downlink transmission groups are transmitted, the UE may append codebooks for each group together for transmission, such as based on a group index of the downlink transmission groups or based on which group is associated with the DCI that requests the feedback (e.g., if the DCI is for a first group and also requests feedback for a second group, the feedback for the first group is determined and the feedback for the second group is appended thereto for transmission).

In further aspects of the present disclosure, a DCI format may be associated with group-based feedback transmissions and may include the one or more parameters for group-based feedback (e.g., DCI format 1_1). In some cases, a fallback DCI format (e.g., DCI format 1_0) may also be used to indicate group-based feedback transmissions, and parameters associated with the group-based feedback may be determined from other parameters in the fallback DCI that may be reused, may be set to predetermined values, or combinations thereof. In some cases, if group-based acknowledgment feedback is enabled at a UE (e.g., through radio resource control (RRC) signaling), and the UE receives the fallback DCI, one or more existing fields of the fallback DCI may be interpreted to provide group-based feedback parameters (e.g., based on a set of predefined rules). Additionally or alternatively, the UE may assume a fixed value for one or more group-based feedback parameters. In other cases, feedback reports corresponding to downlink transmissions scheduled by fallback DCIs may be constructed separately from feedback reports corresponding to downlink transmissions scheduled by non-fallback DCIs.

In some cases, a first set of group-based DCIs may be associated with a first feedback opportunity, a second set of fallback DCIs may be associated with a second feedback opportunity, and a third set of group-based DCIs may be associated with a third feedback opportunity. In such cases, the second feedback opportunity may include feedback only for the non-group-based transmissions associated with the second set of fallback DCIs, and the third feedback opportunity may include feedback for any of the transmissions associated with the first set of group-based DCIs or the third set of group-based DCIs (but not for transmissions associated with the second set of fallback DCIs). In some cases, the UE may assume an NFI associated with the third set of group-based DCIs is toggled relative to the NFI of the first set of group-based DCIs. In other cases, a difference in a value of one or more NFIs of the first set of group-based DCIs and one or more NFIs of the third set of group-based DCIs may be used to determine if the NFI is toggled.

In some cases, techniques as discussed herein may be used in a wireless communications system that supports communications in an unlicensed spectrum (e.g., a shared radio frequency spectrum band), licensed spectrum, or a combination of licensed and unlicensed spectrums. In such systems, one or more transmissions may not be successfully received due to interference from a hidden node, or may not be transmitted due to a listen-before-talk (LBT) procedure failure. Accordingly, the acknowledgment feedback may not include feedback for one or more missed feedback process IDs (e.g., due to interference, LBT failure, etc.). Group-based feedback reports may be used in such cases, which allow the UE to transmit feedback for all of the feedback processes that are configured at the UE. Thus, techniques such as discussed herein may allow for efficient acknowledgment feedback that may help reduce latency and enhance overall system throughput in a wireless communication system.

Aspects of the disclosure are initially described in the context of a wireless communications system. Additional aspects of the disclosure are then described with respect to several techniques for group-based acknowledgment feedback. Aspects of the disclosure are further illustrated by and described with reference to apparatus diagrams, system diagrams, and flowcharts that relate to group-based acknowledgment feedback techniques for wireless communications.

FIG. 1 illustrates an example of a wireless communications system 100 that supports group-based acknowledgment feedback techniques for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, UEs 115 and base stations 105 may support retransmissions of data to increase the likelihood that data is received successfully. HARQ feedback such as discussed herein is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support group-based acknowledgment feedback in which HARQ feedback for one or more groups of downlink transmissions may be transmitted from a UE 115 to a base station 105 in a single uplink communication. Various techniques described herein enable efficient group-based acknowledgment feedback reporting, in which feedback for a number of different downlink transmissions may be provided by a UE 115 to a base station 105.

Figure 2:
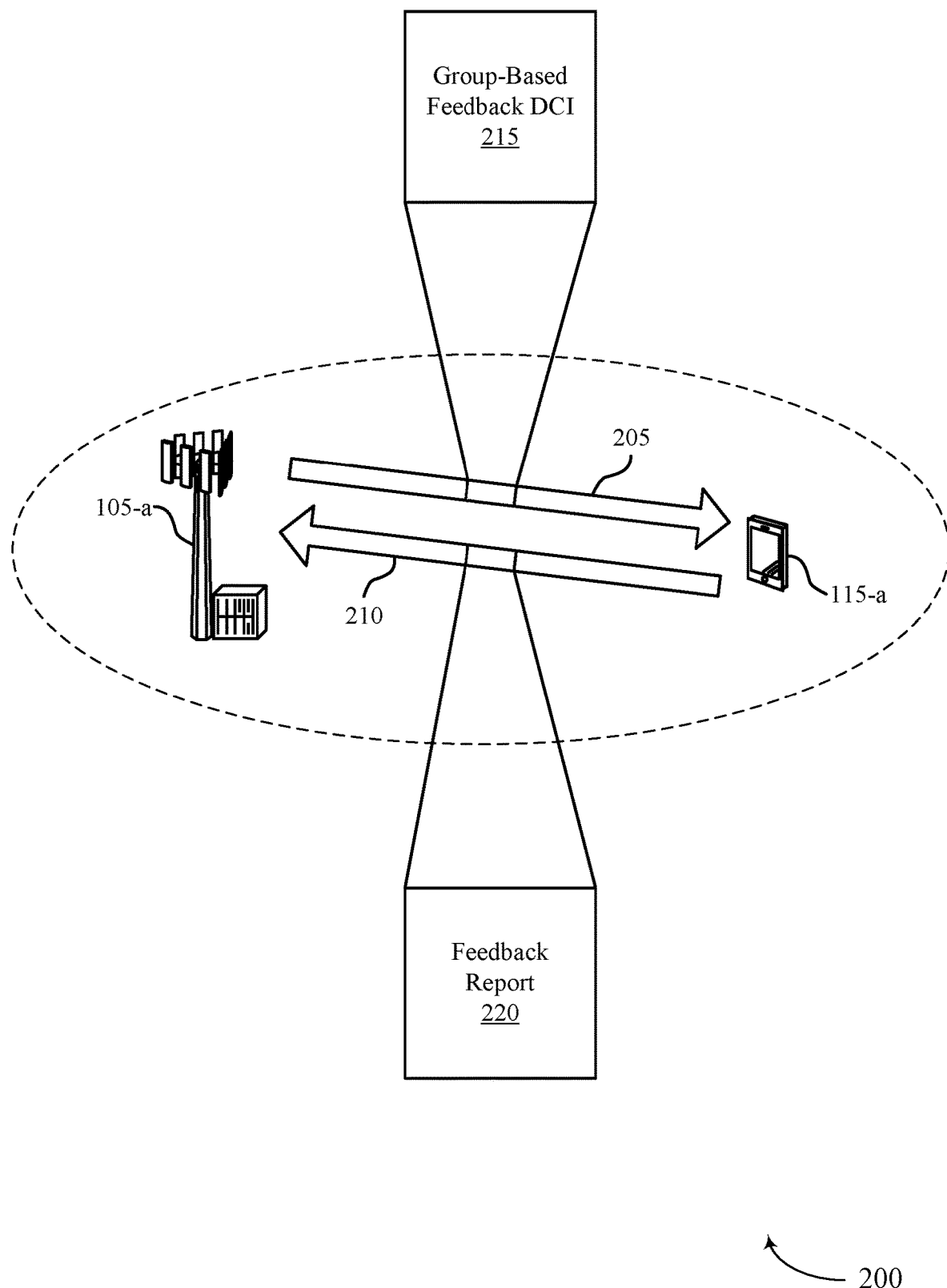
FIG. 2 illustrates an example of a portion of a wireless communications system that supports group-based acknowledgment feedback techniques for wireless communications in accordance with aspects of the present disclosure.

FIG. 2 illustrates an example of a wireless communications system 200 that supports group-based acknowledgment feedback techniques for wireless communications in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115 as described with reference to FIG. 1.

As described herein, base station 105-*a* and UE 115-*a* may employ HARQ feedback techniques to indicate whether data has been received correctly at UE 115-*a*. For example, base station 105-*a* may transmit one or more downlink messages to UE 115-*a* on resources of a carrier 205. Accordingly, UE 115-*a* may transmit an indication of whether the one or more downlink messages were received and decoded correctly on resources of a carrier 210. In some cases, carriers 205 and 210 may be the same carrier. In some cases, carriers 205 and 210 may be component carriers (CCs), and a number of different CCs may be used for communications between the UE 115-*a* and the base station 105-*a*. In some cases, carriers 205 and 210 may use licensed spectrum, shared or unlicensed spectrum, or combinations thereof. When using unlicensed or shared spectrum, the UE 115-*a* and base station 105-*a* may use a contention-based access technique (e.g., an LBT procedure) to determine if a channel is available prior to initiating transmissions.

In this example, base station 105-*a* may transmit a group-based feedback DCI 215 on carrier 205, and UE 115-*a* responds with feedback report 220 on carrier 210. The group-based feedback DCI 215 may be included in a downlink or uplink grant (e.g., downlink message such as a physical downlink control channel (PDCCH) transmission), or UE 115-*a* may be explicitly triggered to transmit feedback report 220 (e.g., in a separate DCI message). When group-based feedback DCI 215 is present, UE 115-*a* may be indicated, by base station 105-*a*, to provide the feedback report 220 based on one or more group-based feedback parameters. For example, the base station 105-*a* may configure the UE 115-*a* for group-based feedback, and the UE 115-*a* may prepare and transmit feedback report 220 based on the group-based feedback configuration.

In some cases, the wireless communications system 200 may operate in an NR system, which may allow for two modes of transmission of a HARQ-ACK codebook, which may include a semi-static (e.g., Type 1) mode, and a dynamic (e.g., Type 2) mode. A dynamic feedback mode may allow for grouping of multiple downlink transmissions (e.g., physical downlink shared channel (PDSCH) grouping for one or more PDSCH groups) by signaling a feedback parameters that provides a group identification (e.g., a group index may be provided in a DCI scheduling a PDSCH transmission). In some cases, such feedback parameters may include an indication of an uplink transmission timing (e.g., a value of K1 that indicates a number of slots between a downlink transmission and a slot that is to include the feedback report 220). In some cases, a non-numerical value of uplink transmission timing (e.g., a non-numeric K1) that may indicate that the feedback report 220 is to be transmitted responsive to a trigger event (e.g., a trigger from the base station 105-*a*). In cases of numeric or non-numeric uplink transmission timing, a number of feedback bits (e.g., HARQ ACK/NACK indications for downlink transport blocks (TBs)/code block groups (CBGs)) can change between successive requests for acknowledgment feedback for the same downlink transmission group. In some cases, the feedback report 220 may carry feedback in a same uplink transmission (e.g., a same physical uplink control channel (PUCCH) transmission) for each of a number of different downlink transmissions in a downlink transmission group. Further, in some cases, a single group-based feedback DCI 215 may request acknowledgment feedback for one or more downlink transmission groups in a same feedback report 220.

In some cases, the group-based feedback DCI 215 may include an indication of one or more downlink assignment index (DAI) that may provide a counter of downlink assignments (e.g., TB or CBG downlink transmissions) that are to be reported in a feedback report 220. In some cases, the DAIs may include a counter DAI (cDAI) that may indicate an accumulated number of downlink transmissions within each downlink transmission group. In some cases, the cDAI may count up using a modulo four operation (e.g., the cDAI value may be provided using two bits, in which the UE 115-*a* and base station 105-*a* may determine the cDAI based on whether the bits have rolled-over due to the modulo operation). In some cases, the DAIs may also include a total DAI (tDAI), that may indicate a total number of DAIs across multiple component carriers or downlink transmission groups, which may also use a modulo operation as discussed with the cDAI. The tDAI may thus provide an indication of whether the UE 115-*a* may have missed a DCI for a carrier. In some cases, the tDAI may be provided only for the scheduled downlink transmission group. In other cases, the tDAI may be provided for each downlink transmission group irrespective of whether the DCI has scheduling information for a group. In some cases, the feedback parameters may also include a new acknowledgment feedback indicator (NFI) for each downlink transmission group which may operate as a toggle bit that, when toggled, indicates the DAI for the downlink transmission group is to be reset. In some cases, the UE 115-*a* may provide a capability report to the base station 105-*a* that indicates a capability of the UE to support group-based acknowledgment feedback.

When providing the feedback report 220, in some cases, the UE 115-*a* may determine a feedback codebook that is reported to the base station 105-*a* to indicate ACK/NACK for each associated downlink transmission (e.g., for each scheduled TB/CBG) that is to be reported at the associated uplink transmission time. In some cases, the codebook may be determined based on PDCCH monitoring occasions (e.g., based on configuration of different search space (SS) sets in different serving cells, as a union of PDCCH monitoring occasions across active downlink bandwidth parts (BWPs) of configured serving cells, ordered in ascending order of start time of the SS set associated with a PDCCH monitoring occasion). If two SS sets (of the same or different serving cells) have the same start time, it is counted as one PDCCH monitoring occasion. The feedback codebook may also be determined based on the DAIs that are received via DCI transmissions where, if a DCI is not missed, an ACK/NACK bit corresponding to the received PDSCH is placed in the codebook in the same order as cDAI. If a DCI is missed, a NACK is placed in the codebook in the same order as the missed cDAI. In some cases, the UE 115-*a* may determine if a DCI is missed by comparing consecutive cDAI values (e.g., consecutive cDAI values of 0, 1, 3 means that a DCI with cDAI value of 2 is missed). In cases where tDAI is transmitted, the UE 115-*a* may determine if a DCI is missed by comparing tDAI with cDAI of all DCIs in the same PDCCH monitoring occasion (e.g., for two serving cells in a given PDCCH monitoring occasion, if only one DCI with (cDAI,tDAI)=(1,2) is received, this means that the second DCI is missed). As indicated, the UE 115-*a* may insert a NACK in the feedback report 220 for each missed DCI according to an order of the DAIs.

As will be discussed in more detail with reference to FIGS. 3 through 8, in various examples different group-based feedback parameters may be provided in one or more group-based feedback DCIs 215. The feedback report 220 may include group-based acknowledgment feedback in accordance with various discussed techniques for one or more groups of downlink transmissions based on the group-based feedback parameters. In cases where feedback is provided for two or more groups of downlink transmissions, feedback information may be multiplexed together in a single feedback report 220 in an uplink communication from the UE 115-*a* to the base station 105-*a*.

Figure 3:
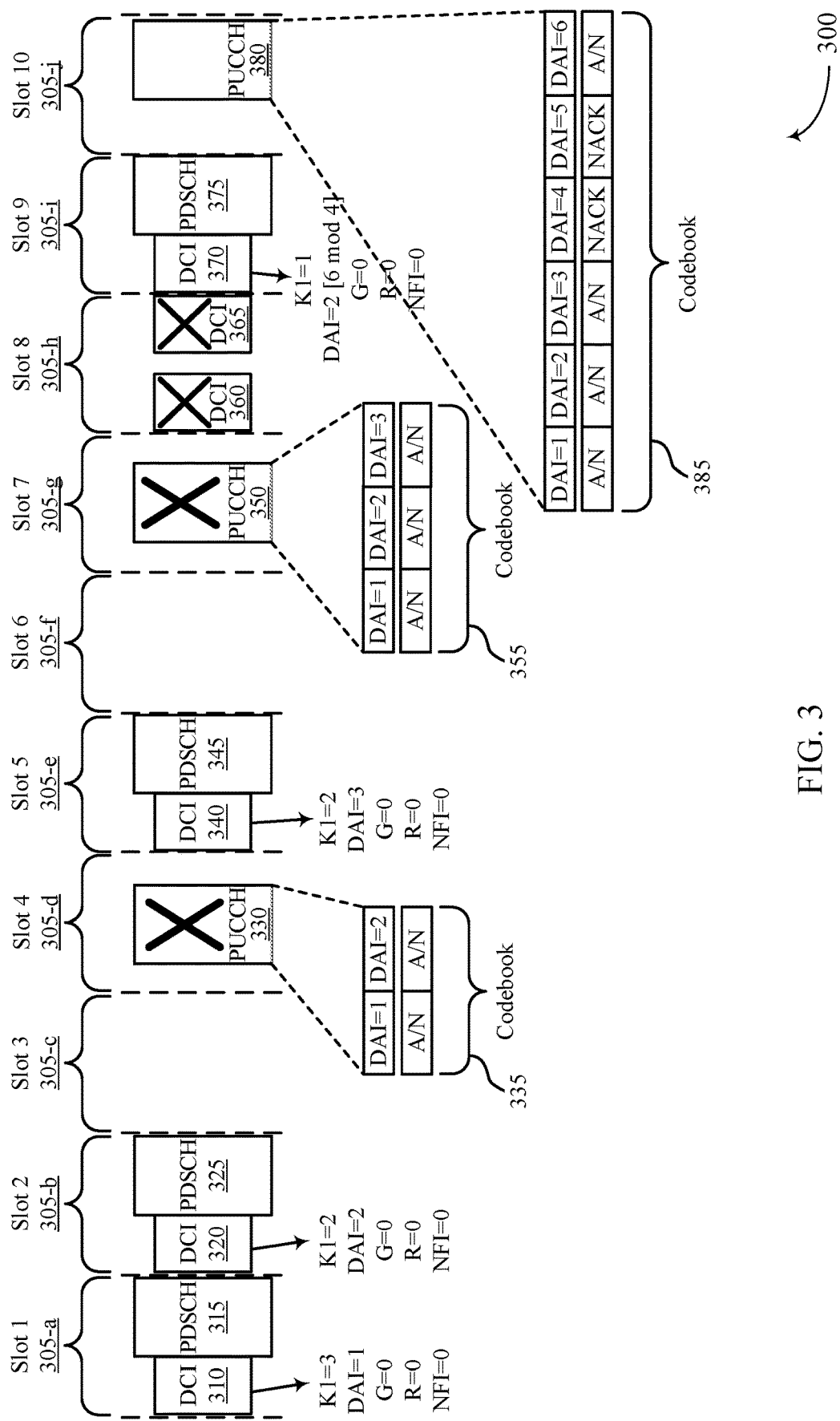
FIGS. 3 through 8 illustrate examples of feedback timelines that support group-based acknowledgment feedback techniques for wireless communications in accordance with aspects of the present disclosure.

FIG. 3 illustrates an example of a feedback timeline 300 that supports group-based acknowledgment feedback techniques for wireless communications in accordance with aspects of the present disclosure. In some examples, feedback timeline 300 may implement aspects of wireless communications system 100 or 200. In this example, a number of transmission slots 305 are illustrated, including a first transmission slot 305-*a* through a tenth transmission slot 305-*j*. In some cases, transmissions using transmission slots 305 may use licensed spectrum, unlicensed spectrum, or combinations thereof.

In this example, a first DCI 310 may be transmitted in the first slot 305-*a*, that may include downlink scheduling information for an associated PDSCH transmission 315 in the first slot 305-*a*. In this example, the first DCI 310 may include group-based feedback parameters, including a timing value, K1, provided in a PDSCH-to-HARQ feedback timing indicator field that indicates a number of slots between the associated PDSCH and when the acknowledgment feedback is to be transmitted. In this case K1 indicates that the associated acknowledgment feedback is to be provided three slots (e.g., K1=3) after the first slot 305-*a* (e.g., in fourth slot 305-*d*). In this example the first DCI 310 may also indicate a DAI value of one (DAI=1) which may correspond to a cDAI value that indicates the DAI is for an initial acknowledgment feedback indicator to be included in an acknowledgment codebook. In some cases, the first DCI 310 may also include a tDAI value (e.g., in cases where downlink carrier aggregation is enabled), which is not illustrated in this example for purposes of simplicity. In this example the first DCI 310 also indicates a group index (G) that identifies an associated downlink transmission group of the first DCI 310 and associated PDSCH transmission 315. The first DCI 310 also includes a request indicator (R) that indicates whether a feedback report is requested for only the same group that is associated with the DCI (i.e., group 0) or a feedback report is also requested for another group (e.g., R=0 indicates feedback for only the same group is requested; and R=1 indicates feedback for the other group is also requested). The first DCI 310, in this example, also includes an NFI that is a single-bit indicator associated with the group of the first DCI 310 that, if toggled, means that the corresponding group is reset (i.e., DAI is reset, which implies that the previous HARQ-ACK feedback is correctly received by the base station).

In the example of FIG. 3, a second DCI 320 may schedule a second PDSCH transmission 325 in second slot 305-*b*. In this example, the second DCI 320 includes group-based feedback parameters of K1=2 (i.e., that the associated acknowledgment feedback is to be provided in the fourth slot 305-*d*), DAI=2 (i.e., the next consecutive DAI count indicating that one or more DAIs have not been missed), G=0 (i.e., for the same group as the first DCI 310 and first PDSCH transmission 315), R=0 (i.e., that feedback for another group is not requested), and NFI=0 (i.e., that the DAI has not been reset based on not being toggled from the prior DCI). In this example, a third slot 305-c may not include any transmissions associated with the particular UE, and the fourth slot 305-d may include resources for an uplink transmission, namely a PUCCH transmission 330, for reporting of the group-based acknowledgment feedback.

As discussed herein, a UE receiving downlink transmissions of the downlink transmission group may format a feedback codebook 335 that includes bits associated with each DAI indicated in the received DAI fields. Thus, in this example, feedback codebook 335 includes an ACK/NACK bit associated with DAI=1 of the first slot 305-a, and a second ACK/NACK bit associated with DAI=2 of the second slot 305-b. In this example, the PUCCH transmission 330 may not be successfully received at the base station. For example, interference or low channel quality between the UE and base station may have prevented the base station from successfully receiving and decoding the PUCCH transmission 330. In some cases, the UE and base station may operate in shared or unlicensed spectrum, and the PUCCH transmission 330 may not be received due to an unsuccessful contention-based channel access procedure (e.g., a LBT procedure failure) that did not allow the UE to send PUCCH transmission 330.

In this example, the base station may determine that the PUCCH transmission 330 is not successfully received, and may thus maintain DCI parameters for group-based acknowledgment feedback in order to obtain the feedback associated with the first slot 305-a and the second slot 305-b. In this example, in fifth slot 305-e, the base station may transmit a third DCI 340 for an associated third PDSCH transmission 345. In this example, the third DCI 340 includes group-based feedback parameters of K1=2 (i.e., that the associated acknowledgment feedback is to be provided in the seventh slot 305-g), DAI=3 (i.e., the next consecutive DAI count indicating that one or more DAIS have not been missed), G=0 (i.e., for the same group as the first DCI 310 and first PDSCH transmission 315), R=0 (i.e., that feedback for another group is not requested), and NFI=0 (i.e., that the DAI has not been reset based on not being toggled from the prior DCI). In this example a sixth slot 305-f may not include any transmissions associated with the particular UE, and the seventh slot 305-g may include resources for a second PUCCH transmission 350, for reporting of the group-based acknowledgment feedback.

The UE may again determine feedback, which in this case includes feedback for the PDSCH transmissions 315, 325, and 345, and format a second feedback codebook 355 that includes bits associated with each DAI indicated in the received DAI fields. Thus, in this example, second feedback codebook 355 includes an ACK/NACK bit associated with DAI=1 of the first slot 305-a, a second ACK/NACK bit associated with DAI=2 of the second slot 305-b, and a third ACK/NACK bit associated with DAI=3 of the fifth slot 305-e. In this example, the PUCCH transmission 350 again may not be successfully received at the base station (e.g., due to interference, LBT failure, etc.). Further, the base station may attempt to transmit a fourth DCI 360 and a fifth DCI 365 in an eighth slot 305-h, which may not be successfully received and decoded at the UE.

Thus, when the base station in ninth slot 305-i transmits a sixth DCI 370 and associated fourth PDSCH transmission 375 that are successfully received at the UE, the associated feedback parameters may be used to determine that the UE missed fourth DCI 360 and a fifth DCI 365. In this case, the sixth DCI 370 includes group-based feedback parameters of K1=1 (i.e., that the associated acknowledgment feedback is to be provided in the tenth slot 305-j), DAI=2 (i.e., that indicates six DAIs due to the modulo 4 operation, and that indicates that the fourth and fifth DAIs are missed due to the NFI not being toggled), G=0 (i.e., for the same group as the prior DCI/PDSCH transmissions), R=0 (i.e., that feedback for another group is not requested), and NFI=0 (i.e., that the DAI has not been reset based on not being toggled from the prior DCI).

In this example the tenth slot 305-j may include uplink resources for a PUCCH transmission 380 with the group-based feedback report. In this example, based on the feedback parameters of the various DCIs, the UE may determine a third feedback codebook 385 that provides ACK/NACK indications for each DAI associated with received DCIs, namely for DAIs 1 through 3, provides NACK indications for each DAI that was missed at the UE associated with the fourth DCI 360 and fifth DCI 365, and provides an ACK/NACK indication for the sixth DAI associated with the sixth DCI 370.

Thus, in this example, even though multiple failures of uplink and downlink transmission were experienced, the UE is able to provide all of the associated feedback in the third feedback codebook 385. The base station, assuming that the third feedback codebook 385 is successfully received and decoded, may then toggle the NFI and reset the DAI to one for a subsequent DCI for a subsequent group-based feedback report.

Figure 4:
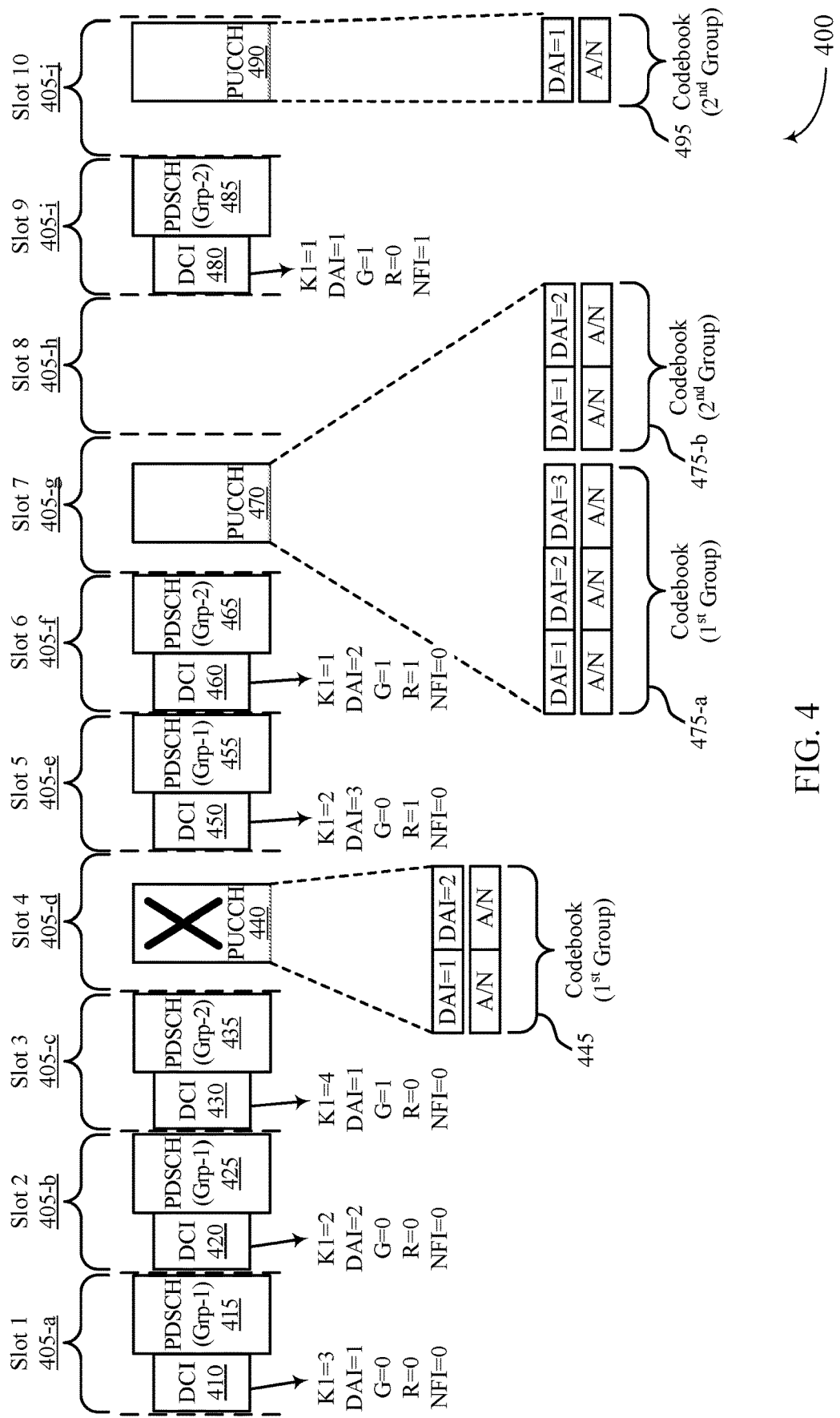

FIG. 4 illustrates an example of a feedback timeline 400 with multiple groups that supports group-based acknowledgment feedback techniques for wireless communications in accordance with aspects of the present disclosure. In some examples, feedback timeline 400 may implement aspects of wireless communications system 100 or 200. In this example, a number of transmission slots 405 are illustrated, including a first transmission slot 405-a through a tenth transmission slot 405-j. In some cases, transmissions using transmission slots 405 may use licensed spectrum, unlicensed spectrum, or combinations thereof.

In this example, a first DCI 410 may be transmitted in the first slot 405-a, that may include downlink scheduling information for an associated first PDSCH transmission 415 of a first group in the first slot 405-a. In this example, the first DCI 410 may include group-based feedback parameters, K1=3 (i.e., that indicates the associated acknowledgment feedback is to be provided in fourth slot 405-d), DAI=1 (i.e., that indicates the DAI is for an initial acknowledgment feedback indicator to be included in an acknowledgment codebook), G=0 (i.e., that identifies first downlink transmission group), R=0 (i.e., a feedback report is requested for only the same group that is associated with the DCI), and NFI=0.

In the example of FIG. 4, a second DCI 420 may schedule a second PDSCH transmission 425 of the first downlink transmission group in second slot 405-b. In this example, the second DCI 420 includes group-based feedback parameters of K1=2 (i.e., that the associated acknowledgment feedback is to be provided in the fourth slot 405-d), DAI=2 (i.e., the next consecutive DAI count indicating that one or more DAIs have not been missed), G=0 (i.e., for the same group as the first DCI 410 and first PDSCH transmission 415), R=0 (i.e., that feedback for another group is not requested), and NFI=0 (i.e., that the DAI has not been reset based on not being toggled from the prior DCI).

In this example a third slot 405-c may include a third DCI 430 associated with a third PDSCH transmission 435 of a second downlink transmission group. In this example, the third DCI 430 includes group-based feedback parameters of K1=4 (i.e., that the associated acknowledgment feedback is to be provided in the seventh slot 405-*g*), DAI=1 (i.e., an initial DAI for the second group), G=1 (i.e., for the second group, which is different than the group of the first DCI 410 and second DCI 420, R=0 (i.e., that feedback for another group is not requested), and NFI=0.

The UE receiving the downlink transmissions may format a feedback codebook 445 for transmission in PUCCH transmission 440 that, in this example, includes bits associated with each DAI of the first group of downlink transmissions as indicated in the received feedback parameters. Thus, in this example, feedback codebook 445 is for the first group, and includes an ACK/NACK bit associated with DAI=1 of the first slot 405-*a*, and a second ACK/NACK bit associated with DAI=2 of the second slot 405-*b*. In this example, the PUCCH transmission 440 may not be successfully received at the base station (e.g., due to interference, failed LBT, etc.).

In this example, the base station may determine that the PUCCH transmission 440 is not successfully received, and may thus maintain DCI parameters of the first group for group-based acknowledgment feedback in order to obtain the feedback associated with the first slot 405-*a* and the second slot 405-*b*. In this example in fifth slot 405-*e*, associated with the first downlink transmission group, the base station may transmit a fourth DCI 450 for an associated fourth PDSCH transmission 455. In this example, the fourth DCI 450 includes group-based feedback parameters of K1=2 (i.e., that the associated acknowledgment feedback is to be provided in the seventh slot 405-*g*), DAI=3 (i.e., the next consecutive DAI count indicating that one or more DAIs have not been missed), G=0 (i.e., for the same group as the first DCI 410 and first PDSCH transmission 415), R=1 (i.e., that feedback for both the first group and the second group is requested), and NFI=0 (i.e., that the DAI has not been reset based on not being toggled from the prior DCI).

In this example, in sixth slot 405-*f* associated with the second group of downlink transmissions, the base station may transmit a fifth DCI 460 for an associated fifth PDSCH transmission 465. In this example, the fifth DCI 460 includes group-based feedback parameters of K1=1 (i.e., that the associated acknowledgment feedback is to be provided in the seventh slot 405-*g*), DAI=2 (i.e., the next consecutive DAI count of the second group indicating that one or more DAIs have not been missed), G=1 (i.e., for the second downlink transmission group), R=1 (i.e., that feedback for both the first group and the second group is requested), and NFI=0 (i.e., that the DAI has not been reset based on not being toggled from the prior DCI).

The seventh slot 405-*g* may include resources for a second PUCCH transmission 470, for reporting of the group-based acknowledgment feedback. In this case, the UE may again determine feedback, which in this case includes feedback for both the first group and the second group of downlink transmissions. In this example, the UE may format a first sub-codebook 475-*a* for the first group (i.e., for PDSCH transmissions 415, 425, and 455), and format a second sub-codebook 475-*b* for the second group (i.e., for PDSCH transmissions 435, and 465). Each sub-codebook 475 includes bits associated with each DAI indicated in the received DAI fields for the associated group. Thus, in this example, first sub-codebook 475-*a* includes an ACK/NACK bit associated with first group DAI=1 of the first slot 405-*a*, a second ACK/NACK bit associated with first group DAI=2 of the second slot 405-*b*, and a third ACK/NACK bit associated with first group DAI=3 of the fifth slot 405-*e*. Further, the second sub-codebook 475-*b* includes an ACK/NACK bit associated with second group DAI=1 of the third slot 405-*c*, and a second ACK/NACK bit associated with second group DAI=2 of the sixth slot 405-*f*.

In this example, the second PUCCH transmission 470 may be successfully received, and the base station may toggle the NFI field for both groups and reset the associated DAI for each group. In this example, a sixth DCI 480 and sixth PDSCH transmission 485 associated with the second group may be transmitted in ninth slot 405-*i*. The sixth DCI 480 may include feedback parameters K1=1, DAI=1, G=1, R=0, and NFI=1, which may indicate to the UE to transmit third PUCCH transmission 490 with an acknowledgment feedback report having codebook 495 for the second group only, with a single ACK/NACK associated with the sixth PDSCH transmission 485.

Figure 5:
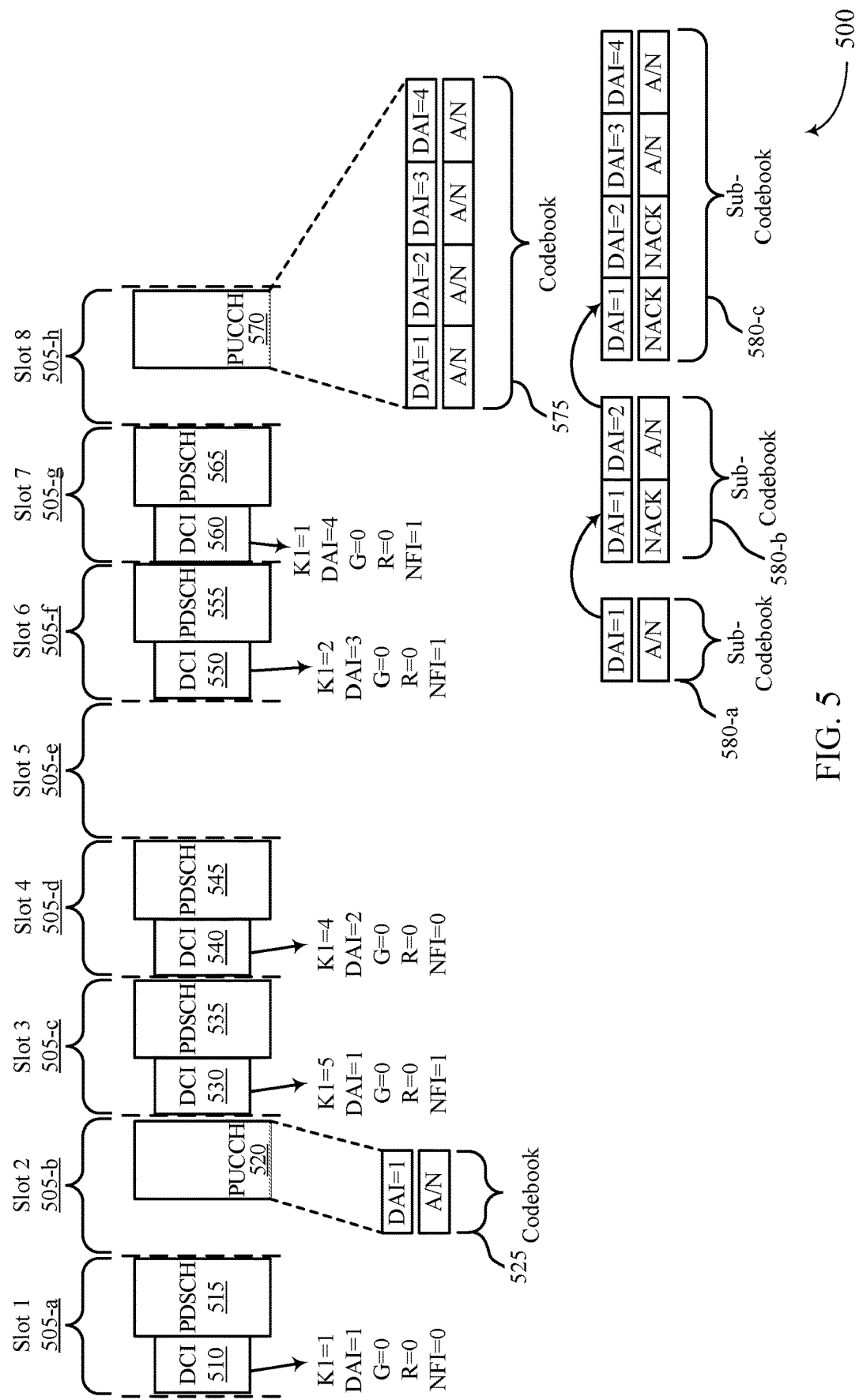

FIG. 5 illustrates an example of a feedback timeline 500 that supports group-based acknowledgment feedback techniques for wireless communications in accordance with aspects of the present disclosure. In some examples, feedback timeline 500 may implement aspects of wireless communications system 100 or 200. In this example, a number of transmission slots 505 are illustrated, including a first transmission slot 505-*a* through an eighth transmission slot 505-*h*. In some cases, transmissions using transmission slots 505 may use licensed spectrum, unlicensed spectrum, or combinations thereof.

In this example, a value of an NFI parameter may be toggled within one feedback opportunity. As discussed herein, the NFI parameter may be used to indicate a reset of an associated DAI counter for a PDSCH group for feedback transmitted on different PUCCH transmissions. For example, as discussed in the examples of FIGS. 3 and 4, when a previous feedback on PUCCH is correctly received at the base station, NFI is toggled to indicate the group (i.e., DAI for the group) is reset. If NFI is not toggled, the DAI for the group continues (i.e., the codebook for the group becomes larger for the next PUCCH transmission with a feedback report for the group). In this example, NFI is toggled within one acknowledgment feedback transmission opportunity (i.e., within the downlink DCIs that have a K1 value pointing to the same slot for transmission of acknowledgment feedback for a same group). In some cases, a single codebook per downlink transmission group may be transmitted, irrespective of whether the NFI is toggled within the acknowledgment feedback transmission opportunity. In some cases, the UE is not expected to handle such a case, and in the event that the UE detects a toggled NFI within an acknowledgment feedback transmission opportunity, the associated PUCCH is not transmitted, and for the next acknowledgment feedback transmission opportunity the NFI for the group is considered to be toggled.

In other cases, the UE may still transmit a feedback report based on a predefined assumption related to a toggled NFI within an acknowledgment feedback transmission opportunity. For example, in the timeline illustrated in FIG. 5, a first slot 505-*a* may include a first DCI 510 and an associated first downlink PDSCH transmission 515. The first DCI may include group-based feedback parameters of K1=1, DAI=1, G=0, R=0, and NFI=0. In this case, a second slot 505-*b* may include uplink resources for a first PUCCH transmission 520 that may include a first codebook 525 with an ACK/NACK indication for the first PDSCH transmission 515.

In a third slot 505-*c*, a second DCI 530 and a second PDSCH transmission 535 may be transmitted. The second DCI 530 may include group-based feedback parameters of K1=5, DAI=1, G=0, R=0, and NFI=1. Such group-based feedback parameters thus indicate to the UE that the first codebook 525 was successfully received at the base station and that acknowledgment feedback for the first PDSCH transmission 515 does not need to be retransmitted. In a fourth slot 505-*d*, a third DCI 540 and associated third downlink PDSCH transmission 545 may be transmitted. In this case, the third DCI 540 includes group-based feedback parameters of K1=4, DAI=2, G=0, R=0, and NFI=0. Thus, in this example the NFI is toggled, which normally indicates DAI reset, but the UE has not transmitted feedback associated with prior DAIs. Continuing with the example of FIG. 5, in a sixth slot 505-*f*, a fourth DCI 550 and associated fourth PDSCH transmission 555 may be transmitted. The fourth DCI 550 may include group-based feedback parameters of K1=2, DAI=3, G=0, R=0, and NFI=1. Thus, NFI is again toggled while the UE has not transmitted feedback associated with prior DAIs. A seventh slot 505-*g* may then provide a fifth DCI 560 and associated fifth PDSCH transmission 565. The fifth DCI 560 may include group-based feedback parameters of K1=1, DAI=4, G=0, R=0, and NFI=1. An eighth slot 505-*h* may include uplink resources for a second PUCCH transmission 570.

As indicated, in this example the value of NFI is toggled within an acknowledgment feedback transmission opportunity. In some cases, a single codebook may be used to transmit the feedback report. In one example, the UE may consider the NFI to not be toggled within the DCIS, and thus DAI is not reset. In such an example, a second codebook 575 may be generated for the acknowledgment feedback report that includes ACK/NACK bits for each of the four DAIS associated with the second DCI 530 through the fifth DCI 560. In some cases, the value of NFI for such instances may be determined by comparing to the previous acknowledgment feedback transmission opportunity to decide if current acknowledgment feedback for the group should assume DAI continues or not. In such cases, the decision of whether NFI is toggled or not is based on the NFI value of the first DCI (among the detected DCIS that have a K1 value pointing to the same slot for PUCCH transmission for current acknowledgment feedback transmission opportunity), and comparing the next acknowledgment feedback transmission opportunity to decide the same (e.g., DAI continues or not for the next feedback report), and the decision of whether NFI is toggled or not is based on the NFI value of the last DCI (e.g., the fifth DCI 560 in the example of FIG. 5). In other cases, for both the prior acknowledgment feedback transmission opportunity and the next acknowledgment feedback transmission opportunity, the NFI value of the last DCI or the first DCI is considered as the NFI value for the acknowledgment feedback transmission opportunity. In other cases, for both the prior acknowledgment feedback transmission opportunity and the next acknowledgment feedback transmission opportunity, the NFI value for the transmission group is decided based on majority rule among the NFI values of the received DCIS (e.g., with a tiebreaker based on a first or last DCI).

In other cases, multiple feedback codebooks may be determined based on each toggle of NFI. In the example of FIG. 5, such a technique is illustrated for third codebook 580, which may include a first sub-codebook 580-*a* associated with the current state of the codebook prior to the first toggle of NFI at the third DCI 540, a second sub-codebook 580-*b* associated with the current state of the codebook prior to the second toggle of the NFI at the fourth DCI 550, and a third sub-codebook 580-*a* based on the second DCI 530 through the fifth DCI 560. In this example, note that the second sub-codebook 580-*b* includes a NACK for DAI=1, because at the time of the NFI toggle the value of DAI was two, and thus it is uncertain whether a different DAI=1 DCI may have been transmitted but not received at the UE. Likewise, the third sub-codebook 580-*c* includes NACK indications for both DAI=1 and DAI=2, for the same reasons. Thus, in this technique, each time that NFI is toggled, a new sub-codebook is created for the group and DAI is reset. In some cases, each generated sub-codebook may be transmitted by the UE. In other cases, only a latest sub-codebook may be transmitted.

In some cases in which the NFI value of the last DCI (e.g., the fifth DCI 560 in the example of FIG. 5) is considered as the NFI value for the acknowledgment feedback transmission opportunity, a feedback codebook may be determined based on the latest toggle of NFI (e.g., at the fourth DCI 550) as described above. For example, in some cases, there may be a toggle of NFI at a second DCI in a second slot of a transmission timeline such that an NFI at a last DCI in an eight slot is considered as the NFI value for the acknowledgment feedback transmission opportunity. In this case, a feedback codebook may be determined based on the DCI occurring between and including the DCI at which the toggle occurs (e.g., the DCI in the second slot) and the last DCI (e.g., in the eighth slot). For example, the feedback codebook may include feedback for the DCI in the second slot, DCI occurring after the second slot, up to and including the last DCI in the eight slot.

Figure 6:
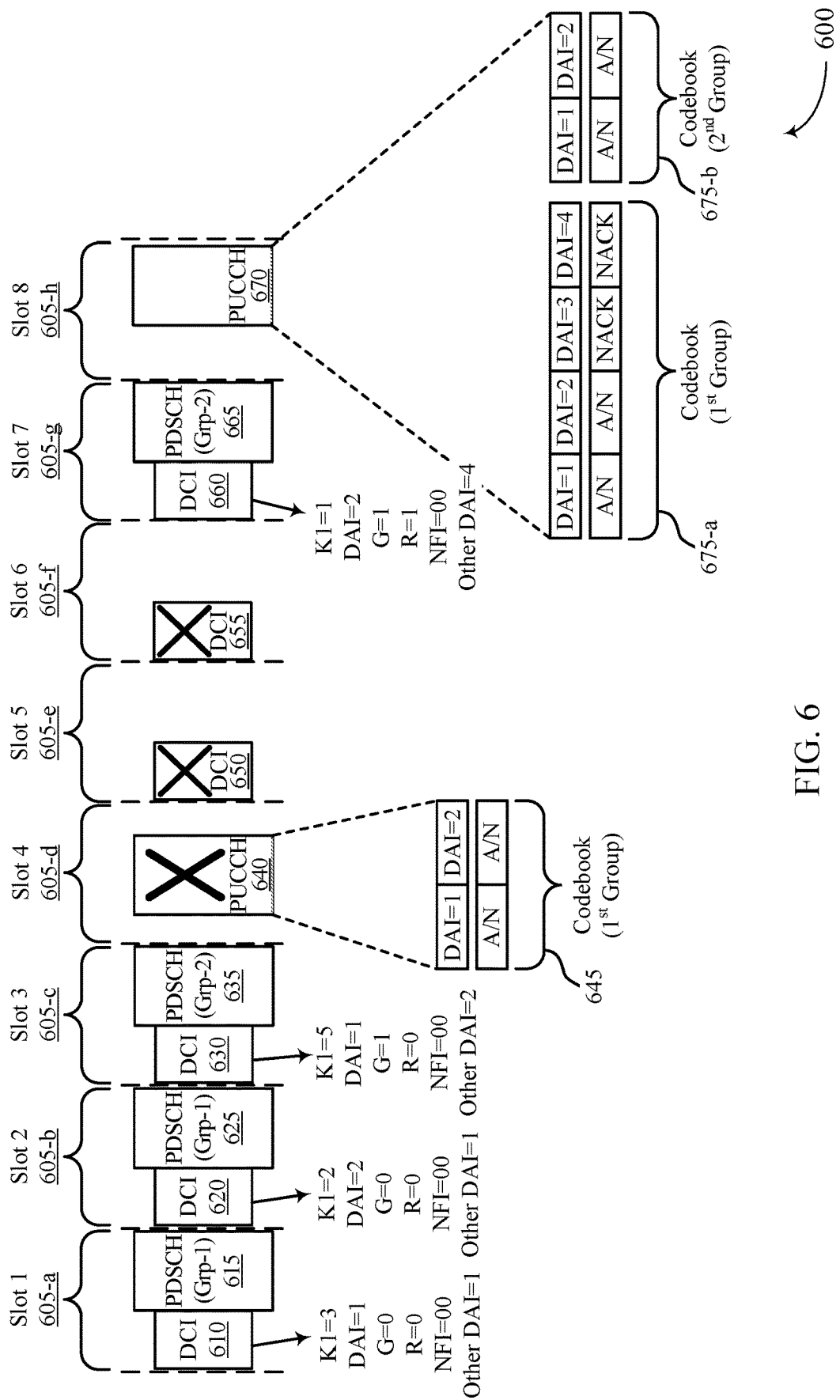

FIG. 6 illustrates an example of a feedback timeline 600 that supports group-based acknowledgment feedback techniques for wireless communications in accordance with aspects of the present disclosure. In some examples, feedback timeline 600 may implement aspects of wireless communications system 100 or 200. In this example, a number of transmission slots 605 are illustrated, including a first transmission slot 605-*a* through an eighth transmission slot 605-*h*. In some cases, transmissions using transmission slots 605 may use licensed spectrum, unlicensed spectrum, or combinations thereof.

Figure 7:
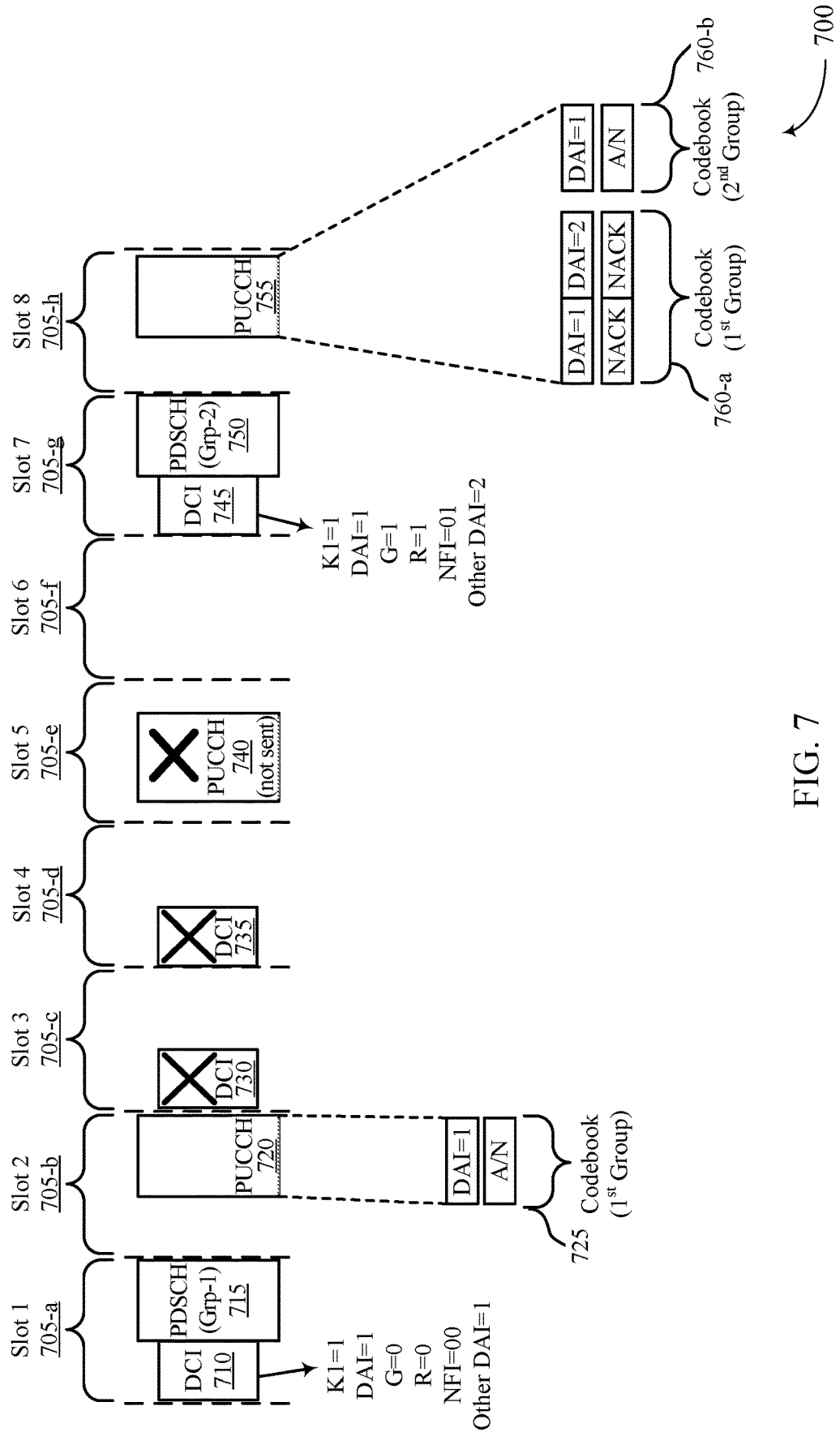

As discussed herein, in some cases a base station may request feedback for multiple groups of downlink transmissions. In such cases, it may be beneficial to provide the UE with one or more parameters associated with the one or more other groups of downlink transmissions. In some cases, such parameters may not be provided in DCI transmissions, and a UE that is to transmit feedback for another group may use feedback parameters received only in DCIs associated with the other group. In other cases, such as illustrated in FIGS. 6 and 7, information related to the other group may be provided in one or more DCIs.

In this example, DCIS may be transmitted with group-based feedback parameters that include NFI and other DAI information related to another group of downlink transmissions. In such case, a two-bit NFI field may be provided (or n-bit NFI field in the case of n groups of downlink transmissions), an "other DAI" field may be provided (or n other DAI fields in the case of n groups of downlink transmissions).

In cases where feedback of the other downlink transmission group is not requested (i.e., R=0), the DAI value and NFI bit for the other group (other than indicated group G) may simply be ignored. In other cases where feedback of the other downlink transmission group is not requested the UE may update the DAI and NFI of the other group according to the indication received in the DCI, but the actual feedback codebook of the other group is sent only when requested. In other cases, if the value of NFI is equal to the previous value of NFI for the other group but the other DAI indicates one or more gaps, then the UE may generate a NACK (i.e., a dummy NACK) for each codebook position corresponding to the number of gaps between the end of the previous DAI value of the other group and the indicated DAI value for the other group. When feedback of the other group, or of both groups is requested, the corresponding codebook(s) may be transmitted by the UE for the corresponding downlink transmission group(s). In other cases, the feedback parameters provided in DCI may include DAI for other groups, but the NFI may be for only the group associated with the DCI (i.e., one-bit NFI). In such cases, the UE may assume the other group NFI to be equal to the previous value of NFI for that group.

Such techniques are illustrated in the example of FIG. 6, in which a first DCI 610 and associated first group PDSCH transmission 615 are transmitted in first slot 605-*a*. In this example, the first DCI 610 includes feedback parameters of K1=3, DAI=1, G=0, R=0, NFI=00, and Other DAI=1 (i.e., that the DAI counter for a second downlink transmission group is at one). A second DCI 620 and associated first group PDSCH transmission 625 may be transmitted in second slot 605-*b*. The second DCI 620 includes feedback parameters of K1=2, DAI=2, G=0, R=0, NFI=00, and Other DAI=1 (i.e., that the DAI counter for a second downlink transmission group remains at one). A third DCI 630 for the second group and associated second group PDSCH transmission 635 may be transmitted in third slot 605-*c*. The third DCI 630 includes feedback parameters of K1=5, DAI=1, G=1, R=0, NFI=00, and Other DAI=2 (i.e., that the DAI counter for the first group is a two).

The UE receiving the downlink transmissions may format a first group feedback codebook 645 for transmission in PUCCH transmission 640 that, in this example, includes bits associated with each DAI of the first group of downlink transmissions as indicated in the received feedback parameters. Thus, in this example, feedback codebook 645 is for the first group, and includes an ACK/NACK bit associated with DAI=1 of the first slot 605-*a*, and a second ACK/NACK bit associated with DAI=2 of the second slot 605-*b*. In this example, the PUCCH transmission 640 may not be successfully received at the base station (e.g., due to interference, failed LBT, etc.).

In this example, the base station may determine that the PUCCH transmission 640 is not successfully received, and may thus maintain DCI parameters of the first group for group-based acknowledgment feedback in order to obtain the feedback associated with the first slot 605-*a* and the second slot 605-*b*. In this example in fifth slot 605-*e*, associated with the first downlink transmission group, the base station may transmit a fourth DCI 650, that may not be successfully received and decoded at the UE. Further, in this example, the base station may transmit a fifth DCI 655 in sixth slot 605-*f* associated with the first group, that may not be successfully received and decoded at the UE.

At the seventh slot 605-*g*, a sixth DCI 660 may be transmitted, along with fourth PDSCH transmission 665 associated with the second group. The sixth DCI 660 includes feedback parameters of K1=1, DAI=2, G=1, R=1, NFI=00, and Other DAI=4 (i.e., the DAI of the first group is four). In this example, the UE may format a first sub-codebook 675-*a* for the first group (i.e., for PDSCH transmissions 615, 625, and unreceived transmissions for DAI=3 and DAI=4), and format a second sub-codebook 675-*b* for the second group (i.e., for PDSCH transmissions 635, and 665). Each sub-codebook 675 includes bits associated with each DAI indicated in the received DAI fields for the associated group. Thus, in this example, first sub-codebook 675-*a* includes an ACK/NACK bit associated with first group DAI=1 of the first slot 605-*a*, a second ACK/NACK bit associated with first group DAI=2 of the second slot 605-*b*, and NACK bits associated with first group DAI=3 and DAI=4 that were not received at the UE but indicated as having been sent in the sixth DCI 660. Further, the second sub-codebook 675-*b* includes an ACK/NACK bit associated with second group DAI=1 of the third slot 605-*c*, and a second ACK/NACK bit associated with second group DAI=2 of the seventh slot 605-*g*. Thus, the Other DAI indication provided in the group-based feedback parameters may allow the UE to report negative acknowledgment sooner than would be reported if the other DAI was not indicated to the UE, which may enhance operation of a wireless communications system relative to cases where such NACK indications would be provided later.

FIG. 7 illustrates another example of a feedback timeline 700 that supports group-based acknowledgment feedback techniques for wireless communications in accordance with aspects of the present disclosure. In some examples, feedback timeline 700 may implement aspects of wireless communications system 100 or 200. In this example, a number of transmission slots 705 are illustrated, including a first transmission slot 705-*a* through an eighth transmission slot 705-*h*. In some cases, transmissions using transmission slots 705 may use licensed spectrum, unlicensed spectrum, or combinations thereof.

As discussed with respect to FIG. 6, in some cases, a base station may request feedback for multiple groups of downlink transmissions, and may provide the UE with one or more parameters associated with the one or more other groups of downlink transmissions. In the example of FIG. 6, the value of the NFI bit for each group was equal to a previous NFI value. In cases where the value of the NFI bit changes, such as illustrated in FIG. 7, a UE should generate a NACK indication (e.g., a dummy NACK) up to the value of indicated DAI for that group, and the previous DAI value of that group is not used. Such a situation may indicate, for example, that all the DCIS of the other group are missed.

In the example of FIG. 7, a first DCI 710 and associated first group PDSCH transmission 715 are transmitted in first slot 705-*a*. In this example, the first DCI 710 includes feedback parameters of K1=1, DAI=1, G=0, R=0, NFI=00, and Other DAI=1 (e.g., the DAI counter for a second downlink transmission group is at one). The second slot 705-*b* may include resources for a first PUCCH transmission 720, which may include a first codebook 725 that provides a feedback report for the first downlink transmission group.

A second DCI 730 may be transmitted bot not received at UE in third slot 705-*c*, and a third DCI 735 be transmitted bot not received at UE in fourth slot 705-*d*. In this example, fifth slot 704-*e* may include uplink resources for a second PUCCH transmission 740, but the UE may not transmit such a transmission because there is no feedback to report.

At the seventh slot 705-*g*, a fourth DCI 745 and second PDSCH transmission 750 associated with the second downlink transmission group may be transmitted. The fourth DCI 745 includes feedback parameters of K1=1, DAI=1, G=1, R=1, NFI=01, and Other DAI=2 (i.e., that the DAI counter for the first downlink transmission group is at two, which may indicate to the UE that two DCIS were missed).

The UE receiving the downlink transmissions may format a second group feedback codebook 760 for transmission in PUCCH transmission 755 in eighth slot 705-*h*. In this example, the second group feedback codebook 760 may include a first sub-codebook 760-*a* associated with the first downlink transmission group that indicates NACK for each DAI that was not received at the UE. The indication of the toggled NFI for the first group that is provided in the fourth DCI 745, along with the indication that the other DAI is two, indicates to the UE that the DAI was reset and that two DCIS had been transmitted, which the UE uses to report the NACK indications. In this example, second sub-codebook 760-*b* may provide acknowledgment feedback for DAI=1 of the second group of downlink transmissions. Thus, the Other DAI indication provided in the group-based feedback parameters, along with the NFI indication of the other group, may allow the UE to report negative acknowledgment sooner than would be reported if the other DAI was not indicated to the UE, which may enhance operation of a wireless communications system relative to cases where such NACK indications would be provided later.

As discussed, in some cases, feedback for a different downlink transmission group may be requested in a DCI for a first downlink transmission group (e.g., based on a value of the parameter R). In some cases, DCIS with group-based feedback parameters may not include a parameter for R. In such cases, sending feedback for more than one group in a PUCCH may be accomplished through two or more DCIS indicating K1 values that point to the same slot for PUCCH transmission, and that indicate different groups (i.e., have different G values). In such cases, a UE may determine that multiple feedback codebooks associated with different downlink transmission groups are to be generated and transmitted. In cases where such a parameter R is not provided with group-based feedback parameters, NFI indications and Other DAI indications for the other group may also not be included with the group-based feedback parameters, and the size of the group-based feedback parameters may be reduced relative to cases where such parameters are provided.

In other cases, the group-based feedback parameters field R may be present in the DCI and indicate whether feedback for other groups is requested or not. In some situations, a value of R may change within the detected DCIS that have a K1 value pointing to the same slot for PUCCH transmission (e.g., due to an error at the base station, an error in decoding the group-based feedback parameters, interference with the DCI transmission, etc.). In some cases, if the value of R changes in such a manner, the value in the latest received DCI may be considered to determine if feedback for other groups are requested. In some cases, the UE may not be expected to handle the case where initially feedback for other groups is requested (R=1) and then in a next DCI feedback is not requested (R=0), which may result in an error case and the UE may not transmit PUCCH with the feedback report. In such a case, a base station may have a restriction that the UE is not expected to receive DCIs scheduling PDSCHs that belong to different PDSCH groups (e.g., G=0 and G=1) and point to the same slot for feedback transmission. In other cases, if at least one value of R in received DCIs indicates feedback for other groups is to be transmitted, the UE may transmit feedback for the other groups.

In cases where feedback for two or more downlink transmission groups is transmitted, a rule may be defined for appending the codebook of first group and second group. In some cases, when feedback for more than one group exists, ordering of placing the two codebooks in the feedback payload may be based on a group index of each downlink transmission group. For example, the UE may generate the feedback codebook by appending the codebook for G=1 to the codebook for G=0. In other cases, the codebook for the other group is placed after the codebook of current group (e.g., if the DCI for group G=1 requests feedback for group G=0, the UE may generate the feedback codebook by appending the codebook for G=0 to the codebook for G=1. Thus, multiple codebooks for different downlink transmission groups may be multiplexed in a feedback report.

The examples discussed with respect to FIGS. 3 through 7 describe that DCI may include various group-based feedback parameters. In some cases, such DCI transmissions may have a DCI format that is associated with group-based downlink feedback (e.g., DCI Format 1_1). In some cases, however, one or more downlink transmissions may be scheduled with a fallback DCI (e.g., DCI format 1_0) that does not include group-based feedback parameters. According to some aspects of the present disclosure, group-based acknowledgment feedback may still be used with such fallback DCI. In some cases, when dynamic group-based acknowledgment feedback is configured (e.g., configured at an RRC establishment, and enabled through RRC signaling), if a UE receives a DCI scheduling PDSCH and the DCI format does not have additional fields for information related to the dynamic group-based acknowledgment feedback (i.e., a fallback DCI), the UE may determine group-based acknowledgment feedback parameters according to one or more predetermined rules.

In some cases, one or more existing fields of the fallback DCI may be reused to indicate one or more group-based acknowledgment feedback parameters. For example, one or more bits of a PUCCH resource indicator (PRI) field, one or more bits of frequency domain resource assignment (FDRA) or a time domain resource assignment (TDRA), or combinations thereof may be used for to provide information related to the group-based acknowledgment feedback parameters. In other cases, the UE may assume a fixed value for the group-based acknowledgment feedback parameters that are missing from the fallback DCI. For example, the UE may assume that PDSCH always belongs to the first group (G=0 is assumed), and NFI is not toggled (same NFI as the previous DCI is assumed). Further, in cases where R, NFI, and other DAI are provided with the group-based acknowledgment feedback parameters, the UE may assume that for fallback DCI, R=0 (feedback for other group not requested), and no assumption or update is made for other NFI and other DAI.

In other cases, group-based acknowledgment feedback corresponding to PDSCHs scheduled by fallback DCIs may be separately constructed from feedback corresponding to PDSCHs scheduled by DCI that includes the group-based acknowledgment feedback parameters. In some cases, as a cDAI field may be present in the fallback DCI format, DAI may be applied separately for different DCI formats. In some cases, where such feedback is constructed separately, for a given group-based acknowledgment feedback reporting, the UE may expect only PDSCHs scheduled by fallback DCI or only by non-fallback DCI, and a base station may format DCIs accordingly. In other cases, for a given group-based acknowledgment feedback reporting, the UE may have both PDSCHs scheduled by fallback DCI or by non-fallback DCI, in which case up to three feedback codebooks may be possible (e.g., a first codebook for PDSCHs scheduled by fallback DCI, a second codebook for non-fallback DCI with G=0, and a third codebook for non-fallback DCI with G=1). In such cases, group-based acknowledgment feedback may be used along with fallback DCI, which may enhance system flexibility and feedback performance/latency. In some cases, if each DCI for a feedback transmission is a fallback DCI (i.e., all the DCIs that point to the same slot for an associated acknowledgment feedback transmission are fallback DCIs), regular non-group-based acknowledgment feedback may be transmitted in the feedback transmission, and subsequent group-based feedback may be provided for one or more PDSCH transmissions from prior to the fallback DCI transmissions. An example of such a technique is described with reference to FIG. 8.

Figure 8:
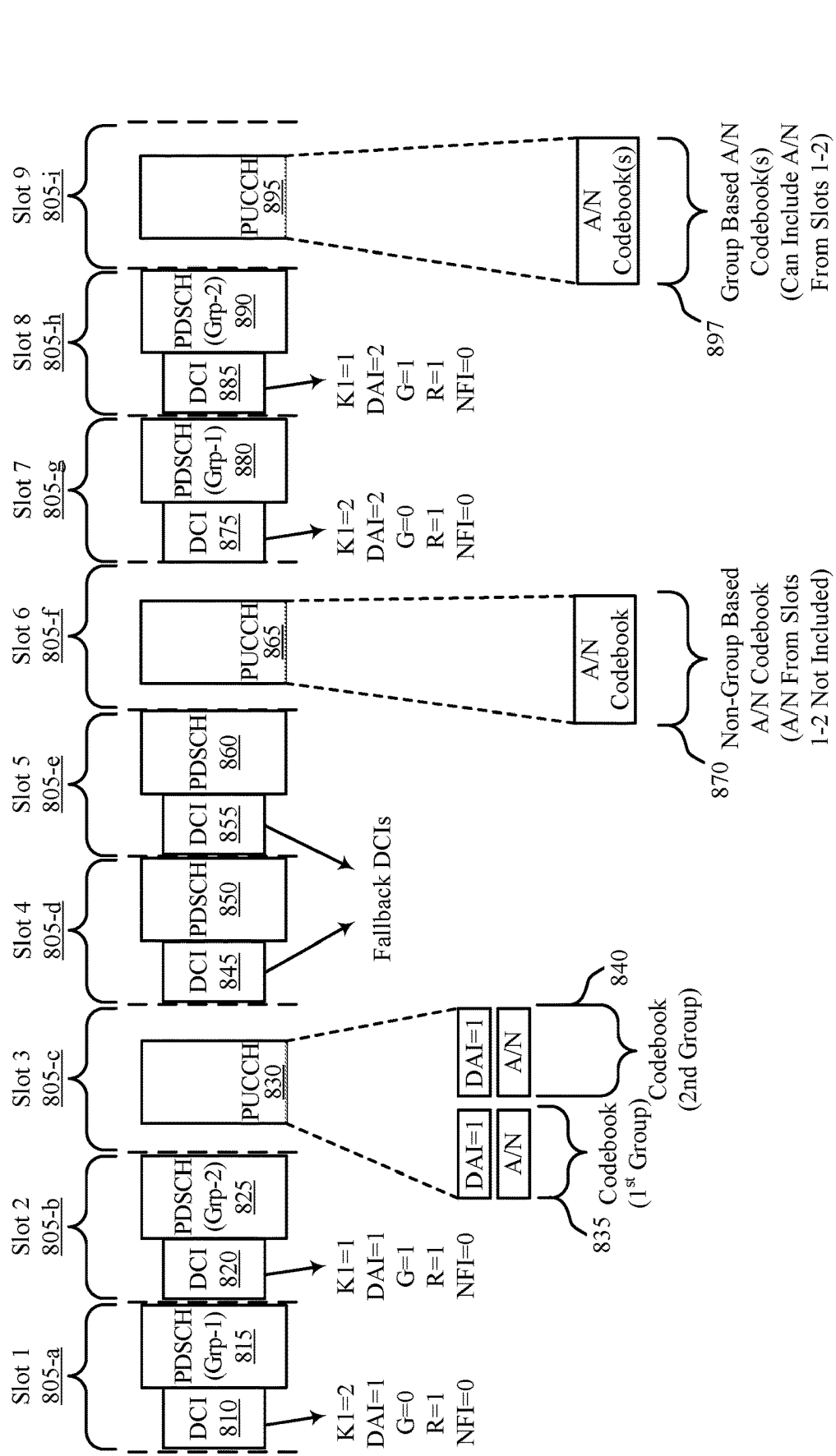

FIG. 8 illustrates an example of a feedback timeline 800 that supports group-based and non-group-based acknowledgment feedback techniques for wireless communications in accordance with aspects of the present disclosure. In some examples, feedback timeline 800 may implement aspects of wireless communications system 100 or 200. In this example, a number of transmission slots 805 are illustrated, including a first transmission slot 805-a through a ninth transmission slot 805-i. In some cases, transmissions using transmission slots 805 may use licensed spectrum, unlicensed spectrum, or combinations thereof.

In this example, a first DCI 810 may be transmitted in the first slot 805-a, that may include downlink scheduling information for an associated first PDSCH transmission 815 of a first group in the first slot 805-a. In this example, the first DCI 810 may include group-based feedback parameters, K1=2 (i.e., that indicates the associated acknowledgment feedback is to be provided in third slot 805-c), DAI=1 (i.e., that indicates the DAI is for an initial acknowledgment feedback indicator to be included in an acknowledgment codebook of the first group), G=0 (i.e., that identifies first downlink transmission group), R=1 (i.e., a feedback report is requested for multiple groups), and NFI=0.

In the example of FIG. 8, a second DCI 820 may schedule a second PDSCH transmission 825 that is in the second downlink transmission group in second slot 805-b. In this example, the second DCI 820 includes group-based feedback parameters of K1=1 (i.e., that the associated acknowledgment feedback is to be provided in the third slot 805-c), DAI=1 (i.e., that indicates the DAI is for an initial acknowledgment feedback indicator to be included in an acknowledgment codebook of the first group), G=1 (i.e., for the second group, which is different than the group of the first DCI 810), R=1 (i.e., a feedback report is requested for multiple groups), and NFI=0.

The UE receiving the downlink transmissions may format feedback codebooks 835 and 840 for transmission in PUCCH transmission 830 that, in this example, includes bits associated with each of the first and second groups of downlink transmissions as indicated in the received feedback parameters.

In this example, the base station may transmit a fallback DCI 845 (e.g., DCI format 1_0) and PDSCH transmission 850 in the fourth slot 805-d, and also a fallback DCI 855 and PDSCH transmission 860 in the fifth slot 805-e. Both fallback DCIs 845 and 855 may indicate that associated acknowledgment feedback is to be provided in sixth slot 805-f. The UE may transmit PUCCH 865 in the sixth slot 805-f, which may include a regular dynamic feedback codebook 870 for non-group-based feedback. In such case, the feedback from the first slot 805-a and the second slot 805-b may not be provided in the PUCCH 865 transmission. Thus, the regular dynamic codebook may be used in an acknowledgment feedback opportunity in cases where all of the DCIs associated with that acknowledgment feedback opportunity are fallback DCIs. In cases where one DCI is a fallback DCI and another DCI is for group-based feedback, group-based feedback may be transmitted in a manner similarly as discussed with respect to FIG. 7. For example, a PDSCH group scheduled by the DCI format 1_0 may be assumed to be the first PDSCH group, NFI of the first PDSCH group may be assumed as not changed by the DCI, and it may be assumed that the DCI does not request feedback for the other PDSCH group.

Continuing with this example, in seventh slot 805-g, associated with the first downlink transmission group, the base station may transmit a DCI 875 for an associated second group-based PDSCH transmission 880 of the first transmission group. In this example, the DCI 875 includes feedback parameters of K1=2 (i.e., that the associated acknowledgment feedback is to be provided in the ninth slot 805-i), DAI=2 (i.e., the next consecutive DAI count), G=0 (i.e., for the same group as the first DCI 810 and first PDSCH transmission 815), R=1 (i.e., that feedback for both the first group and the second group is requested), and NFI=0 (i.e., that the DAI has not been reset based on not being toggled from the prior DCI). In this example, in eighth slot 805-h, associated with the second group of downlink transmissions, the base station may transmit a DCI 885 for an associated second group-based PDSCH transmission 890 of the second transmission group. In this example, the DCI 885 includes feedback parameters of K1=1 (i.e., that the associated acknowledgment feedback is to be provided in the ninth slot 805-i), DAI=2 (i.e., the next consecutive DAI count of the second group), G=1 (i.e., for the second downlink transmission group), R=1 (i.e., that feedback for both the first group and the second group is requested), and NFI=0 (i.e., that the DAI has not been reset based on not being toggled from the prior DCI).

The ninth slot 805-i may include resources for a second group-based PUCCH transmission 895, for reporting of the group-based acknowledgment feedback. In this case, the UE may again determine feedback, which in this case includes feedback for both the first group and the second group of downlink transmissions. In this example, the UE may format one or more feedback codebooks 897 for the first group and/or second group. In this example, separate sub-codebooks for the first group and second group would be included, but in other examples only one codebook may be included. In such case, the feedback codebook(s) 897 may include acknowledgment feedback for the slots prior to the fallback DCI transmissions, namely the first slot 805-a and second slot 805-b in this example. Thus, in such examples, regular (i.e., non-group-based) dynamic codebook feedback may be used when all DCIs for an acknowledgment feedback opportunity are fallback DCIs, and the group-based codebook feedback may be used before and after the regular dynamic codebook feedback, where group-based feedback may be associated with transmissions that are before and/or after the DCIs with the fallback DCI.

In some cases, for the acknowledgment feedback opportunity in the ninth slot 805-i, (i.e., the group-based feedback transmission following the feedback for the fallback DCIs), the feedback bits of the sixth slot 805-f may not be retransmitted, but feedback bits for earlier transmissions scheduled with group-based DCI from the first slot 805-a and the second slot 805-b may be retransmitted in the feedback codebook(s) 897. In some cases, the NFI for the one or more PDSCH groups may be assumed to be toggled in which case feedback bits for earlier transmissions scheduled with group-based DCI from the first slot 805-a and the second slot 805-b may not be retransmitted in the feedback codebook(s) 897. In other cases, to determine whether NFI is toggled or not, previous DCIs that included NFI for a group are considered (i.e., before the fallback DCIs).

Figure 9:
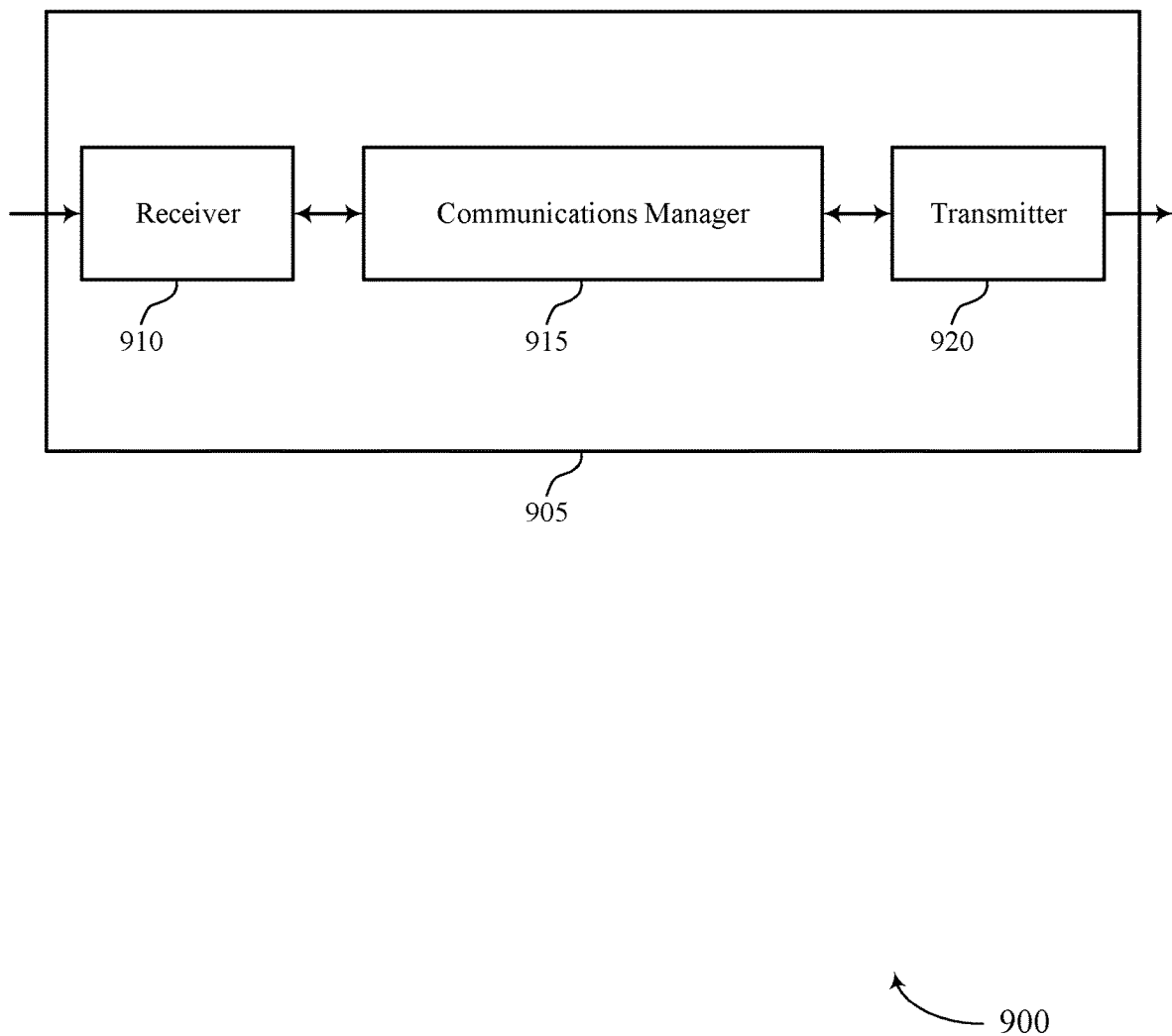
FIGS. 9 and 10 show block diagrams of devices that support group-based acknowledgment feedback techniques for wireless communications in accordance with aspects of the present disclosure.

FIG. 9 shows a block diagram 900 of a device 905 that supports group-based acknowledgment feedback techniques for wireless communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to group-based acknowledgment feedback techniques for wireless communications, etc.). Information may be passed on to other components of the device 905. The receiver 910 may be an example of aspects of the transceiver 1220 described with reference to FIG. 12. The receiver 910 may utilize a single antenna or a set of antennas.

In some cases, the communications manager 915 may receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determine, based on which of the first new acknowledgment feedback indicator or the second new acknowledgment feedback indicator is received earliest or latest in time, the first group-based acknowledgment feedback.

In some cases, the communications manager 915 may also receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receive the one or more downlink transmissions of the first group of downlink transmissions, determine, based on the first downlink assignment indicator and the first new acknowledgment feedback indicator, first acknowledgment feedback associated with the first group of downlink transmissions for inclusion with the first group-based acknowledgement feedback transmission, update the second group-based acknowledgement feedback associated with the second group of downlink transmissions based on the determining, and transmit the first group-based acknowledgement feedback transmission to the base station.

In some cases, the communications manager 915 may also receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determine, based on the first feedback timing and the second feedback timing, that the first uplink transmission is to include both the first group-based acknowledgement feedback and the second group-based acknowledgment feedback.

In some cases, the communications manager 915 may also receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receive a downlink control information transmission from the base station having the second downlink control information format, determine, based on using a predetermined value for each field of the first subset of information fields, first acknowledgment feedback associated with at least a first group of downlink transmissions, and transmit the first acknowledgment feedback to the base station. The communications manager 915 may be an example of aspects of the communications manager 1210 described herein.

In some cases, the communications manager 915 may receive a first downlink control information transmission from a base station that is associated with a first group-based downlink transmission and a first acknowledgment feedback occasion, receive a second downlink control information transmission, subsequent to the first downlink control information transmission, that is associated with a second non-group-based downlink transmission and a second acknowledgment feedback occasion, receive a third downlink control information transmission, subsequent to the second downlink control information transmission, that is associated with a third group-based downlink transmission and a third acknowledgment feedback occasion, transmit non-group-based acknowledgment feedback associated with the second non-group-based downlink transmission in the second acknowledgment feedback occasion, and transmit group-based acknowledgment feedback associated with one or more or the first group-based downlink transmission or the third group-based downlink transmission in the third acknowledgment feedback occasion. The communications manager 915 may be an example of aspects of the communications manager 1210 described herein.

The actions performed by the communications manager 915 as described herein may be implemented to realize one or more potential advantages. For example, a UE may implement group-based feedback reports to transmit feedback for all of the feedback processes that are configured at the UE 115. Thus, techniques such as discussed herein may allow for efficient acknowledgment feedback that may help reduce latency and enhance overall system throughput in a wireless communication system. Implementing group-based feedback reports may provide improved quality and reliability of service at the UE 115, as latency and the number of separate resources allocated to the UE 115 may be reduced. The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
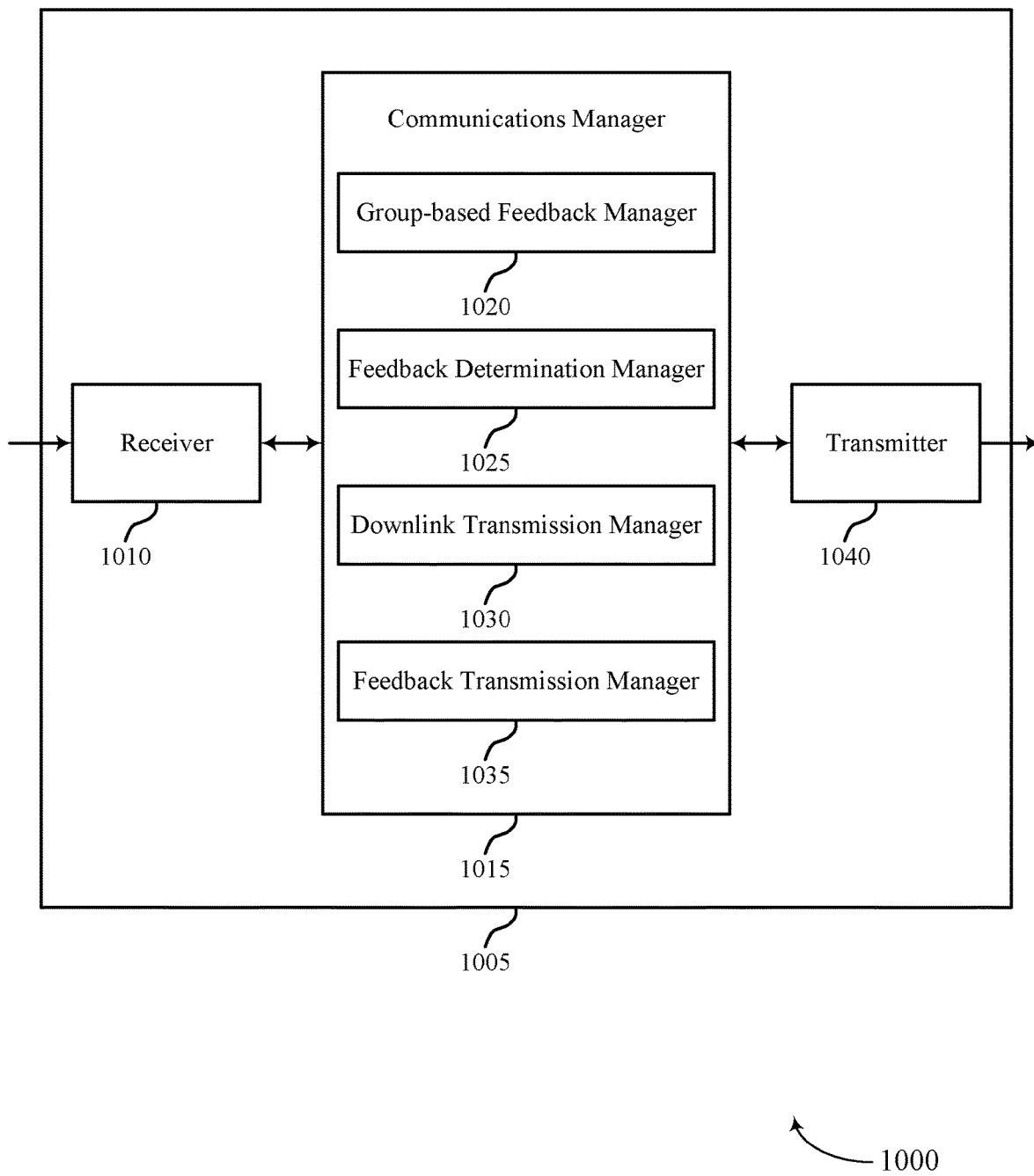

FIG. 10 shows a block diagram 1000 of a device 1005 that supports group-based acknowledgment feedback techniques for wireless communications in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to group-based acknowledgment feedback techniques for wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a group-based feedback manager 1020, a feedback determination manager 1025, a downlink transmission manager 1030, and a feedback transmission manager 1035. The communications manager 1015 may be an example of aspects of the communications manager 1210 described herein.

In some cases, the group-based feedback manager 1020 may receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback and receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback. The feedback determination manager 1025 may determine, based on which of the first new acknowledgment feedback indicator or the second new acknowledgment feedback indicator is received earliest or latest in time, the first group-based acknowledgment feedback. Based on receiving the first downlink control information transmission and the second downlink control information transmission, a processor of a UE 115 (e.g., controlling the receiver 1010, the transmitter 1040, or the transceiver 1220 as described with reference to FIG. 12) may efficiently determine the first group-based acknowledgment feedback. The processor of the UE 115 may turn on one or more processing units for receiving the first downlink control information transmission and the second downlink control information transmission, increase a processing clock, or a similar mechanism within the UE 115. As such, when the first downlink control information transmission and the second downlink control information transmission are received, the processor may be ready to respond more efficiently through the reduction of a ramp up in processing power.

In some cases, the group-based feedback manager 1020 may receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions. The downlink transmission manager 1030 may receive the one or more downlink transmissions of the first group of downlink transmissions.

The feedback determination manager 1025 may determine, based on the first downlink assignment indicator and the first new acknowledgment feedback indicator, first acknowledgment feedback associated with the first group of downlink transmissions for inclusion with the first group-based acknowledgement feedback transmission. The feedback transmission manager 1035 may update the second group-based acknowledgement feedback associated with the second group of downlink transmissions based on the determining. The feedback transmission manager 1035 may transmit the first group-based acknowledgement feedback transmission to the base station.

In some cases, the group-based feedback manager 1020 may receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions and receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions. The feedback determination manager 1025 may determine, based on the first feedback timing and the second feedback timing, that the first uplink transmission is to include both the first group-based acknowledgement feedback and the second group-based acknowledgment feedback.

In some cases, the group-based feedback manager 1020 may receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receive a downlink control information transmission from the base station having the second downlink control information format, and determine, based on using a predetermined value for each field of the first subset of information fields, first acknowledgment feedback associated with at least a first group of downlink transmissions. The feedback transmission manager 1035 may transmit the first acknowledgment feedback to the base station.

In some cases, the downlink transmission manager 1030 may receive a first downlink control information transmission from a base station that is associated with a first group-based downlink transmission and a first acknowledgment feedback occasion, receive a second downlink control information transmission, subsequent to the first downlink control information transmission, that is associated with a second non-group-based downlink transmission and a second acknowledgment feedback occasion, and receive a third downlink control information transmission, subsequent to the second downlink control information transmission, that is associated with a third group-based downlink transmission and a third acknowledgment feedback occasion. The feedback transmission manager 1035 may transmit non-group-based acknowledgment feedback associated with the second non-group-based downlink transmission in the second acknowledgment feedback occasion and transmit group-based acknowledgment feedback associated with one or more or the first group-based downlink transmission or the third group-based downlink transmission in the third acknowledgment feedback occasion.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
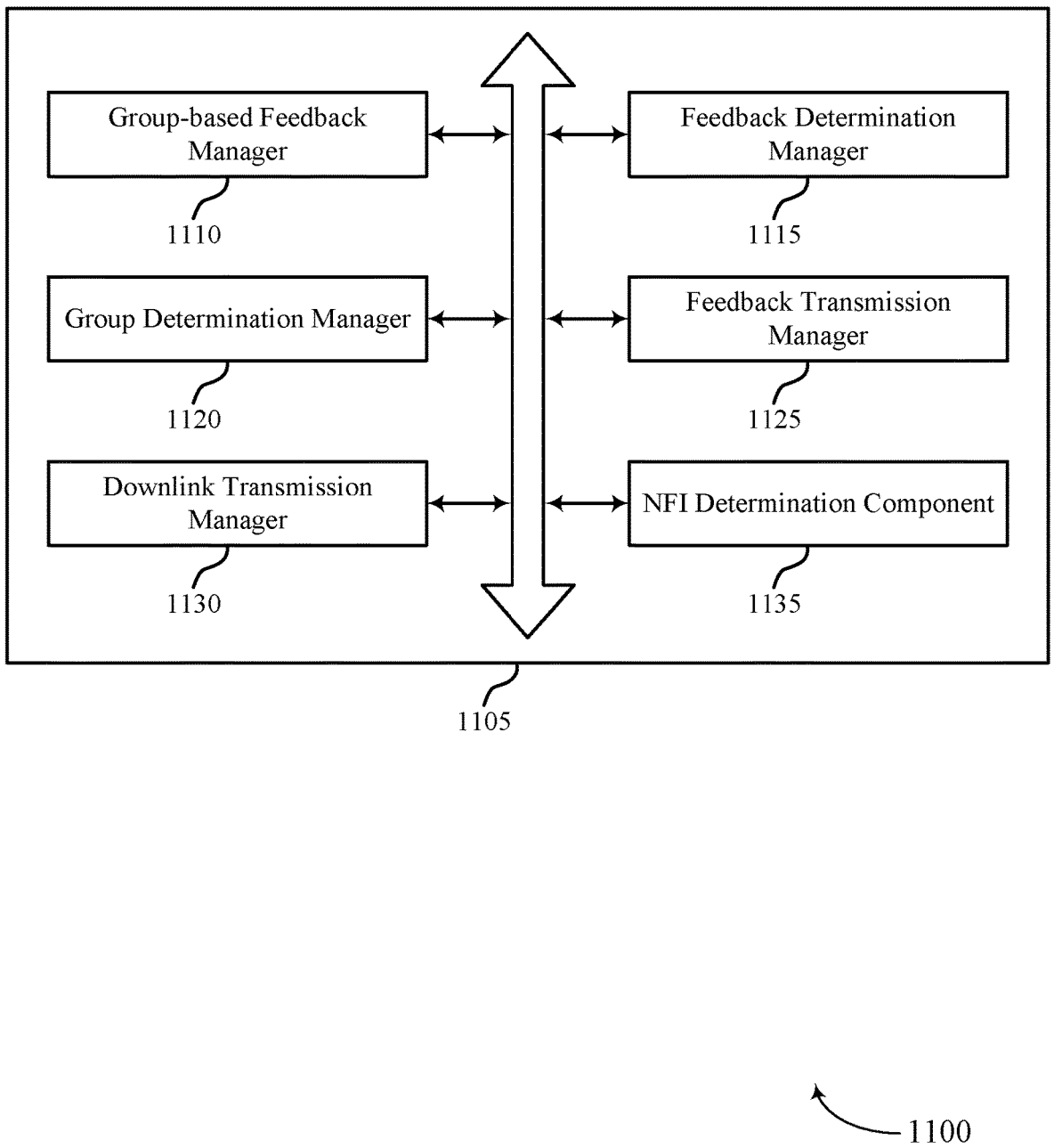
FIG. 11 shows a block diagram of a communications manager that supports group-based acknowledgment feedback techniques for wireless communications in accordance with aspects of the present disclosure.

FIG. 11 shows a block diagram 1100 of a communications manager 1105 that supports group-based acknowledgment feedback techniques for wireless communications in accordance with aspects of the present disclosure. The communications manager 1105 may be an example of aspects of a communications manager 915, a communications manager 1015, or a communications manager 1210 described herein. The communications manager 1105 may include a group-based feedback manager 1110, a feedback determination manager 1115, a group determination manager 1120, a feedback transmission manager 1125, a downlink transmission manager 1130, and an NFI determination component 1135. Each of these modules may communicate, directly or indirectly, with one another (e.g., via one or more buses).

The group-based feedback manager 1110 may receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback.

In some examples, the group-based feedback manager 1110 may receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback.

In some examples, the group-based feedback manager 1110 may receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions.

In some examples, the group-based feedback manager 1110 may receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions.

In some examples, the group-based feedback manager 1110 may receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions.

In some examples, the group-based feedback manager 1110 may receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields.

In some examples, the group-based feedback manager 1110 may receive a downlink control information transmission from the base station having the second downlink control information format. In some examples, the group-based feedback manager 1110 may determine, based on using a predetermined value for each field of the first subset of information fields, first acknowledgment feedback associated with at least a first group of downlink transmissions.

In some examples, the group-based feedback manager 1110 may identify that the second new acknowledgment feedback indicator being different than the first new acknowledgment feedback indicator for the first group-based acknowledgment feedback corresponds to an error case.

In some examples, the group-based feedback manager 1110 may discontinue generating the first group-based acknowledgment feedback to be transmitted in the first uplink transmission.

In some examples, the group-based feedback manager 1110 may transmit the first group-based acknowledgement feedback and the second group-based acknowledgment feedback when at least one of the first set of group-based acknowledgment feedback parameters or the second set of group-based acknowledgment feedback parameters indicates a request for both the first group of downlink transmissions and the second group of downlink transmissions.

In some examples, the group-based feedback manager 1110 may determine that the second new acknowledgment feedback indicator resets the first group-based acknowledgment feedback for a subsequent second uplink transmission that is to include group-based acknowledgment feedback.

In some examples, the group-based feedback manager 1110 may determine that the group indicator identifies only the first group of downlink transmissions are to be included in the first group-based acknowledgement feedback transmission.

In some examples, the group-based feedback manager 1110 may ignore the second downlink assignment indicator and the second new acknowledgment feedback indicator associated with the second group of downlink transmissions.

In some examples, the group-based feedback manager 1110 may determine that the group indicator identifies that both the first group of downlink transmissions and the second group of downlink transmissions are to be included in the first group-based acknowledgement feedback transmission.

In some examples, the group-based feedback manager 1110 may receive, from the base station, an indication to enable the group-based acknowledgment feedback, and where the second set of fields of the second downlink control information format are interpreted differently based on whether the group-based acknowledgment feedback is enabled or disabled at the UE.

In some cases, the set of group-based acknowledgment feedback parameters further includes second downlink assignment indicator that identifies one or more downlink transmissions of a second group of downlink transmissions and a second new acknowledgment feedback indicator associated with the second group of downlink transmissions.

In some cases, the second downlink control information format is a fallback downlink control information format.

In some cases, the first subset of information fields include one or more of a group indicator field, a new acknowledgment feedback indicator field, or a request field that indicates acknowledgment feedback is requested for one or more of multiple different groups of downlink transmissions.

In some cases, the predetermined value for the group indicator field corresponds to a downlink transmission group associated with the downlink control information transmission, the predetermined value for the new acknowledgment feedback indicator field corresponds to a prior value of the new acknowledgment feedback indicator field, the predetermined value for the request field corresponds to a value that indicates acknowledgment feedback is not requested for another group of downlink transmissions.

The feedback determination manager 1115 may determine, based on which of the first new acknowledgment feedback indicator or the second new acknowledgment feedback indicator is received earliest or latest in time, the first group-based acknowledgment feedback.

In some examples, the feedback determination manager 1115 may determine, based on the first downlink assignment indicator and the first new acknowledgment feedback indicator, first acknowledgment feedback associated with the first group of downlink transmissions for inclusion with the first group-based acknowledgement feedback transmission.

In some examples, the feedback determination manager 1115 may determine, based on the first feedback timing and the second feedback timing, that the first uplink transmission is to include both the first group-based acknowledgement feedback and the second group-based acknowledgment feedback.

In some examples, the feedback determination manager 1115 may determine a first acknowledgment (ACK)/negative-acknowledgment (NACK) to be reported as feedback for the first downlink transmission and a second ACK/NACK to be reported as feedback for the second downlink transmission. In some examples, the feedback determination manager 1115 may identify that the second new acknowledgment feedback indicator being different than the first new acknowledgment feedback indicator for the first group-based acknowledgment feedback is interpreted as the new acknowledgment feedback indicator being untoggled from the first new acknowledgment feedback indicator. In some examples, the feedback determination manager 1115 may format the first group-based acknowledgment feedback to include the first ACK/NACK and the second ACK/NACK based on the first new acknowledgment feedback indicator or the second new acknowledgment feedback indicator. In some examples, the feedback determination manager 1115 may transmit a latest subset of feedback information associated with a latest received new acknowledgment feedback indicator In some examples, the feedback determination manager 1115 may format a first subset of feedback information associated with the first new acknowledgment feedback indicator in the first group-based acknowledgment feedback and a second subset of feedback information associated with the second new acknowledgment feedback indicator in the first group-based acknowledgment feedback. In some examples, the feedback determination manager 1115 may concatenate the first subset of feedback information and the second subset of feedback information in the first group-based acknowledgment feedback.

In some examples, the feedback determination manager 1115 may identify a first codebook entry associated with the first subset of feedback information. In some examples, the feedback determination manager 1115 may identify a second codebook entry associated with the second subset of feedback information.

In some examples, the feedback determination manager 1115 may transmit, to the base station, the first group-based acknowledgment feedback in the first uplink transmission based on the first codebook entry and the second codebook entry.

In some examples, the feedback determination manager 1115 may update the second group-based acknowledgement feedback associated with the second group of downlink transmissions based on the second downlink assignment indicator and the second new acknowledgment feedback indicator for transmission of a second group-based acknowledgement feedback transmission associated with the second group of downlink transmissions.

In some examples, the feedback determination manager 1115 may generate a negative acknowledgment for each downlink assignment indicator associated with the second group of downlink transmissions up to the second downlink assignment indicator, where a previous downlink assignment indicator value for the second group of downlink transmissions prior to the second downlink assignment indicator is discarded.

In some examples, the feedback determination manager 1115 may identify one or more gaps between the second downlink assignment indicator and a previous downlink assignment indicator value associated with the second group of downlink transmissions provided with the prior downlink control information transmission from the base station. In some examples, the feedback determination manager 1115 may generate a negative acknowledgment for each downlink assignment indicator associated with the one or more gaps.

In some examples, the feedback determination manager 1115 may determine second acknowledgment feedback associated with the second group of downlink transmissions for inclusion with the first group-based acknowledgement feedback transmission.

In some examples, the feedback determination manager 1115 may determine, based on the second group of downlink transmissions having a same new acknowledgment feedback indicator value as a prior downlink control information transmission, second acknowledgment feedback associated with the second group of downlink transmissions for inclusion with the first group-based acknowledgement feedback transmission.

In some examples, the feedback determination manager 1115 may determine the first group-based acknowledgment feedback associated with the first group of downlink transmissions and the second group-based acknowledgment feedback associated with the second group of downlink transmissions.

In some examples, the feedback determination manager 1115 may format the first group-based acknowledgment feedback and the second group-based acknowledgment feedback into a combined feedback report. In some examples, the feedback determination manager 1115 may append the second group-based acknowledgment feedback to the first group-based acknowledgment feedback based on a first group index of the first group-based acknowledgment feedback having a lower index value than a second group index of the second group-based acknowledgment feedback. In some examples, the feedback determination manager 1115 may append the second group-based acknowledgment feedback to the first group-based acknowledgment feedback based on a request for the second group-based acknowledgment feedback being received in downlink control information associated with the first group of transmissions.

In some examples, the feedback determination manager 1115 may format the first acknowledgment feedback for one or more downlink transmissions associated with the first downlink control information format separately from second acknowledgment feedback associated with a different downlink control information having the second downlink control information format. In some cases, the first group-based acknowledgment feedback is formatted relative to a prior group-based acknowledgment feedback based on whether the first new acknowledgment feedback indicator is different than a prior new acknowledgment feedback indicator associated with the prior group-based acknowledgment feedback. In some cases, a subsequent group-based acknowledgment feedback is formatted relative to the first group-based acknowledgment feedback based on whether a subsequent new acknowledgment feedback indicator is different than the second new acknowledgment feedback indicator. In some cases, the first group-based acknowledgment feedback is formatted based on which of the first new acknowledgment feedback indicator or the second new acknowledgment feedback indicator is received earliest or latest in time. In some cases, the first group-based acknowledgment feedback is formatted based on which of the first new acknowledgment feedback indicator or the second new acknowledgment feedback indicator is received in a majority of sets of group-based acknowledgment feedback parameters associated with the first group-based acknowledgment feedback.

In some cases, a downlink assignment indicator field is reset upon receipt of a changed new acknowledgment feedback indicator value, and where different subsets of feedback information are determined for each reset of the downlink assignment indicator field. In some cases, a downlink assignment indicator field is not reset within an acknowledgment/negative-acknowledgment opportunity.

In some cases, a downlink assignment indicator field of the second downlink control information format is applied separately when determining the second acknowledgment feedback.

In some cases, the first acknowledgment feedback includes feedback information only for downlink transmissions associated with only the first downlink control information format or only the second downlink control information format. In some cases, the first acknowledgment feedback includes feedback information for downlink transmissions associated with both the first downlink control information format and the second downlink control information format. In some cases, the first acknowledgment feedback includes feedback information based on one or more of a first codebook for downlink transmissions associated with the second downlink control information format, a second codebook for downlink transmissions associated with the second downlink control information format having a first group identification, or a third codebook for downlink transmissions associated with the second downlink control information format having a second group identification.

The feedback transmission manager 1125 may transmit the first group-based acknowledgement feedback transmission to the base station. In some examples, the feedback transmission manager 1125 may transmit only a latest subset of feedback information associated with a latest received new acknowledgment feedback indicator. In some examples, the feedback transmission manager 1125 may transmit the first group-based acknowledgement feedback and the second group-based acknowledgment feedback to the base station in the first uplink transmission. In some examples, the feedback transmission manager 1125 may transmit the combined feedback report to the base station in the first uplink transmission.

In some cases, the feedback transmission manager 1125 may transmit non-group-based acknowledgment feedback associated with the second non-group-based downlink transmission in the second acknowledgment feedback occasion. In some examples, the feedback transmission manager 1125 may transmit group-based acknowledgment feedback associated with one or more or the first group-based downlink transmission or the third group-based downlink transmission in the third acknowledgment feedback occasion.

The downlink transmission manager 1130 may receive the one or more downlink transmissions of the first group of downlink transmissions. In some examples, the downlink transmission manager 1130 may receive one or more downlink transmissions of the second group of downlink transmissions. In some cases, the downlink transmission(s) of the second group of downlink transmissions may be received prior to the one or more downlink transmissions of the first group, and a DCI scheduling the one or more downlink transmissions of the first group of downlink transmissions may also request feedback for second group of downlink transmissions.

In some cases, the downlink transmission manager 1130 may receive a first downlink control information transmission from a base station that is associated with a first group-based downlink transmission and a first acknowledgment feedback occasion. In some examples, the downlink transmission manager 1130 may receive a second downlink control information transmission, subsequent to the first downlink control information transmission, that is associated with a second non-group-based downlink transmission and a second acknowledgment feedback occasion. In some examples, the downlink transmission manager 1130 may receive a third downlink control information transmission, subsequent to the second downlink control information transmission, that is associated with a third group-based downlink transmission and a third acknowledgment feedback occasion.

The group determination manager 1120 may determine none of the first set of group-based acknowledgment feedback parameters or the second set of group-based acknowledgment feedback parameters include an explicit indication that requests feedback of another group of downlink transmissions. In some examples, the group determination manager 1120 may determine that both the first feedback timing the second feedback timing indicate a same uplink transmission slot.

In some examples, the group determination manager 1120 may identify a first request field value in the first set of group-based acknowledgment feedback parameters that indicates a request for only the first group of downlink transmissions, and a second request field value in a subsequent downlink control information transmission associated with the first group of downlink transmissions that indicates a request for both the first group of downlink transmissions and the second group of downlink transmissions.

In some examples, the group determination manager 1120 may determine that the first uplink transmission is to include both the first group-based acknowledgement feedback and the second group-based acknowledgment feedback based on the second request field value. In some examples, the group determination manager 1120 when an initial received request field value indicates that the first uplink transmission is to include both the first group-based acknowledgement feedback and the second group-based acknowledgment feedback, and a subsequent received request field value indicates that only one of the first group-based acknowledgement feedback or the second group-based acknowledgment feedback is to be provided with the first uplink transmission, discontinue group-based acknowledgment feedback determination for the first uplink transmission.

In some cases, the first downlink control information and the second downlink control information each further include a group indicator that indicates that both the first downlink transmission and the second downlink transmission are in a same group of downlink transmissions.

In some cases, a latest received request field value is used to determine whether the first uplink transmission includes both the first group-based acknowledgement feedback and the second group-based acknowledgment feedback.

In some cases, the first group-based acknowledgement feedback and the second group-based acknowledgment feedback may be transmitted when at least one of the first downlink control information or the second downlink control information indicate a request for both the first group of downlink transmissions and the second group of downlink transmissions.

In some cases, the UE is not expected to receive different downlink control information transmissions that schedule downlink transmissions of different downlink transmission groups and point to a same transmission time for the first group-based acknowledgement feedback and the second group-based acknowledgment feedback.

The NFI determination component 1135 may determine that a value of the second new acknowledgment feedback indicator is different than a prior value of the second new acknowledgement feedback indicator associated with the second group of downlink transmissions from a prior downlink control information transmission from the base station.

In some examples, the NFI determination component 1135 may determine that a value of the second new acknowledgment feedback indicator is unchanged from a prior value of the second new acknowledgement feedback indicator associated with the second group of downlink transmissions from a prior downlink control information transmission from the base station.

In some cases, the NFI determination component 1135 may determine that an NFI is toggled between the first acknowledgment feedback occasion and the third acknowledgment feedback occasion based on a difference in a first NFI value provided in the first downlink control information and a second NFI value provided in the third downlink control information. In some cases, NFI is assumed to be toggled between the first acknowledgment feedback occasion and the third acknowledgment feedback occasion.

Figure 12:
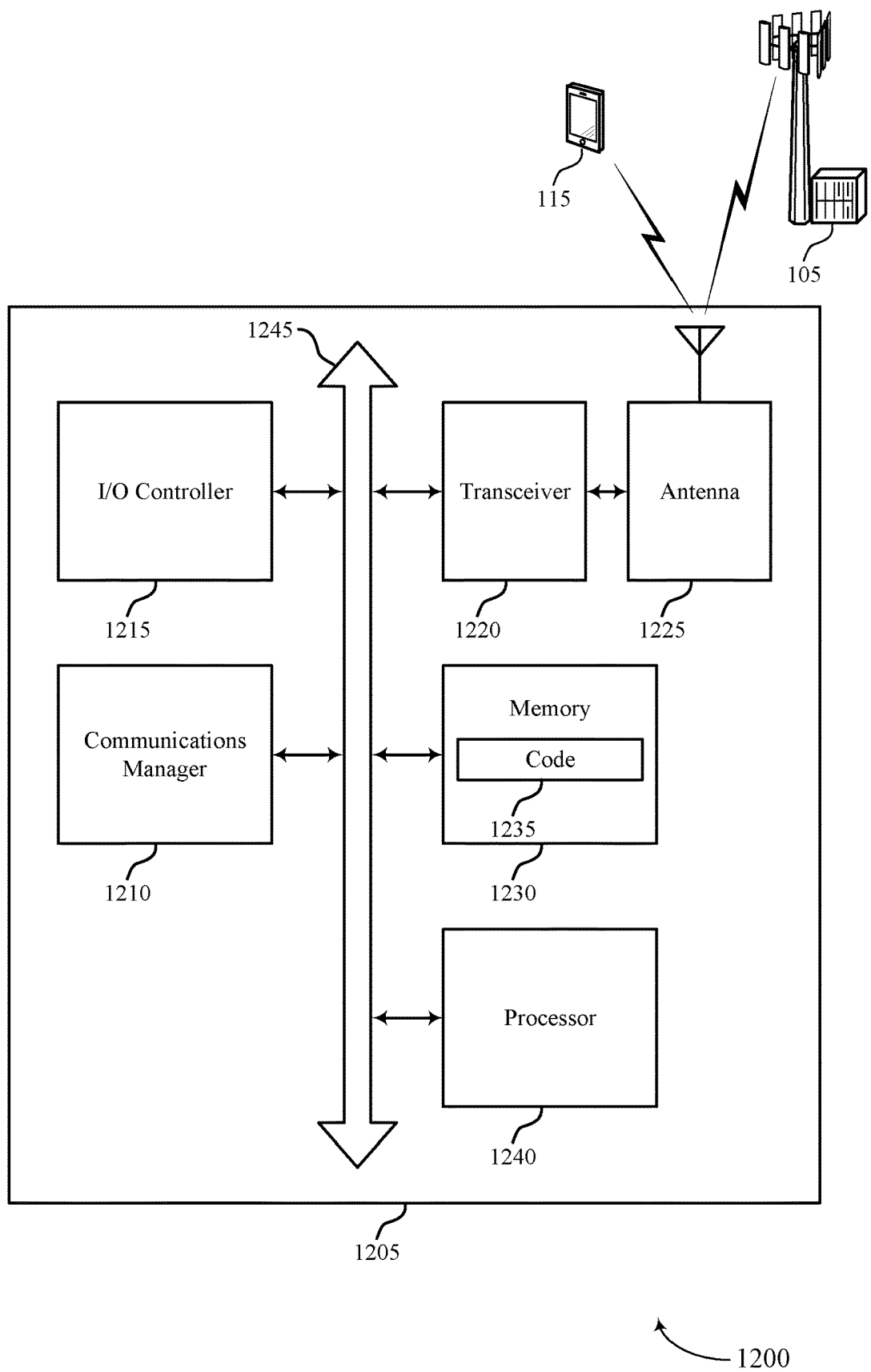
FIG. 12 shows a diagram of a system including a device that supports group-based acknowledgment feedback techniques for wireless communications in accordance with aspects of the present disclosure.

FIG. 12 shows a diagram of a system 1200 including a device 1205 that supports group-based acknowledgment feedback techniques for wireless communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, and determine, based on which of the first new acknowledgment feedback indicator or the second new acknowledgment feedback indicator is received earliest or latest in time, the first group-based acknowledgment feedback.

The communications manager 1210 may also receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, receive the one or more downlink transmissions of the first group of downlink transmissions, determine, based on the first downlink assignment indicator and the first new acknowledgment feedback indicator, first acknowledgment feedback associated with the first group of downlink transmissions for inclusion with the first group-based acknowledgement feedback transmission, update the second group-based acknowledgement feedback associated with the second group of downlink transmissions based on the determining and transmit the first group-based acknowledgement feedback transmission to the base station.

The communications manager 1210 may also receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determine, based on the first feedback timing and the second feedback timing, that the first uplink transmission is to include both the first group-based acknowledgement feedback and the second group-based acknowledgment feedback.

The communications manager 1210 may also receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields, receive a downlink control information transmission from the base station having the second downlink control information format, determine, based on using a predetermined value for each field of the first subset of information fields, first acknowledgment feedback associated with at least a first group of downlink transmissions, and transmit the first acknowledgment feedback to the base station.

The communications manager 1210 may also receive a first downlink control information transmission from a base station that is associated with a first group-based downlink transmission and a first acknowledgment feedback occasion, receive a second downlink control information transmission, subsequent to the first downlink control information transmission, that is associated with a second non-group-based downlink transmission and a second acknowledgment feedback occasion, receive a third downlink control information transmission, subsequent to the second downlink control information transmission, that is associated with a third group-based downlink transmission and a third acknowledgment feedback occasion, transmit non-group-based acknowledgment feedback associated with the second non-group-based downlink transmission in the second acknowledgment feedback occasion, and transmit group-based acknowledgment feedback associated with one or more of the first group-based downlink transmission or the third group-based downlink transmission in the third acknowledgment feedback occasion.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/basic output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting group-based acknowledgment feedback techniques for wireless communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
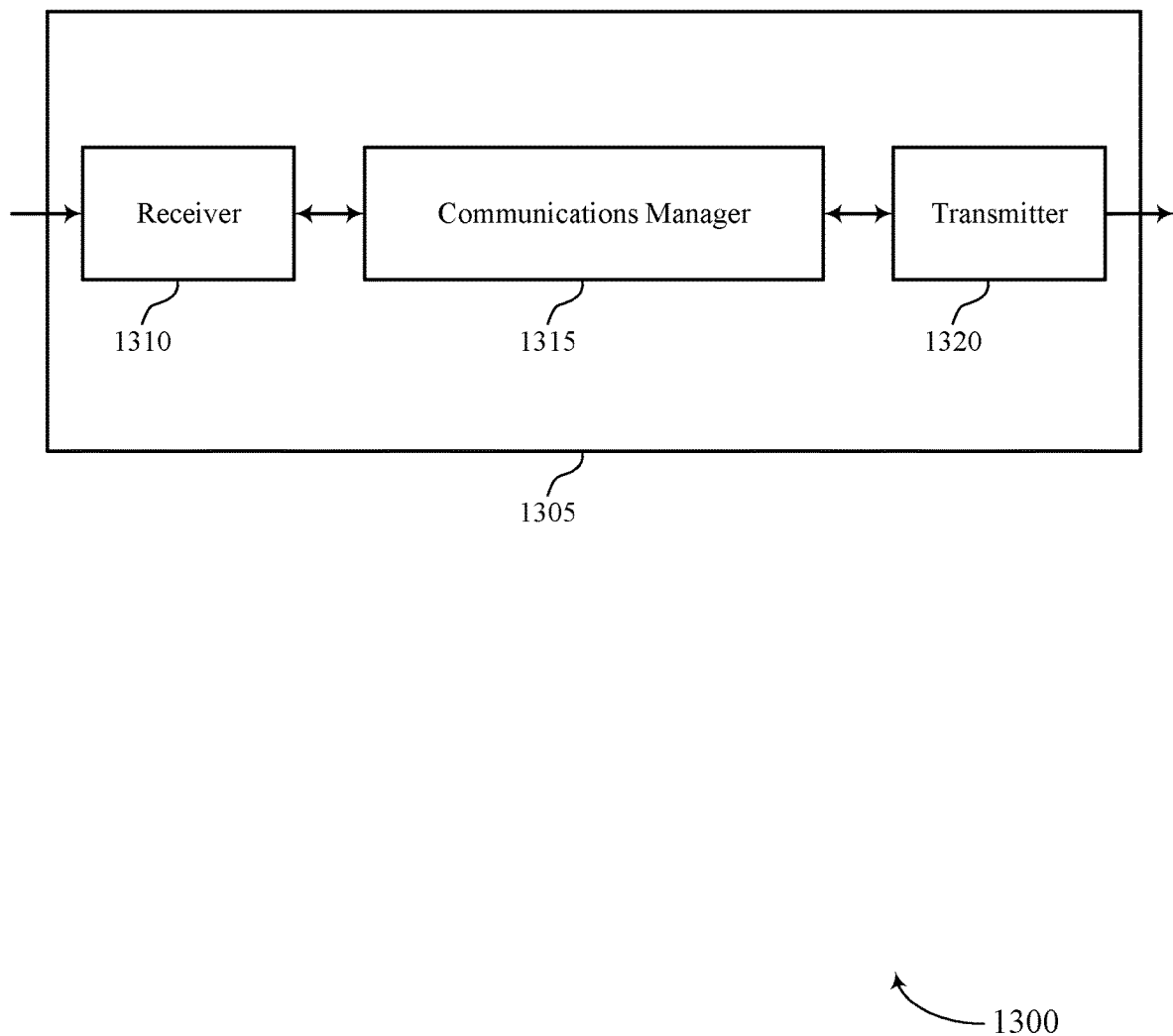
FIGS. 13 and 14 show block diagrams of devices that support group-based acknowledgment feedback techniques for wireless communications in accordance with aspects of the present disclosure.

FIG. 13 shows a block diagram 1300 of a device 1305 that supports group-based acknowledgment feedback techniques for wireless communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to group-based acknowledgment feedback techniques for wireless communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit first downlink control information to a UE that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, transmit second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, transmit the first downlink transmission and the second downlink transmission to the UE, receive at least the first group-based acknowledgment feedback from the UE in the first uplink transmission.

The communications manager 1315 may also transmit downlink control information to a UE that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, determine, based on the first downlink assignment indicator and the first new acknowledgment feedback indicator, which acknowledgment feedback is to be included with the first group-based acknowledgement feedback transmission, transmit the one or more downlink transmissions of the first group of downlink transmissions to the UE, receive the first group-based acknowledgement feedback transmission from the UE.

The communications manager 1315 may also transmit first downlink control information to a UE that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, transmit a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions, and determine, based on the first feedback timing and the second feedback timing, whether the first uplink transmission is to include one or more of the first group-based acknowledgement feedback or the second group-based acknowledgment feedback.

The communications manager 1315 may also transmit, to a UE, configuration information for group-based acknowledgment feedback for one or more groups of downlink transmissions to the UE, where one or more parameters associated with the group-based acknowledgment feedback are indicated in a first set of fields of a first downlink control information format, and are indicated in a second set of fields of a second downlink control information format that is different than the first set of fields, transmit a downlink control information transmission from the base station having the second downlink control information format, determine, based on the one or more parameters of the second set of fields of the second downlink control information format, that first acknowledgment feedback associated with at least a first group of downlink transmissions is to be transmitted in the first acknowledgment feedback, and receive the first acknowledgment feedback from the UE. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
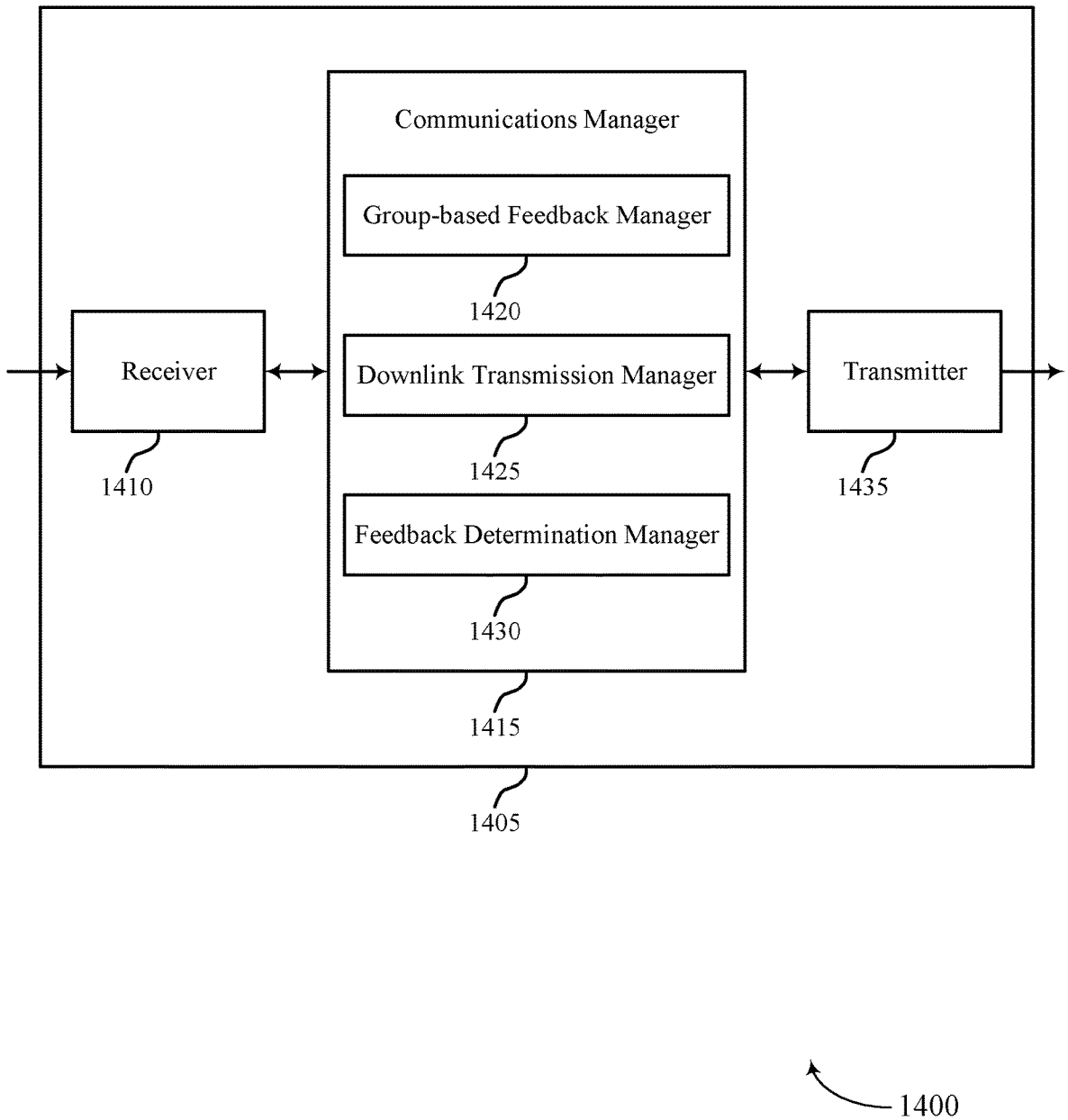

FIG. 14 shows a block diagram 1400 of a device 1405 that supports group-based acknowledgment feedback techniques for wireless communications in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to group-based acknowledgment feedback techniques for wireless communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a group-based feedback manager 1420, a downlink transmission manager 1425, and a feedback determination manager 1430. The communications manager 1415 may be an example of aspects of the communications manager 1610 described herein.

In some cases, the group-based feedback manager 1420 may transmit first downlink control information to a UE that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback and transmit second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback. The downlink transmission manager 1425 may transmit the first downlink transmission and the second downlink transmission to the UE. The feedback determination manager 1430 may receive at least the first group-based acknowledgment feedback from the UE in the first uplink transmission.

In some cases, the group-based feedback manager 1420 may transmit downlink control information to a UE that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions and determine, based on the first downlink assignment indicator and the first new acknowledgment feedback indicator, which acknowledgment feedback is to be included with the first group-based acknowledgement feedback transmission. The downlink transmission manager 1425 may transmit the one or more downlink transmissions of the first group of downlink transmissions to the UE. The feedback determination manager 1430 may receive the first group-based acknowledgement feedback transmission from the UE.

In some cases, the group-based feedback manager 1420 may transmit first downlink control information to a UE that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions and transmit a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions. The feedback determination manager 1430 may determine, based on the first feedback timing and the second feedback timing, whether the first uplink transmission is to include one or more of the first group-based acknowledgement feedback or the second group-based acknowledgment feedback.

In some cases, the group-based feedback manager 1420 may transmit, to a UE, configuration information for group-based acknowledgment feedback for one or more groups of downlink transmissions to the UE, where one or more parameters associated with the group-based acknowledgment feedback are indicated in a first set of fields of a first downlink control information format, and are indicated in a second set of fields of a second downlink control information format that is different than the first set of fields and transmit a downlink control information transmission from the base station having the second downlink control information format. The feedback determination manager 1430 may determine, based on the one or more parameters of the second set of fields of the second downlink control information format, that first acknowledgment feedback associated with at least a first group of downlink transmissions is to be transmitted in the first acknowledgment feedback and receive the first acknowledgment feedback from the UE.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
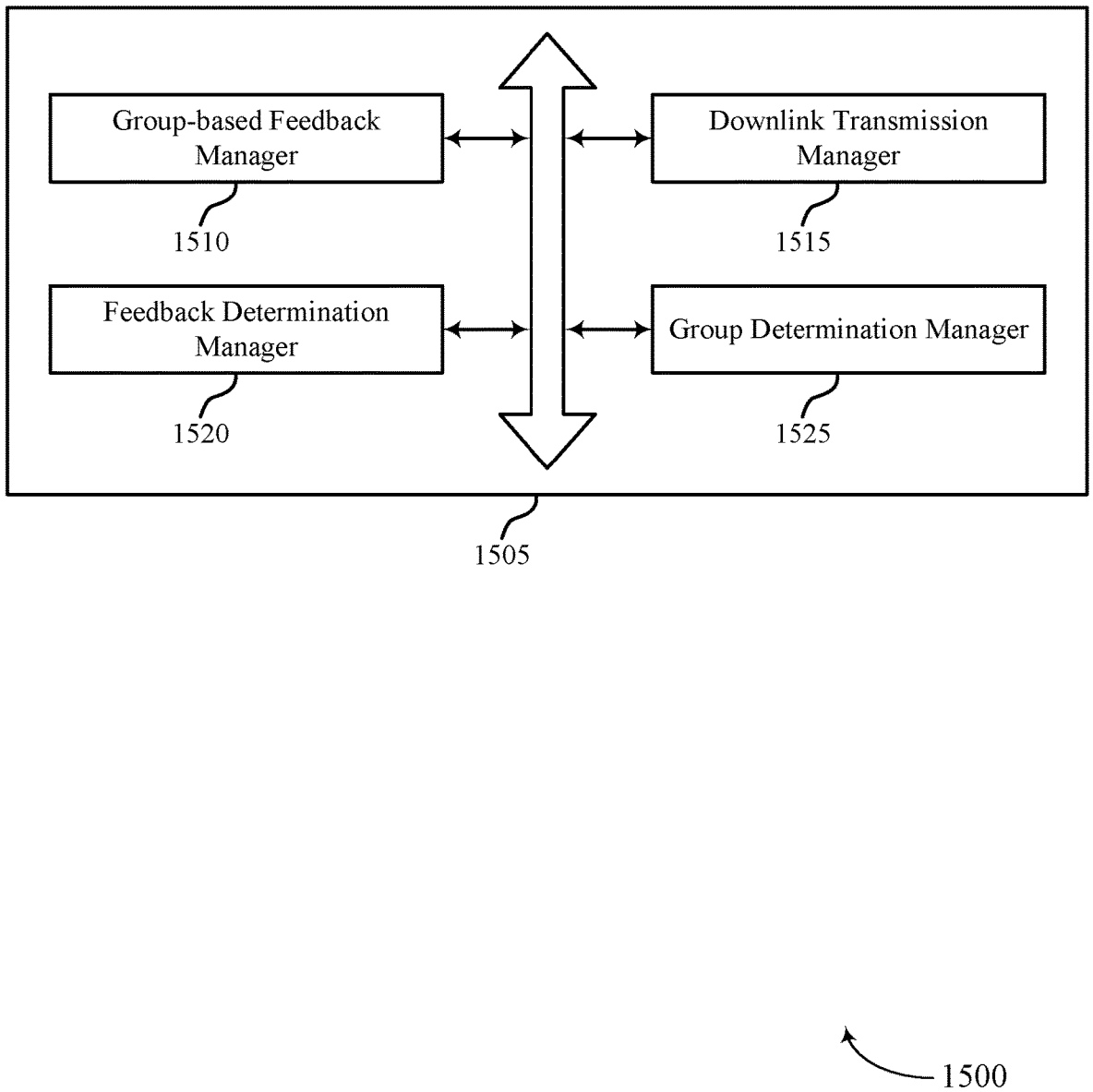
FIG. 15 shows a block diagram of a communications manager that supports group-based acknowledgment feedback techniques for wireless communications in accordance with aspects of the present disclosure.

FIG. 15 shows a block diagram 1500 of a communications manager 1505 that supports group-based acknowledgment feedback techniques for wireless communications in accordance with aspects of the present disclosure. The communications manager 1505 may be an example of aspects of a communications manager 1315, a communications manager 1415, or a communications manager 1610 described herein. The communications manager 1505 may include a group-based feedback manager 1510, a downlink transmission manager 1515, a feedback determination manager 1520, and a group determination manager 1525. Each of these modules may communicate, directly or indirectly, with one another (e.g., via one or more buses).

The group-based feedback manager 1510 may transmit first downlink control information to a UE that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback.

In some examples, the group-based feedback manager 1510 may transmit second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback.

In some examples, the group-based feedback manager 1510 may transmit downlink control information to a UE that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions.

In some examples, the group-based feedback manager 1510 may determine, based on the first downlink assignment indicator and the first new acknowledgment feedback indicator, which acknowledgment feedback is to be included with the first group-based acknowledgement feedback transmission.

In some examples, the group-based feedback manager 1510 may transmit first downlink control information to a UE that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions.

In some examples, the group-based feedback manager 1510 may transmit a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions.

In some examples, the group-based feedback manager 1510 may transmit, to a UE, configuration information for group-based acknowledgment feedback for one or more groups of downlink transmissions to the UE, where one or more parameters associated with the group-based acknowledgment feedback are indicated in a first set of fields of a first downlink control information format, and are indicated in a second set of fields of a second downlink control information format that is different than the first set of fields.

In some examples, the group-based feedback manager 1510 may transmit a downlink control information transmission from the base station having the second downlink control information format.

The downlink transmission manager 1515 may transmit the first downlink transmission and the second downlink transmission to the UE. In some examples, the downlink transmission manager 1515 may transmit the one or more downlink transmissions of the first group of downlink transmissions to the UE.

The feedback determination manager 1520 may receive at least the first group-based acknowledgment feedback from the UE in the first uplink transmission. In some examples, the feedback determination manager 1520 may receive the first group-based acknowledgement feedback transmission from the UE. In some examples, the feedback determination manager 1520 may determine, based on the first feedback timing and the second feedback timing, whether the first uplink transmission is to include one or more of the first group-based acknowledgement feedback or the second group-based acknowledgment feedback. In some examples, the feedback determination manager 1520 may determine, based on the one or more parameters of the second set of fields of the second downlink control information format, that first acknowledgment feedback associated with at least a first group of downlink transmissions is to be transmitted in the first acknowledgment feedback. In some examples, the feedback determination manager 1520 may receive the first acknowledgment feedback from the UE.

The group determination manager 1525 may determine one or more groups of downlink transmissions. In some cases, the first set of group-based acknowledgment feedback parameters and the second set of group-based acknowledgment feedback parameters do not include an explicit indication that requests feedback of another group of downlink transmissions.

Figure 16:
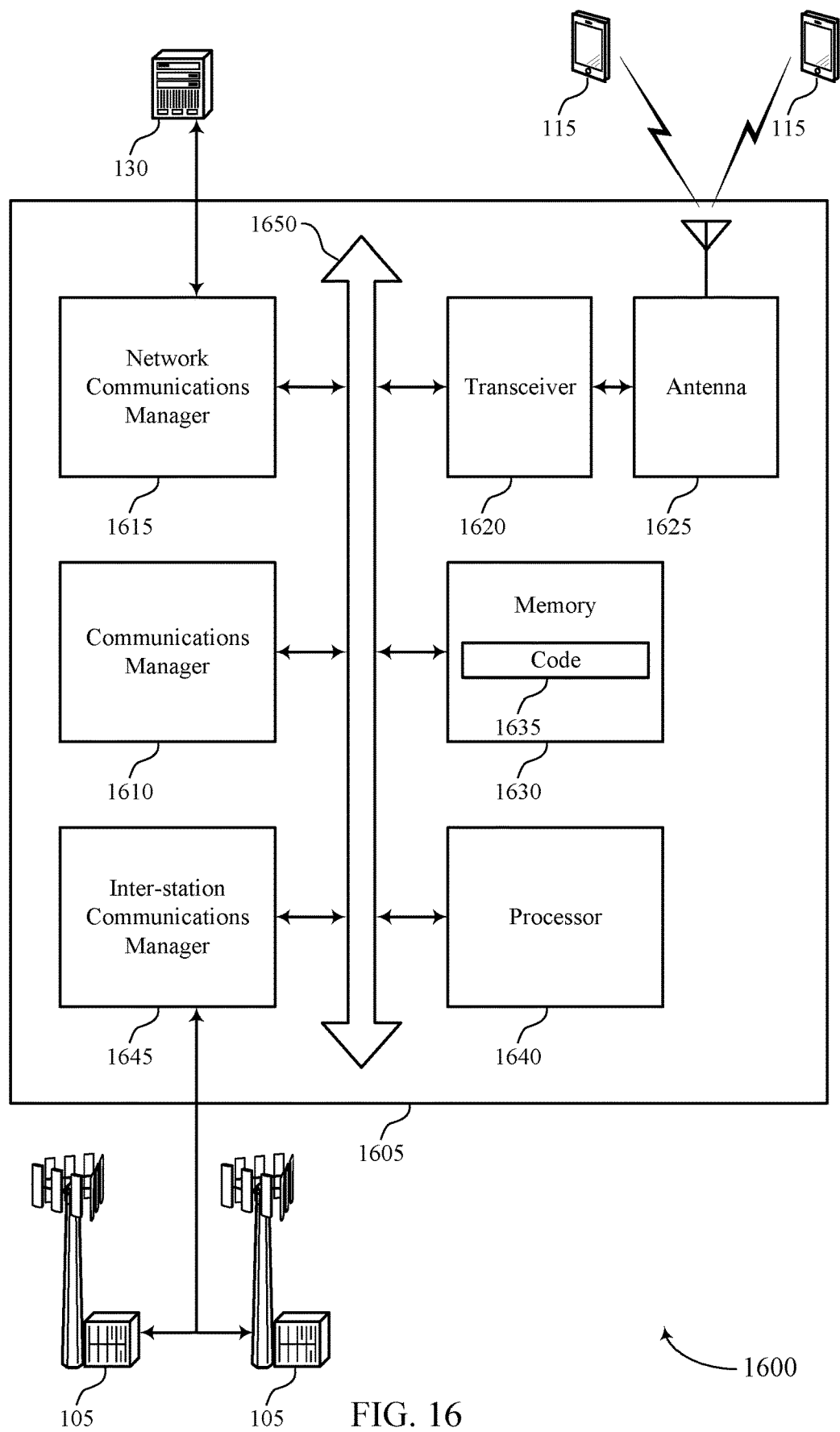
FIG. 16 shows a diagram of a system including a device that supports group-based acknowledgment feedback techniques for wireless communications in accordance with aspects of the present disclosure.

FIG. 16 shows a diagram of a system 1600 including a device 1605 that supports group-based acknowledgment feedback techniques for wireless communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit first downlink control information to a UE that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback, transmit second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback, transmit the first downlink transmission and the second downlink transmission to the UE, receive at least the first group-based acknowledgment feedback from the UE in the first uplink transmission.

The communications manager 1610 may also transmit downlink control information to a UE that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions, determine, based on the first downlink assignment indicator and the first new acknowledgment feedback indicator, which acknowledgment feedback is to be included with the first group-based acknowledgement feedback transmission, transmit the one or more downlink transmissions of the first group of downlink transmissions to the UE, receive the first group-based acknowledgement feedback transmission from the UE.

The communications manager 1610 may also transmit first downlink control information to a UE that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions, transmit a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgement feedback associated with the second group of downlink transmissions, and determine, based on the first feedback timing and the second feedback timing, whether the first uplink transmission is to include one or more of the first group-based acknowledgement feedback or the second group-based acknowledgment feedback.

The communications manager 1610 may also transmit, to a UE, configuration information for group-based acknowledgment feedback for one or more groups of downlink transmissions to the UE, where one or more parameters associated with the group-based acknowledgment feedback are indicated in a first set of fields of a first downlink control information format, and are indicated in a second set of fields of a second downlink control information format that is different than the first set of fields, transmit a downlink control information transmission from the base station having the second downlink control information format, determine, based on the one or more parameters of the second set of fields of the second downlink control information format, that first acknowledgment feedback associated with at least a first group of downlink transmissions is to be transmitted in the first acknowledgment feedback, and receive the first acknowledgment feedback from the UE.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting group-based acknowledgment feedback techniques for wireless communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
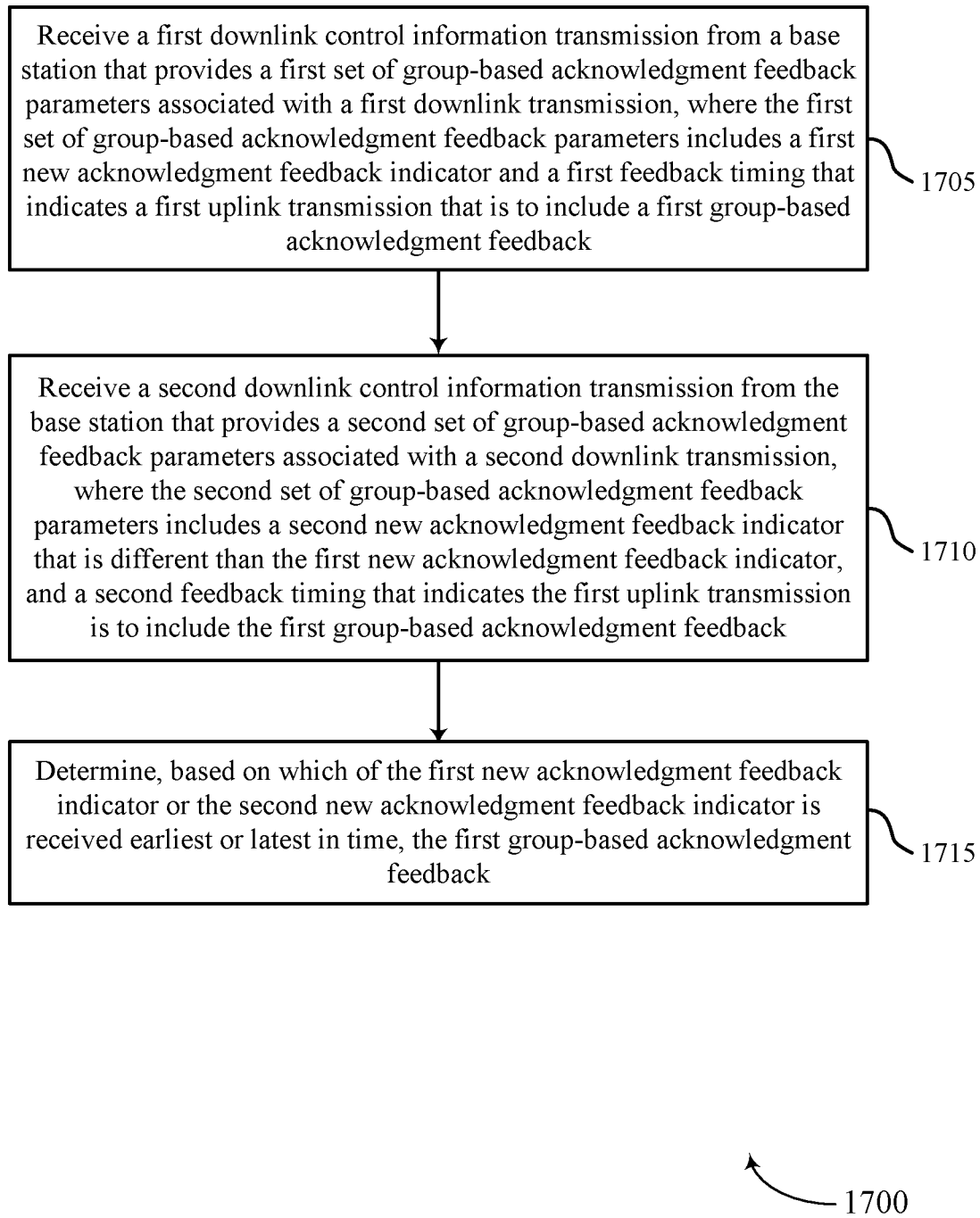
FIGS. 17 through 24 show flowcharts illustrating methods that support group-based acknowledgment feedback techniques for wireless communications in accordance with aspects of the present disclosure.

FIG. 17 shows a flowchart illustrating a method 1700 that supports group-based acknowledgment feedback techniques for wireless communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive a first downlink control information transmission from a base station that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback. The operations of 1705 may be performed according to the methods described herein. In some examples, aspects of the operations of 1705 may be performed by a group-based feedback manager as described with reference to FIGS. 9 through 12.

At 1710, the UE may receive a second downlink control information transmission from the base station that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback. The operations of 1710 may be performed according to the methods described herein. In some examples, aspects of the operations of 1710 may be performed by a group-based feedback manager as described with reference to FIGS. 9 through 12.

At 1715, the UE may determine, based on which of the first new acknowledgment feedback indicator or the second new acknowledgment feedback indicator is received earliest or latest in time, the first group-based acknowledgment feedback. The operations of 1715 may be performed according to the methods described herein. In some examples, aspects of the operations of 1715 may be performed by a feedback determination manager as described with reference to FIGS. 9 through 12.

Figure 18:
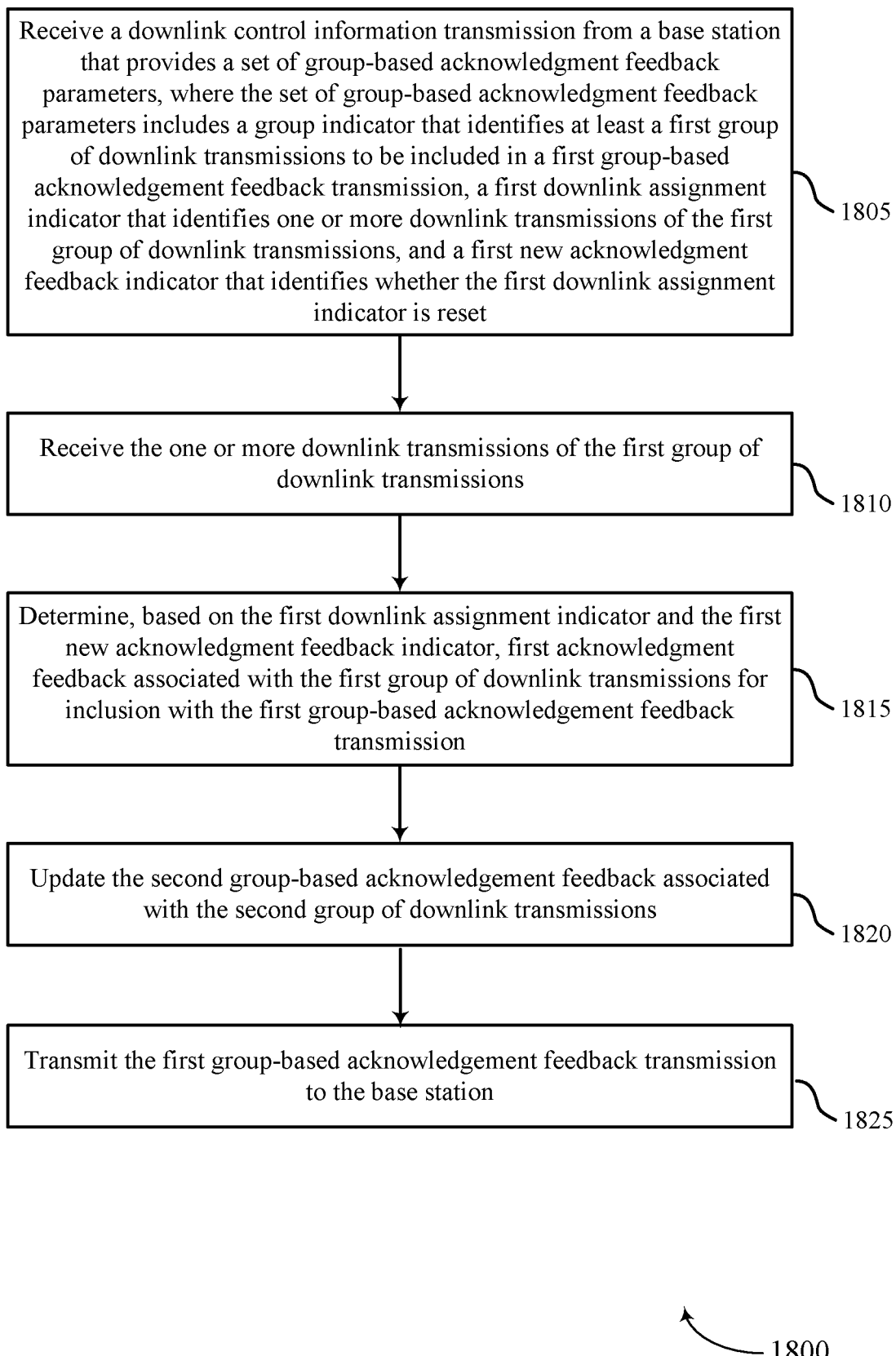

FIG. 18 shows a flowchart illustrating a method 1800 that supports group-based acknowledgment feedback techniques for wireless communications in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive a downlink control information transmission from a base station that provides a set of group-based acknowledgment feedback parameters, where the set of group-based acknowledgment feedback parameters includes a group indicator that identifies at least a first group of downlink transmissions to be included in a first group-based acknowledgement feedback transmission, a first downlink assignment indicator that identifies one or more downlink transmissions of the first group of downlink transmissions, a second downlink assignment indicator that identifies one or more downlink transmissions of a second group of downlink transmissions, a first new acknowledgment feedback indicator that identifies whether the first downlink assignment indicator is reset, and a second new acknowledgment feedback indicator associated with the second group of downlink transmissions. The operations of 1805 may be performed according to the methods described herein. In some examples, aspects of the operations of 1805 may be performed by a group-based feedback manager as described with reference to FIGS. 9 through 12.

At 1810, the UE may receive the one or more downlink transmissions of the first group of downlink transmissions. The operations of 1810 may be performed according to the methods described herein. In some examples, aspects of the operations of 1810 may be performed by a downlink transmission manager as described with reference to FIGS. 9 through 12.

At 1815, the UE may determine, based on the first downlink assignment indicator and the first new acknowledgment feedback indicator, first acknowledgment feedback associated with the first group of downlink transmissions for inclusion with the first group-based acknowledgement feedback transmission. The operations of 1815 may be performed according to the methods described herein. In some examples, aspects of the operations of 1815 may be performed by a feedback determination manager as described with reference to FIGS. 9 through 12.

At 1820, the UE may update the second group-based acknowledgement feedback associated with the second group of downlink transmissions based on the determining. The operations of 1820 may be performed according to the methods described herein. In some examples, aspects of the operations of 1820 may be performed by a feedback transmission manager as described with reference to FIGS. 9 through 12.

At 1825, the UE may transmit the first group-based acknowledgement feedback transmission to the base station. The operations of 1825 may be performed according to the methods described herein. In some examples, aspects of the operations of 1825 may be performed by a feedback transmission manager as described with reference to FIGS. 9 through 12.

Figure 19:
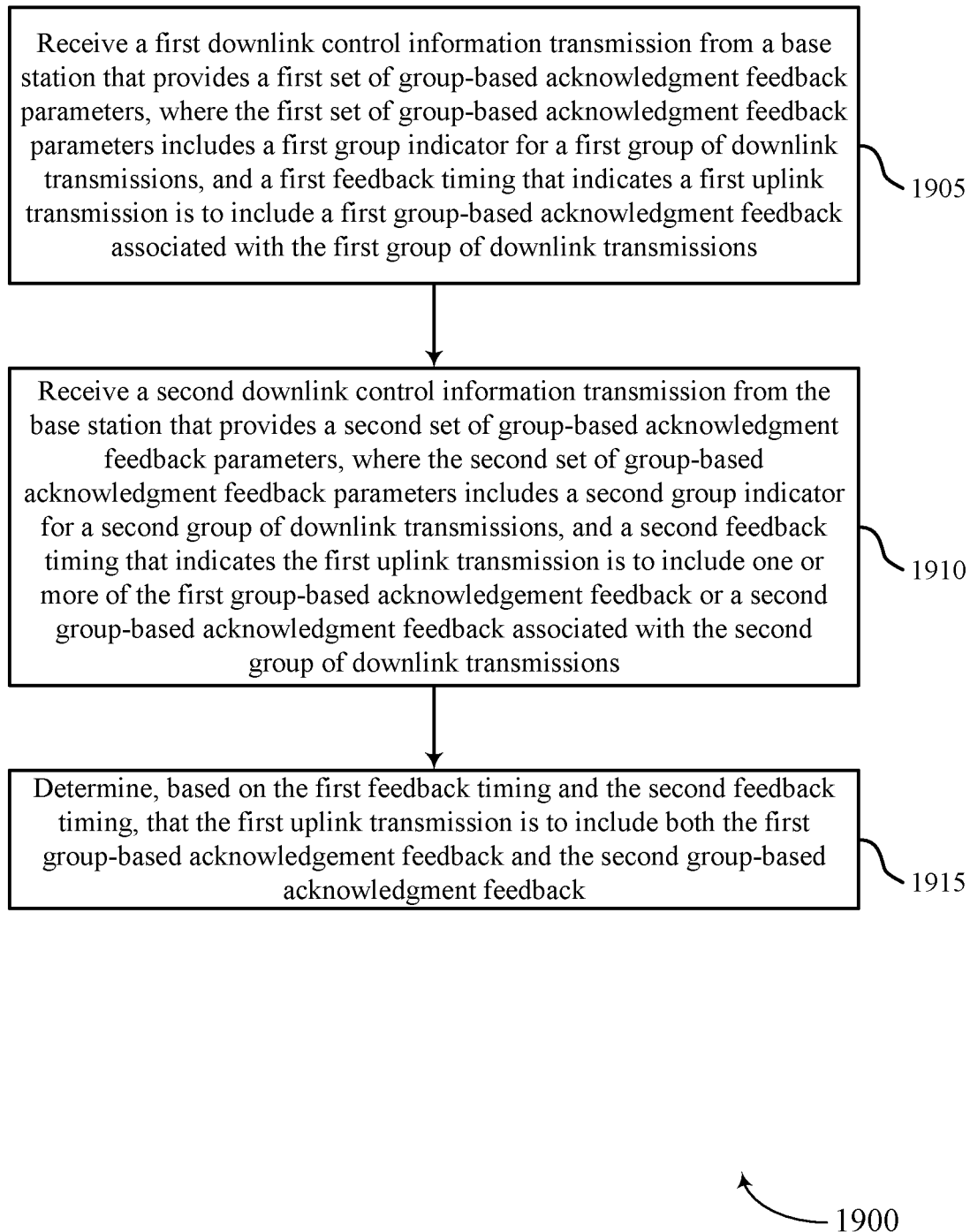

FIG. 19 shows a flowchart illustrating a method 1900 that supports group-based acknowledgment feedback techniques for wireless communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions. The operations of 1905 may be performed according to the methods described herein. In some examples, aspects of the operations of 1905 may be performed by a group-based feedback manager as described with reference to FIGS. 9 through 12.

At 1910, the UE may receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions. The operations of 1910 may be performed according to the methods described herein. In some examples, aspects of the operations of 1910 may be performed by a group-based feedback manager as described with reference to FIGS. 9 through 12.

At 1915, the UE may determine, based on the first feedback timing and the second feedback timing, that the first uplink transmission is to include both the first group-based acknowledgement feedback and the second group-based acknowledgment feedback. The operations of 1915 may be performed according to the methods described herein. In some examples, aspects of the operations of 1915 may be performed by a feedback determination manager as described with reference to FIGS. 9 through 12.

Figure 20:
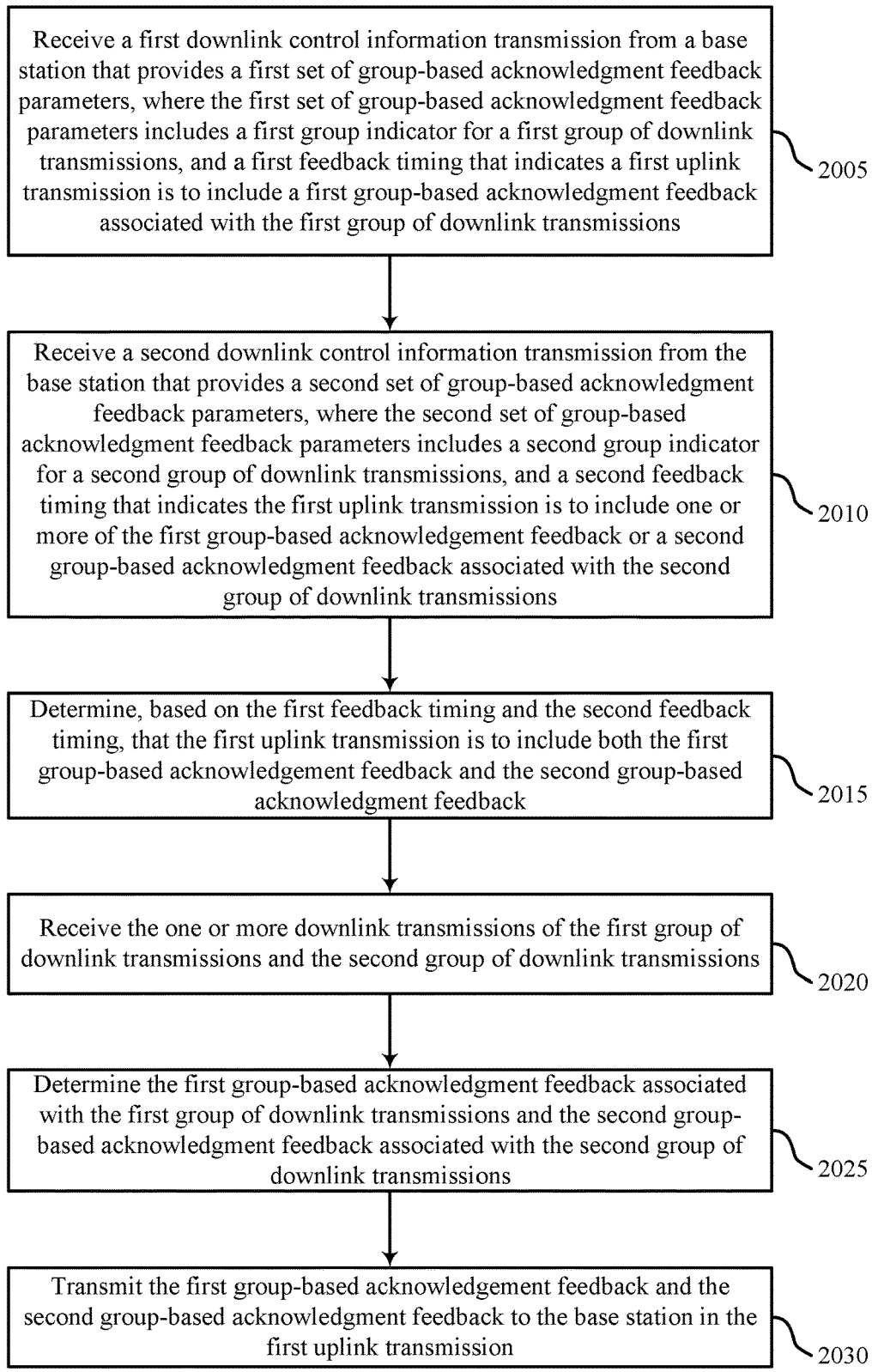

FIG. 20 shows a flowchart illustrating a method 2000 that supports group-based acknowledgment feedback techniques for wireless communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions. The operations of 2005 may be performed according to the methods described herein. In some examples, aspects of the operations of 2005 may be performed by a group-based feedback manager as described with reference to FIGS. 9 through 12.

At 2010, the UE may receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions. The operations of 2010 may be performed according to the methods described herein. In some examples, aspects of the operations of 2010 may be performed by a group-based feedback manager as described with reference to FIGS. 9 through 12.

At 2015, the UE may determine, based on the first feedback timing and the second feedback timing, that the first uplink transmission is to include both the first group-based acknowledgement feedback and the second group-based acknowledgment feedback. The operations of 2015 may be performed according to the methods described herein. In some examples, aspects of the operations of 2015 may be performed by a feedback determination manager as described with reference to FIGS. 9 through 12.

At 2020, the UE may receive the one or more downlink transmissions of the first group of downlink transmissions and the second group of downlink transmissions. The operations of 2020 may be performed according to the methods described herein. In some examples, aspects of the operations of 2020 may be performed by a downlink transmission manager as described with reference to FIGS. 9 through 12.

At 2025, the UE may determine the first group-based acknowledgment feedback associated with the first group of downlink transmissions and the second group-based acknowledgment feedback associated with the second group of downlink transmissions. The operations of 2025 may be performed according to the methods described herein. In some examples, aspects of the operations of 2025 may be performed by a feedback determination manager as described with reference to FIGS. 9 through 12.

At 2030, the UE may transmit the first group-based acknowledgement feedback and the second group-based acknowledgment feedback to the base station in the first uplink transmission. The operations of 2030 may be performed according to the methods described herein. In some examples, aspects of the operations of 2030 may be performed by a feedback transmission manager as described with reference to FIGS. 9 through 12.

Figure 21:
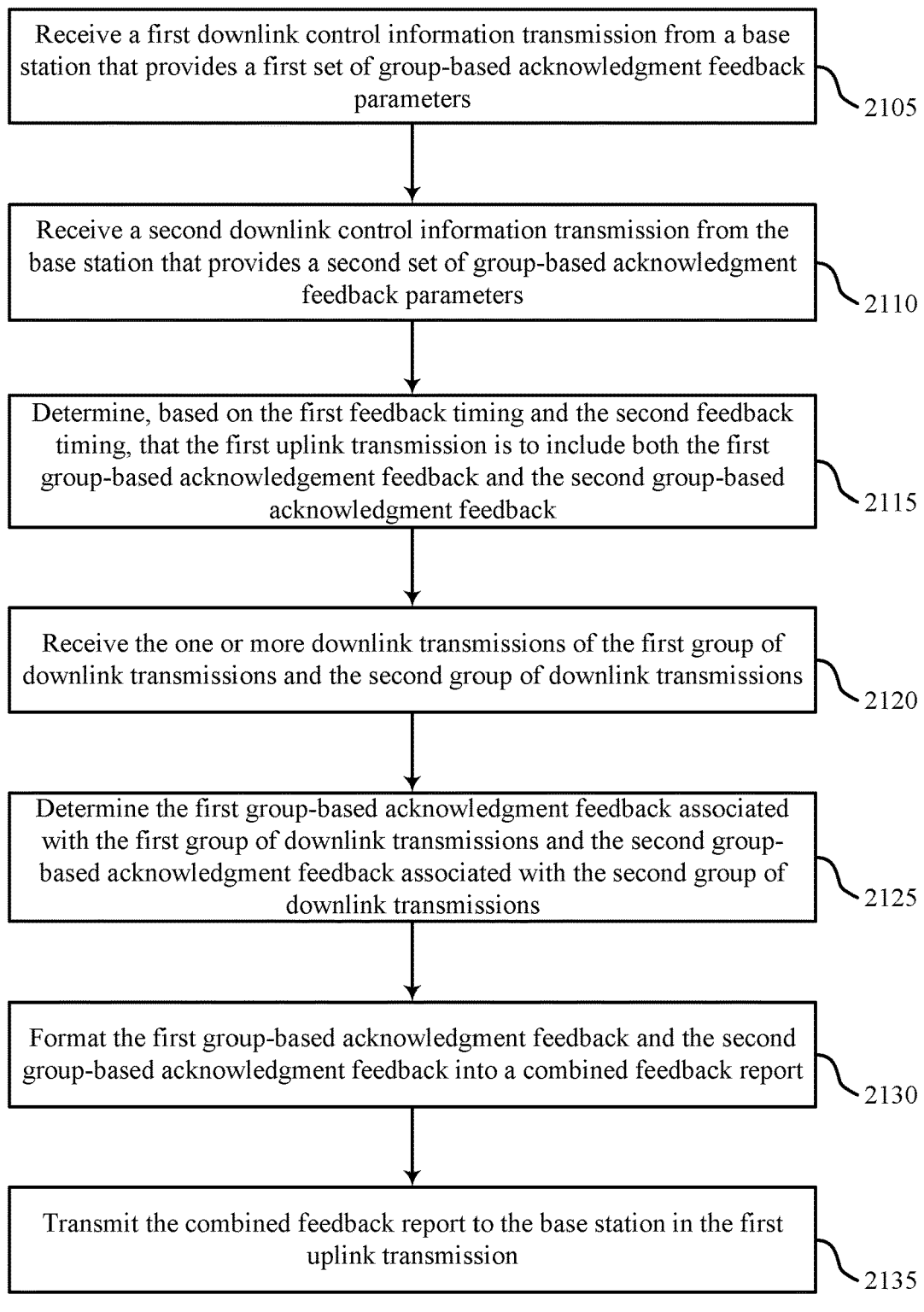

FIG. 21 shows a flowchart illustrating a method 2100 that supports group-based acknowledgment feedback techniques for wireless communications in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may receive a first downlink control information transmission from a base station that provides a first set of group-based acknowledgment feedback parameters, where the first set of group-based acknowledgment feedback parameters includes a first group indicator for a first group of downlink transmissions, and a first feedback timing that indicates a first uplink transmission is to include a first group-based acknowledgment feedback associated with the first group of downlink transmissions. The operations of 2105 may be performed according to the methods described herein. In some examples, aspects of the operations of 2105 may be performed by a group-based feedback manager as described with reference to FIGS. 9 through 12.

At 2110, the UE may receive a second downlink control information transmission from the base station that provides a second set of group-based acknowledgment feedback parameters, where the second set of group-based acknowledgment feedback parameters includes a second group indicator for a second group of downlink transmissions, and a second feedback timing that indicates the first uplink transmission is to include one or more of the first group-based acknowledgement feedback or a second group-based acknowledgment feedback associated with the second group of downlink transmissions. The operations of 2110 may be performed according to the methods described herein. In some examples, aspects of the operations of 2110 may be performed by a group-based feedback manager as described with reference to FIGS. 9 through 12.

At 2115, the UE may determine, based on the first feedback timing and the second feedback timing, that the first uplink transmission is to include both the first group-based acknowledgement feedback and the second group-based acknowledgment feedback. The operations of 2115 may be performed according to the methods described herein. In some examples, aspects of the operations of 2115 may be performed by a feedback determination manager as described with reference to FIGS. 9 through 12.

At 2120, the UE may receive the one or more downlink transmissions of the first group of downlink transmissions and the second group of downlink transmissions. The operations of 2120 may be performed according to the methods described herein. In some examples, aspects of the operations of 2120 may be performed by a downlink transmission manager as described with reference to FIGS. 9 through 12.

At 2125, the UE may determine the first group-based acknowledgment feedback associated with the first group of downlink transmissions and the second group-based acknowledgment feedback associated with the second group of downlink transmissions. The operations of 2125 may be performed according to the methods described herein. In some examples, aspects of the operations of 2125 may be performed by a feedback determination manager as described with reference to FIGS. 9 through 12.

At 2130, the UE may format the first group-based acknowledgment feedback and the second group-based acknowledgment feedback into a combined feedback report. The operations of 2130 may be performed according to the methods described herein. In some examples, aspects of the operations of 2130 may be performed by a feedback determination manager as described with reference to FIGS. 9 through 12.

At 2135, the UE may transmit the combined feedback report to the base station in the first uplink transmission. The operations of 2135 may be performed according to the methods described herein. In some examples, aspects of the operations of 2135 may be performed by a feedback transmission manager as described with reference to FIGS. 9 through 12.

Figure 22:
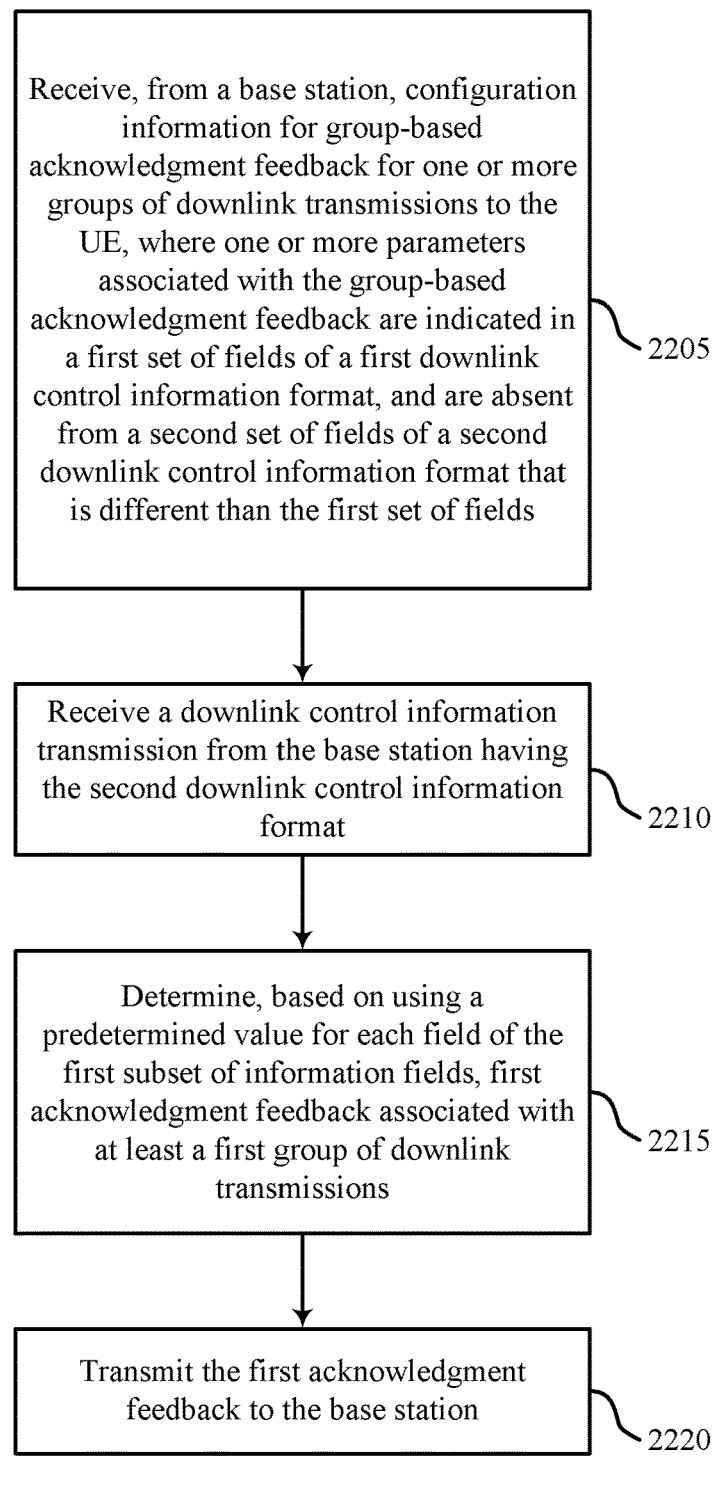

FIG. 22 shows a flowchart illustrating a method 2200 that supports group-based acknowledgment feedback techniques for wireless communications in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, configuration information for group-based acknowledgment feedback for one or more groups of downlink transmissions to the UE, where one or more parameters associated with the group-based acknowledgment feedback are indicated in a first set of fields of a first downlink control information format, and are absent from a second set of fields of a second downlink control information format that is different than the first set of fields, where the first set of fields includes a first subset of information fields that are in addition to the second set of fields. The operations of 2205 may be performed according to the methods described herein. In some examples, aspects of the operations of 2205 may be performed by a group-based feedback manager as described with reference to FIGS. 9 through 12.

At 2210, the UE may receive a downlink control information transmission from the base station having the second downlink control information format. The operations of 2210 may be performed according to the methods described herein. In some examples, aspects of the operations of 2210 may be performed by a group-based feedback manager as described with reference to FIGS. 9 through 12.

At 2215, the UE may determine, based on using a predetermined value for each field of the first subset of information fields, first acknowledgment feedback associated with at least a first group of downlink transmissions. The operations of 2215 may be performed according to the methods described herein. In some examples, aspects of the operations of 2215 may be performed by a group-based feedback manager as described with reference to FIGS. 9 through 12.

At 2220, the UE may transmit the first acknowledgment feedback to the base station. The operations of 2220 may be performed according to the methods described herein. In some examples, aspects of the operations of 2220 may be performed by a feedback transmission manager as described with reference to FIGS. 9 through 12.

Figure 23:
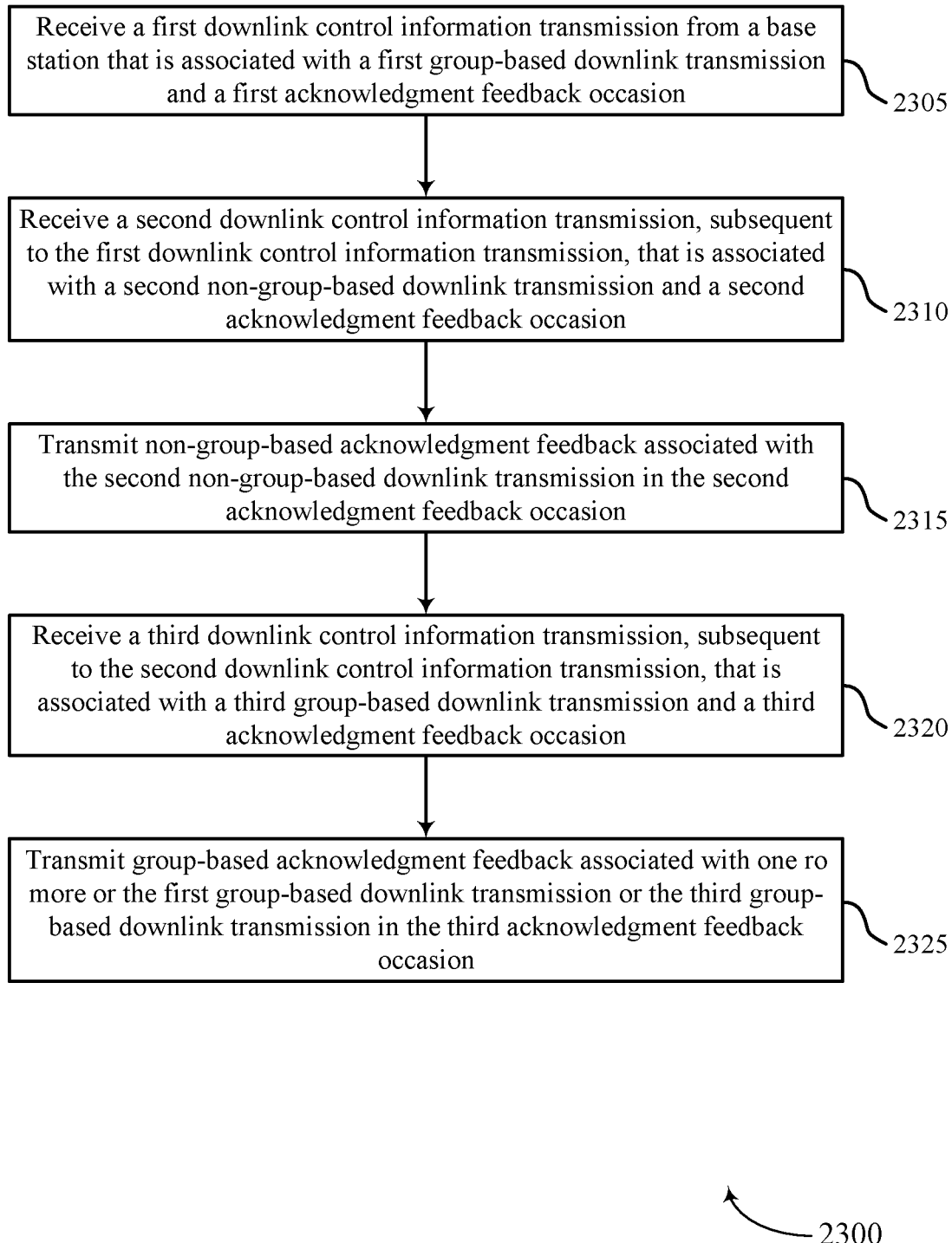

FIG. 23 shows a flowchart illustrating a method 2300 that supports group-based acknowledgment feedback techniques for wireless communications in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2305, the UE may receive a first downlink control information transmission from a base station that is associated with a first group-based downlink transmission and a first acknowledgment feedback occasion. The operations of 2305 may be performed according to the methods described herein. In some examples, aspects of the operations of 2305 may be performed by a downlink transmission manager as described with reference to FIGS. 9 through 12.

At 2310, the UE may receive a second downlink control information transmission, subsequent to the first downlink control information transmission, that is associated with a second non-group-based downlink transmission and a second acknowledgment feedback occasion. The operations of 2310 may be performed according to the methods described herein. In some examples, aspects of the operations of 2310 may be performed by a downlink transmission manager as described with reference to FIGS. 9 through 12.

At 2315, the UE may transmit non-group-based acknowledgment feedback associated with the second non-group-based downlink transmission in the second acknowledgment feedback occasion. The operations of 2315 may be performed according to the methods described herein. In some examples, aspects of the operations of 2315 may be performed by a feedback transmission manager as described with reference to FIGS. 9 through 12.

At 2320, the UE may receive a third downlink control information transmission, subsequent to the second downlink control information transmission, that is associated with a third group-based downlink transmission and a third acknowledgment feedback occasion. The operations of 2320 may be performed according to the methods described herein. In some examples, aspects of the operations of 2320 may be performed by a downlink transmission manager as described with reference to FIGS. 9 through 12.

At 2325, the UE may transmit group-based acknowledgment feedback associated with one or more or the first group-based downlink transmission or the third group-based downlink transmission in the third acknowledgment feedback occasion. The operations of 2325 may be performed according to the methods described herein. In some examples, aspects of the operations of 2325 may be performed by a feedback transmission manager as described with reference to FIGS. 9 through 12.

Figure 24:
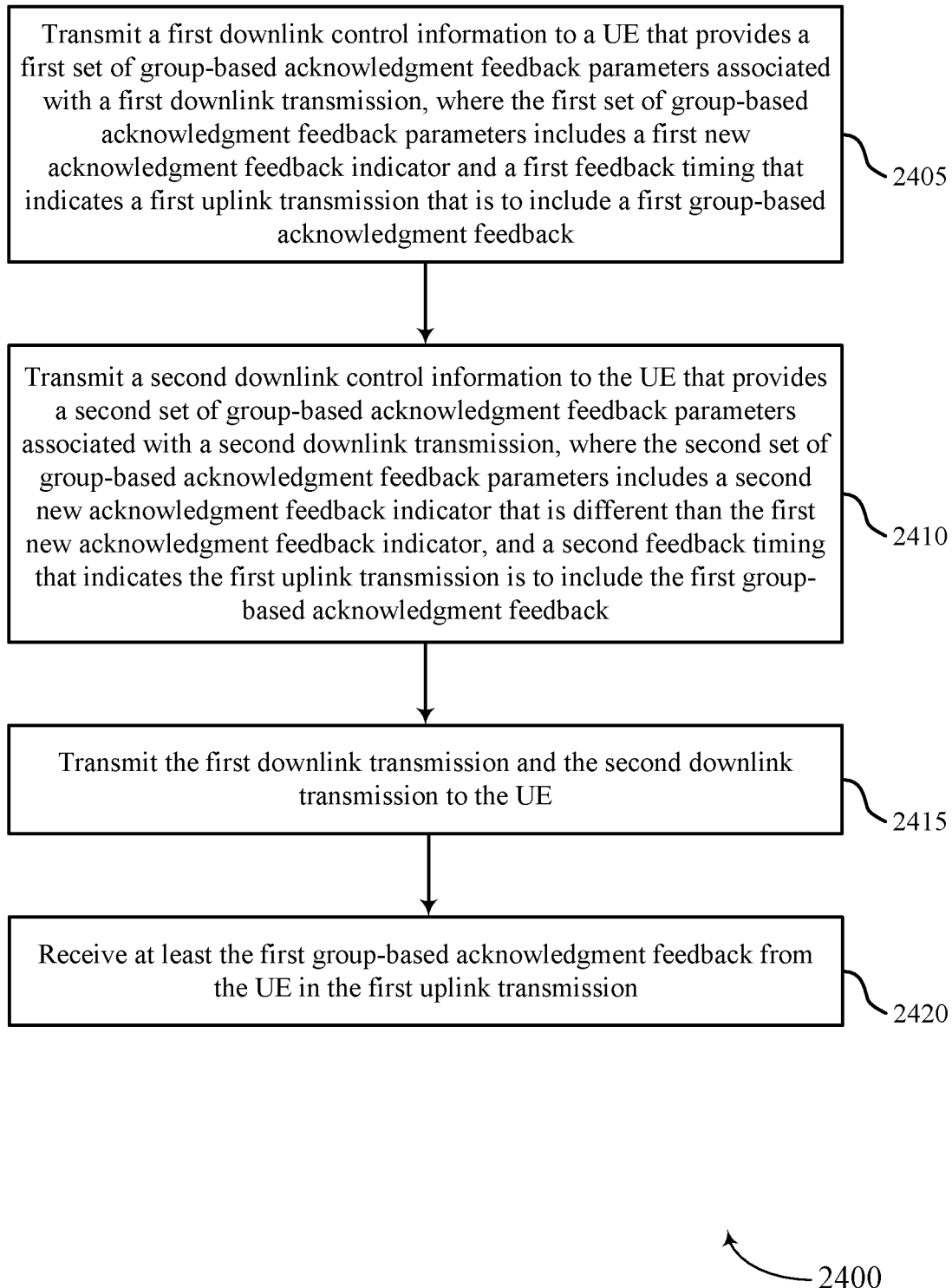

FIG. 24 shows a flowchart illustrating a method 2400 that supports group-based acknowledgment feedback techniques for wireless communications in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may transmit a first downlink control information to a UE that provides a first set of group-based acknowledgment feedback parameters associated with a first downlink transmission, where the first set of group-based acknowledgment feedback parameters includes a first new acknowledgment feedback indicator and a first feedback timing that indicates a first uplink transmission that is to include a first group-based acknowledgment feedback. The operations of 2405 may be performed according to the methods described herein. In some examples, aspects of the operations of 2405 may be performed by a downlink transmission manager as described with reference to FIGS. 13 through 16.

At 2410, the base station may transmit a second downlink control information to the UE that provides a second set of group-based acknowledgment feedback parameters associated with a second downlink transmission, where the second set of group-based acknowledgment feedback parameters includes a second new acknowledgment feedback indicator that is different than the first new acknowledgment feedback indicator, and a second feedback timing that indicates the first uplink transmission is to include the first group-based acknowledgment feedback. The operations of 2410 may be performed according to the methods described herein. In some examples, aspects of the operations of 2410 may be performed by a downlink transmission manager as described with reference to FIGS. 13 through 16.

At 2415, the base station may transmit the first downlink transmission and the second downlink transmission to the UE. The operations of 2415 may be performed according to the methods described herein. In some examples, aspects of the operations of 2415 may be performed by a feedback transmission manager as described with reference to FIGS. 13 through 14.

At 2420, the base station may receive at least the first group-based acknowledgment feedback from the UE in the first uplink transmission. The operations of 2420 may be performed according to the methods described herein. In some examples, aspects of the operations of 2420 may be performed by a downlink transmission manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network device, configuration information that enables group-based acknowledgment feedback for one or more groups of downlink transmissions to the UE, wherein one or more parameters associated with the group-based acknowledgment feedback are indicated in a first set of fields of a first downlink control information format, and are indicated in a second set of fields of a second downlink control information format that is different than the first set of fields, wherein the first set of fields includes a first subset of fields that are in addition to the second set of fields;
   receiving a downlink control information transmission from the network device having the second downlink control information format;
   determining, based at least in part on the one or more parameters of the second set of fields of the second downlink control information format, first acknowledgment feedback associated with at least a first group of downlink transmissions, wherein the determining comprises using a predetermined value for each field of the first subset of fields; and
   transmitting the first acknowledgment feedback to the network device.

2. The method of claim 1, further comprising:
   receiving, from the network device, an indication to enable the group-based acknowledgment feedback, and wherein the second set of fields of the second downlink control information format are interpreted differently based on whether the group-based acknowledgment feedback is enabled or disabled at the UE.

3. The method of claim 2, wherein the second downlink control information format is a fallback downlink control information format.

4. The method of claim 1, wherein the first subset of fields include one or more of a group indicator field, a new acknowledgment feedback indicator field, or a request field that indicates acknowledgment feedback is requested for one or more of multiple different groups of downlink transmissions.

5. The method of claim 4, wherein the predetermined value for the group indicator field corresponds to a downlink transmission group associated with the downlink control information transmission, the predetermined value for the new acknowledgment feedback indicator field corresponds to a prior value of the new acknowledgment feedback indicator field, the predetermined value for the request field corresponds to a value that indicates acknowledgment feedback is not requested for another group of downlink transmissions.

6. The method of claim 1, wherein the determining comprises:

formatting the first acknowledgment feedback for one or more downlink transmissions associated with the first downlink control information format separately from second acknowledgment feedback associated with a different downlink control information having the second downlink control information format.

7. The method of claim 6, wherein a downlink assignment indicator field of the second downlink control information format is applied separately when determining the second acknowledgment feedback.

8. The method of claim 6, wherein the first acknowledgment feedback includes feedback information only for downlink transmissions associated with only the first downlink control information format or only the second downlink control information format.

9. The method of claim 6, wherein the first acknowledgment feedback includes feedback information for downlink transmissions associated with both the first downlink control information format and the second downlink control information format.

10. The method of claim 9, wherein the first acknowledgment feedback includes the feedback information based at least in part on one or more of a first codebook for downlink transmissions associated with the second downlink control information format, a second codebook for downlink transmissions associated with the second downlink control information format having a first group identification, or a third codebook for downlink transmissions associated with the second downlink control information format having a second group identification.

11. A method for wireless communications at a user equipment (UE), comprising:
receiving a first downlink control information transmission from a network device that is associated with a first group-based downlink transmission and a first acknowledgment feedback occasion;
receiving a second downlink control information transmission, subsequent to the first downlink control information transmission, that is associated with a second non-group-based downlink transmission and a second acknowledgment feedback occasion;
transmitting non-group-based acknowledgment feedback associated with the second non-group-based downlink transmission in the second acknowledgment feedback occasion;
receiving a third downlink control information transmission, subsequent to the second downlink control information transmission, that is associated with a third group-based downlink transmission and a third acknowledgment feedback occasion; and
transmitting group-based acknowledgment feedback associated with the first group-based downlink transmission and the third group-based downlink transmission in the third acknowledgment feedback occasion subsequent to transmitting the non-group-based acknowledgment feedback.

12. The method of claim 11, wherein acknowledgment feedback associated with the second acknowledgment feedback occasion is not retransmitted in the third acknowledgment feedback occasion.

13. The method of claim 11, wherein a new acknowledgment feedback indicator (NFI) is assumed to be toggled between the first acknowledgment feedback occasion and the third acknowledgment feedback occasion.

14. The method of claim 11, further comprising:
determining that a new acknowledgment feedback indicator (NFI) is toggled between the first acknowledgment feedback occasion and the third acknowledgment feedback occasion based at least in part on a difference in a first NFI value provided in the first downlink control information transmission and a second NFI value provided in the third downlink control information transmission.

15. An apparatus for wireless communications at a user equipment (UE), comprising:
one or more processors;
one or more memories coupled with the one or more processors; and
instructions stored in the one or more memories and executable by the one or more processors to cause the apparatus to:
receive, from a network device, configuration information for that enables group-based acknowledgment feedback for one or more groups of downlink transmissions to the UE, wherein one or more parameters associated with the group-based acknowledgment feedback are indicated in a first set of fields of a first downlink control information format, and are indicated in a second set of fields of a second downlink control information format that is different than the first set of fields, wherein the first set of fields includes a first subset of fields that are in addition to the second set of fields;
receive a downlink control information transmission from the network device having the second downlink control information format;
determine, based at least in part on the one or more parameters of the second set of fields of the second downlink control information format, first acknowledgment feedback associated with at least a first group of downlink transmissions, wherein the determining comprises using a predetermined value for each field of the first subset of fields; and
transmit the first acknowledgment feedback to the network device.

16. The apparatus of claim 15, wherein the instructions are further executable by the one or more processors to cause the apparatus to:
receive, from the network device, an indication to enable the group-based acknowledgment feedback, and wherein the second set of fields of the second downlink control information format are interpreted differently based on whether the group-based acknowledgment feedback is enabled or disabled at the UE.

17. The apparatus of claim 16, wherein the second downlink control information format is a fallback downlink control information format.

18. The apparatus of claim 15, wherein the first subset of fields include one or more of a group indicator field, a new acknowledgment feedback indicator field, or a request field that indicates acknowledgment feedback is requested for one or more of multiple different groups of downlink transmissions.

19. The apparatus of claim 18, wherein the predetermined value for the group indicator field corresponds to a downlink transmission group associated with the downlink control information transmission, the predetermined value for the new acknowledgment feedback indicator field corresponds to a prior value of the new acknowledgment feedback indicator field, the predetermined value for the request field corresponds to a value that indicates acknowledgment feedback is not requested for another group of downlink transmissions.

20. The apparatus of claim 15, wherein the instructions to determine are executable by the one or more processors to cause the apparatus to:
format the first acknowledgment feedback for one or more downlink transmissions associated with the first downlink control information format separately from second acknowledgment feedback associated with a different downlink control information having the second downlink control information format.

21. The apparatus of claim 20, wherein a downlink assignment indicator field of the second downlink control information format is applied separately when determining the second acknowledgment feedback.

22. The apparatus of claim 20, wherein the first acknowledgment feedback includes feedback information only for downlink transmissions associated with only the first downlink control information format or only the second downlink control information format.

23. The apparatus of claim 20, wherein the first acknowledgment feedback includes feedback information for downlink transmissions associated with both the first downlink control information format and the second downlink control information format.

24. The apparatus of claim 23, wherein the first acknowledgment feedback includes the feedback information based at least in part on one or more of a first codebook for downlink transmissions associated with the second downlink control information format, a second codebook for downlink transmissions associated with the second downlink control information format having a first group identification, or a third codebook for downlink transmissions associated with the second downlink control information format having a second group identification.

25. An apparatus for wireless communications at a user equipment (UE), comprising:
one or more processors;
one or more memories coupled with the one or more processors; and
instructions stored in the one or more memories and executable by the one or more processors to cause the apparatus to:
receive a first downlink control information transmission from a network device that is associated with a first group-based downlink transmission and a first acknowledgment feedback occasion;
receive a second downlink control information transmission, subsequent to the first downlink control information transmission, that is associated with a second non-group-based downlink transmission and a second acknowledgment feedback occasion;
transmit non-group-based acknowledgment feedback associated with the second non-group-based downlink transmission in the second acknowledgment feedback occasion;
receive a third downlink control information transmission, subsequent to the second downlink control information transmission, that is associated with a third group-based downlink transmission and a third acknowledgment feedback occasion; and
transmit group-based acknowledgment feedback associated with the first group-based downlink transmission and the third group-based downlink transmission in the third acknowledgment feedback occasion subsequent to transmitting the non-group-based acknowledgment feedback.

26. The apparatus of claim 25, wherein acknowledgment feedback associated with the second acknowledgment feedback occasion is not retransmitted in the third acknowledgment feedback occasion.

27. The apparatus of claim 25, wherein a new acknowledgment feedback indicator (NFI) is assumed to be toggled between the first acknowledgment feedback occasion and the third acknowledgment feedback occasion.

28. The apparatus of claim 25, wherein the instructions are further executable by the one or more processors to cause the apparatus to:
determine that a new acknowledgment feedback indicator (NFI) is toggled between the first acknowledgment feedback occasion and the third acknowledgment feedback occasion based at least in part on a difference in a first NFI value provided in the first downlink control information transmission and a second NFI value provided in the third downlink control information transmission.

* * * * *